(12) United States Patent
Hipshier et al.

(10) Patent No.: US 8,215,688 B2
(45) Date of Patent: Jul. 10, 2012

(54) VEHICLE FLOOR CONSOLE

(75) Inventors: Jason M. Hipshier, Hudsonville, MI (US); Jacob Maki, Grand Rapids, MI (US); David J. McCarthy, Holland, MI (US); Craig D. Flowerday, Holland, MI (US); Zachary Lownds, Paw Paw, MI (US); Timothy Stoepker, Grand Rapids, MI (US); Jonathan M. Stanley, East Grand Rapids, MI (US)

(73) Assignee: Johnson Controls Technology Company, Holland, MI (US)

( * ) Notice: Subject to any disclaimer, the term of this patent is extended or adjusted under 35 U.S.C. 154(b) by 28 days.

(21) Appl. No.: 12/579,910

(22) Filed: Oct. 15, 2009

(65) Prior Publication Data

US 2010/0090491 A1 Apr. 15, 2010

Related U.S. Application Data

(60) Provisional application No. 61/105,622, filed on Oct. 15, 2008.

(51) Int. Cl.
*B60R 7/04* (2006.01)

(52) U.S. Cl. ....... 296/24.34; 296/37.8; 410/94; 410/121

(58) Field of Classification Search ............... 296/24.34, 296/37.8; 410/121, 77, 80, 94
See application file for complete search history.

(56) References Cited

U.S. PATENT DOCUMENTS

| | | | | |
|---|---|---|---|---|
| 3,136,461 | A * | 6/1964 | Gregg, Jr. ...................... | 224/540 |
| 3,692,327 | A * | 9/1972 | Barrick et al. ................ | 280/749 |
| 5,454,596 | A * | 10/1995 | Dirck ............................. | 280/748 |
| 5,535,931 | A * | 7/1996 | Barlow et al. ................ | 224/404 |
| 6,003,921 | A * | 12/1999 | Tozuka ......................... | 296/37.2 |
| 6,032,587 | A * | 3/2000 | Salenbauch et al. ......... | 108/44 |
| 6,609,631 | B2 * | 8/2003 | Asami ........................... | 220/817 |
| 6,739,812 | B1 * | 5/2004 | Pfeifer et al. ................. | 410/118 |
| 7,093,873 | B2 * | 8/2006 | Nilsrud et al. ............... | 296/37.14 |
| 7,160,071 | B2 * | 1/2007 | Legge .......................... | 410/140 |
| 7,192,074 | B2 * | 3/2007 | DePue et al. ................. | 296/37.9 |
| 7,240,814 | B2 * | 7/2007 | Holmberg ..................... | 224/275 |
| 7,708,327 | B2 * | 5/2010 | Lim et al. ..................... | 296/37.1 |
| 7,845,701 | B2 * | 12/2010 | Muller ......................... | 296/37.1 |

* cited by examiner

*Primary Examiner* — Dennis Pedder
(74) *Attorney, Agent, or Firm* — Fletcher Yoder P.C.

(57) ABSTRACT

In one embodiment, a vehicle floor console is provided that includes a support structure and a retaining feature pivotally biased toward the support structure. The retaining feature is configured to secure cargo between the support structure and the retaining feature.

7 Claims, 68 Drawing Sheets

VEHICLE FLOOR CONSOLE

CROSS REFERENCE TO RELATED APPLICATION

This application claims priority from and the benefit of U.S. Provisional Application Ser. No. 61/105,622, entitled "IMPROVED FLOOR CONSOLE", filed Oct. 15, 2008, which is hereby incorporated by reference in its entirety.

BACKGROUND

The invention relates generally to a vehicle floor console.

Many vehicles have a central floor console located between the driver seat and the front passenger seat. In most cases, the floor console extends from below the front dash toward the second row and may include an armrest for the driver and/or front passenger. These floor consoles have been used in vehicles for many years and can vary quite significantly, depending on the type and make of the vehicle. However, a common aspect of many of these floor consoles is the inclusion of a designed storage space. Additionally, the floor console may include transmission controls, such as a shifting handle, and/or a hand brake.

BRIEF DESCRIPTION OF THE INVENTION

In a first embodiment, a vehicle floor console including a support structure and a retaining feature pivotally biased toward the support structure. The retaining feature is configured to secure cargo between the support structure and the retaining feature.

In another embodiment, a vehicle floor console includes a support structure rigidly mounted to a floor of a vehicle and a retaining feature pivotally mounted to the floor and biased toward the support structure. The retaining feature is configured to secure cargo between the support structure and the retaining feature.

In a further embodiment, a vehicle floor console includes a framework mounted to a floor of a vehicle, and a storage compartment disposed within the framework and configured to slide along a longitudinal axis of the vehicle. The vehicle floor console also includes an armrest mounted to a top surface of the storage compartment.

In yet another embodiment, a vehicle floor console includes a support structure and a driver side armrest vertically extendable from the support structure. A position of the driver side armrest is adjustable along a longitudinal axis of a vehicle. The vehicle floor console also includes a passenger side armrest vertically extendable from the support structure. A position of the passenger side armrest is adjustable along the longitudinal axis of the vehicle independently of the driver side armrest.

In another embodiment, a vehicle floor console includes a support structure. The vehicle floor console also includes a removable storage compartment configured to interlock with the support structure in a retained position, and to detach from the support structure in a released position.

In a still further embodiment, a vehicle floor console includes a support structure and an expandable storage compartment extending from the support structure. The expandable storage compartment is configured to form a substantially flush surface with the support structure while in a collapsed position, and to provide a contained storage area in an expanded position.

In yet another embodiment, a vehicle floor console includes a storage ribbon disposed between a pair of lateral support structures. The storage ribbon defines multiple storage compartments, and the storage ribbon is formed from a single sheet of material.

In another embodiment, a vehicle floor console includes a support structure and a tray pivotally mounted to the support structure. The tray is configured to rotate about a first axis between a substantially vertical storage position and a substantially horizontal operational position. The tray is also configured to rotate about a second axis to a first position between a front passenger seat and a driver seat, to a second position within a second row of seating, and to a third position over a seat bottom of the front passenger seat.

In a further embodiment, a vehicle floor console includes a pair of horizontal support rails configured to suspend a removable storage bag above a floor of a vehicle such that an opening in the bag faces upwardly.

DRAWINGS

Figure 110:
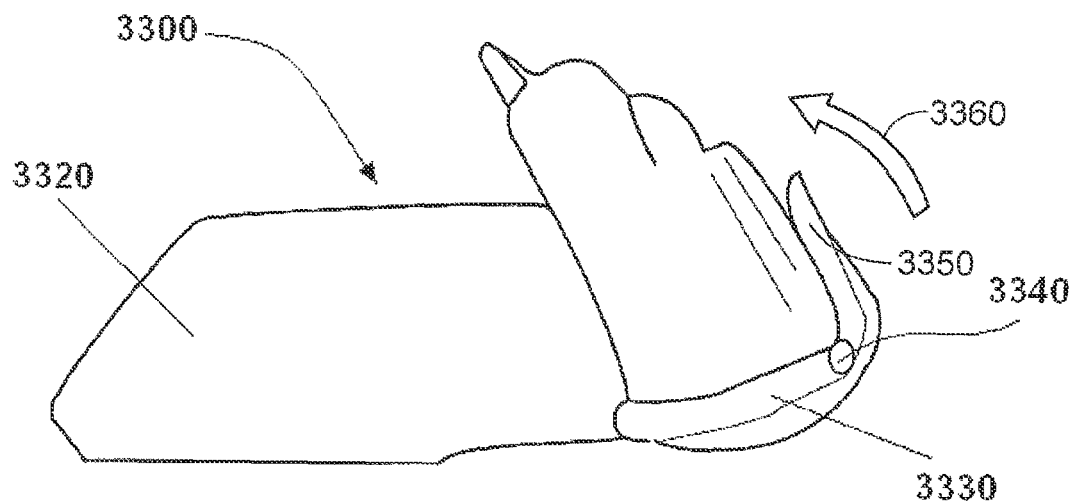

FIG. 110 is a side view of the vehicle floor console 3300 including the pivotally biased retaining feature 3330, in which the retaining feature includes a joint configured to pivotally bias a retaining arm against cargo within the retaining feature. As illustrated, a bag is disposed with the retaining feature 3330, which is pivotally biasing the bag against the support structure 3320. Specifically, the bag is disposed within a main body of the retaining feature 3330. A pivotally biased retaining arm 3350 serves to further secure the bag within the retaining feature 3330. In the present embodiment, the retaining feature 3330 includes a joint 3340 configured to pivotally bias the retaining arm 3350 in a direction 3360 against the cargo within the retaining feature 3330. In this manner, cargo having various irregular shapes may be retained by the retaining feature 3330.

Figure 111:
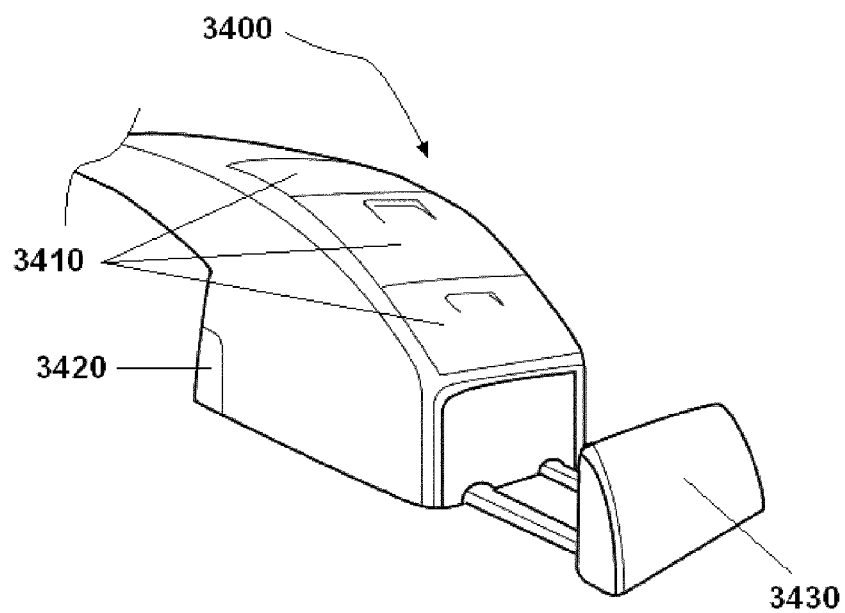

FIG. 111 is a perspective view of a vehicle floor console including a linearly biased retaining feature configured to secure cargo between the retaining feature and a support structure.

Figures 111A, 111B:
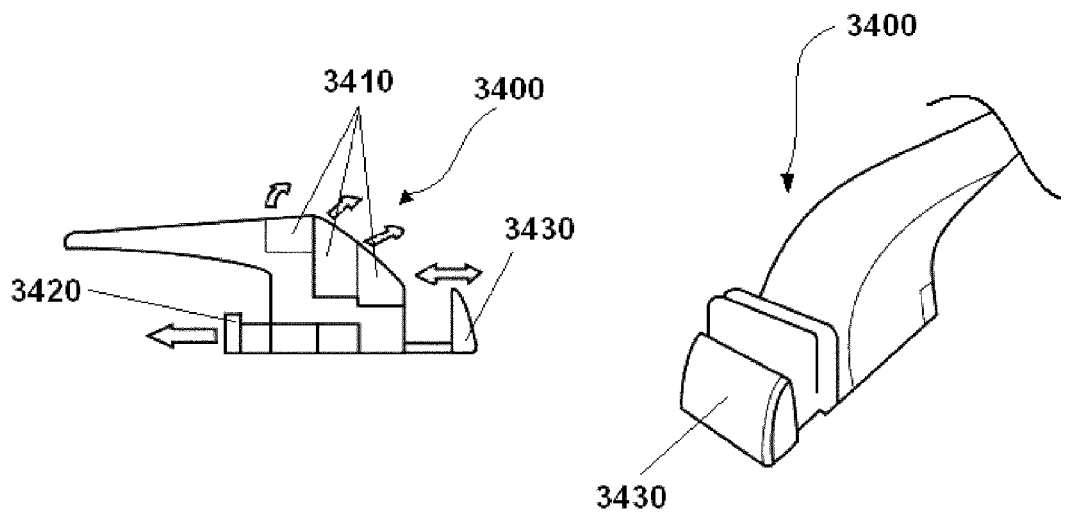

FIG. 111A is a cross-sectional side view of the vehicle floor console including the linearly biased retaining feature.

FIG. 111B is a perspective view of the vehicle floor console including the linearly biased retaining feature, illustrating cargo secured between the retaining feature and the support structure.

Figure 112:
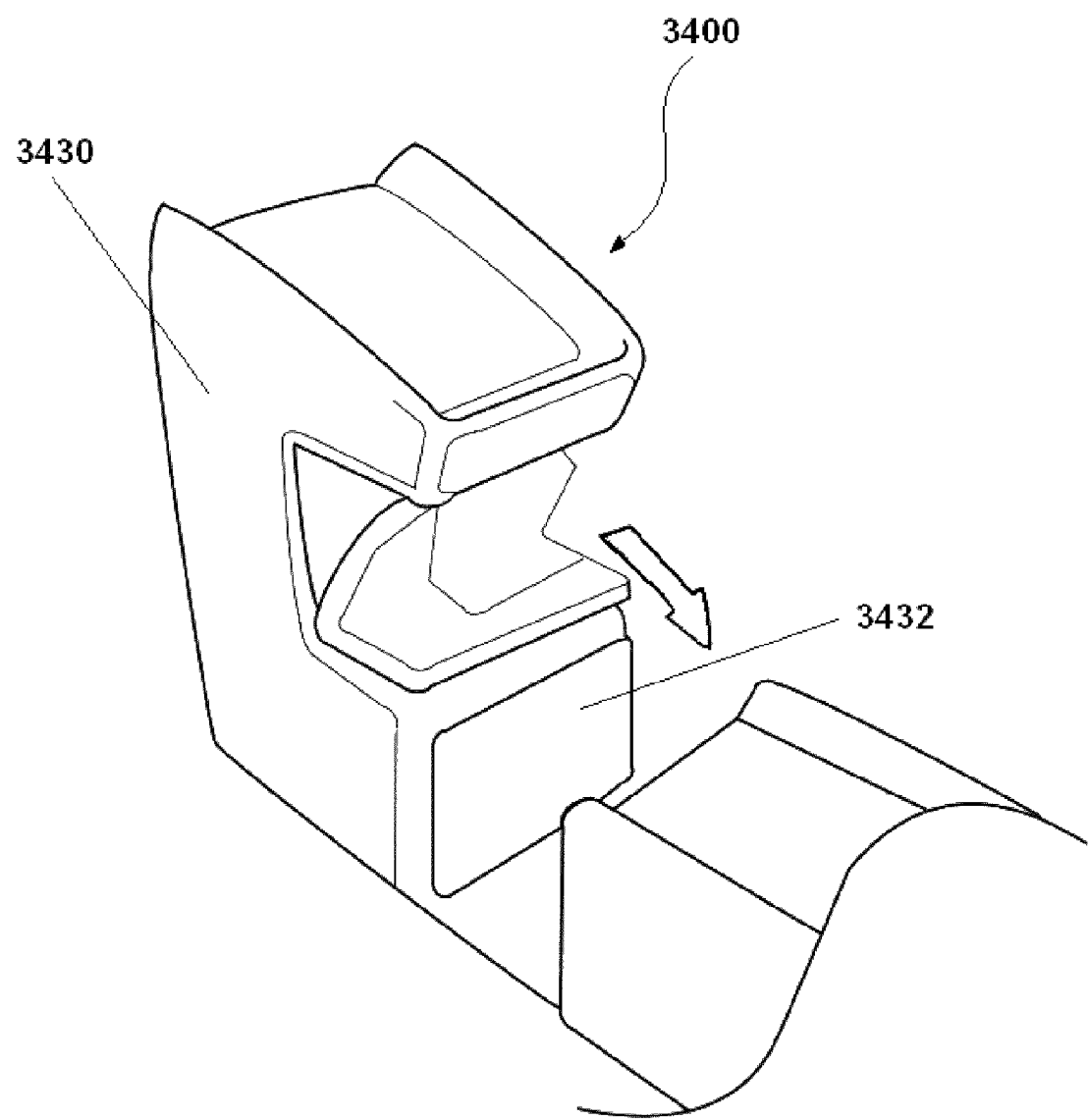

FIG. 112 is a perspective view of the vehicle floor console including the linearly biased retaining feature, in which the retaining feature includes an armrest.

Figure 113:
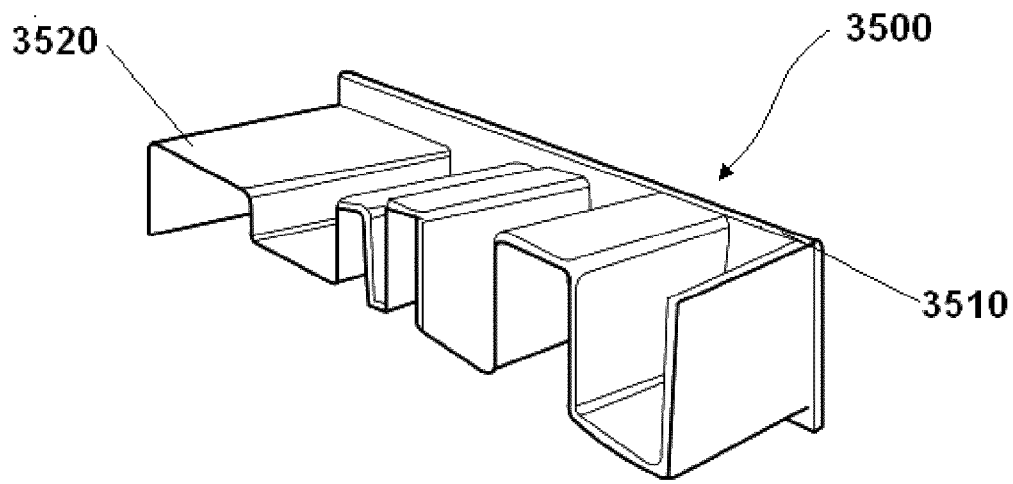

FIG. 113 is a perspective view of a vehicle floor console including a first embodiment of a storage ribbon disposed between a pair of lateral support structures.

Figure 114:
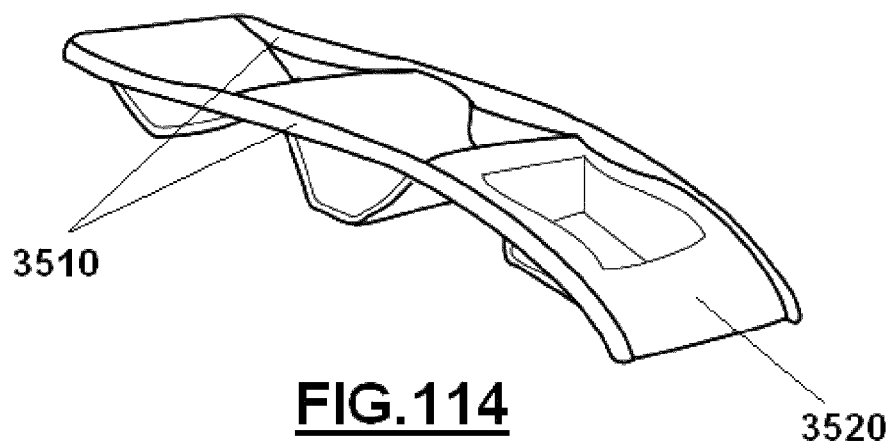

FIG. 114 is a perspective view of a second embodiment of the storage ribbon disposed between the pair of lateral support structures.

Figure 114A:
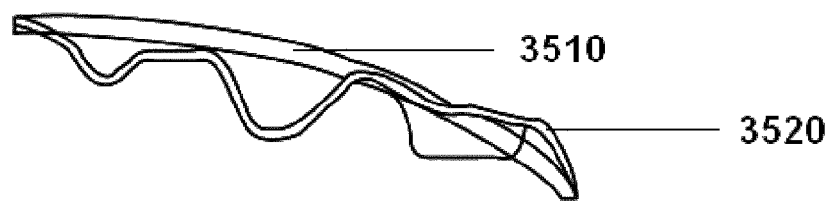

FIG. 114A is a cross-sectional side view of the second embodiment of the storage ribbon as shown in FIG. 114.

Figure 115:
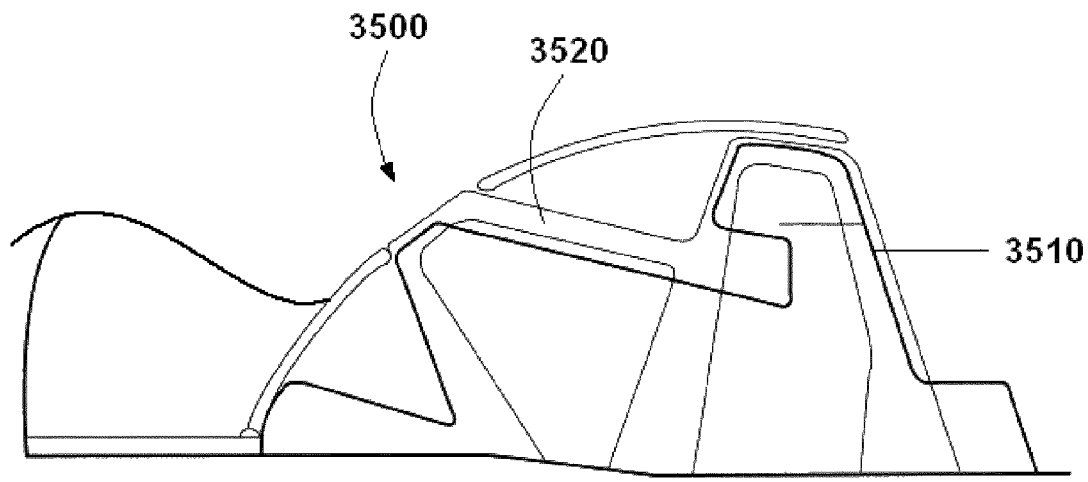

FIG. 115 is a cross-sectional side view of a third embodiment of the storage ribbon disposed between the pair of lateral support structures.

Figure 116:
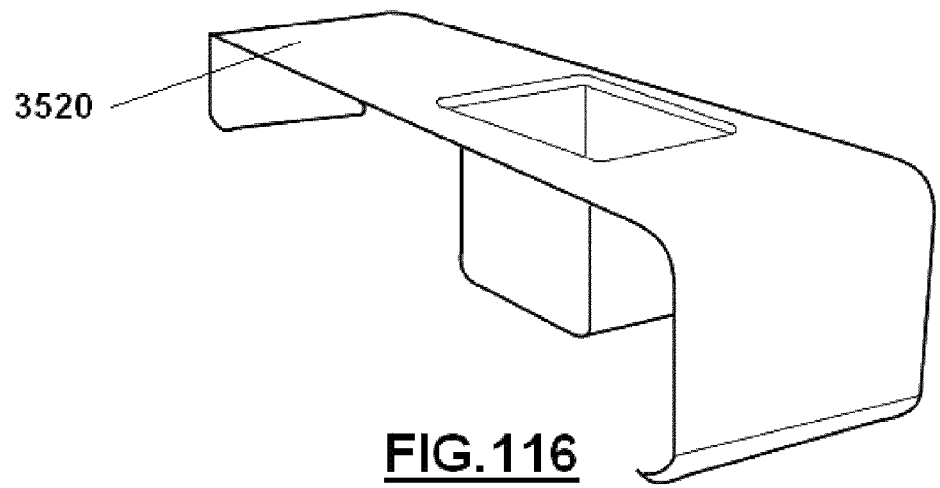

FIG. 116 is a perspective view of a fourth embodiment of the storage ribbon.

Figure 116A:
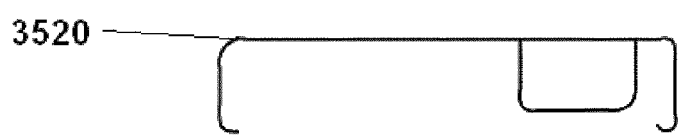

FIG. 116A is a cross-sectional side view of the fourth embodiment of the storage ribbon as shown in FIG. 116.

Figure 117:
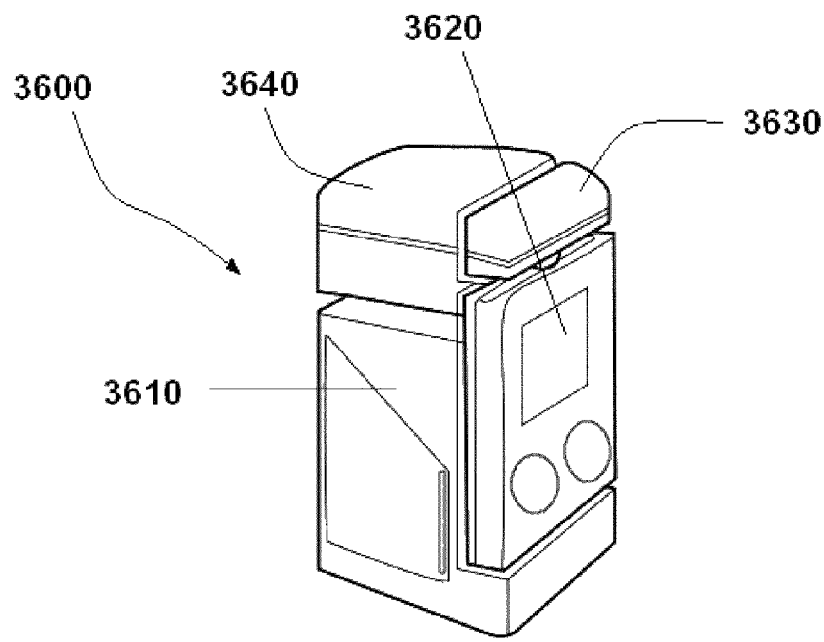

FIG. 117 is a perspective view of a vehicle floor console including a tray pivotally mounted to a support structure, in which the tray is oriented in a substantially vertical storage position.

Figures 117A, 117B:
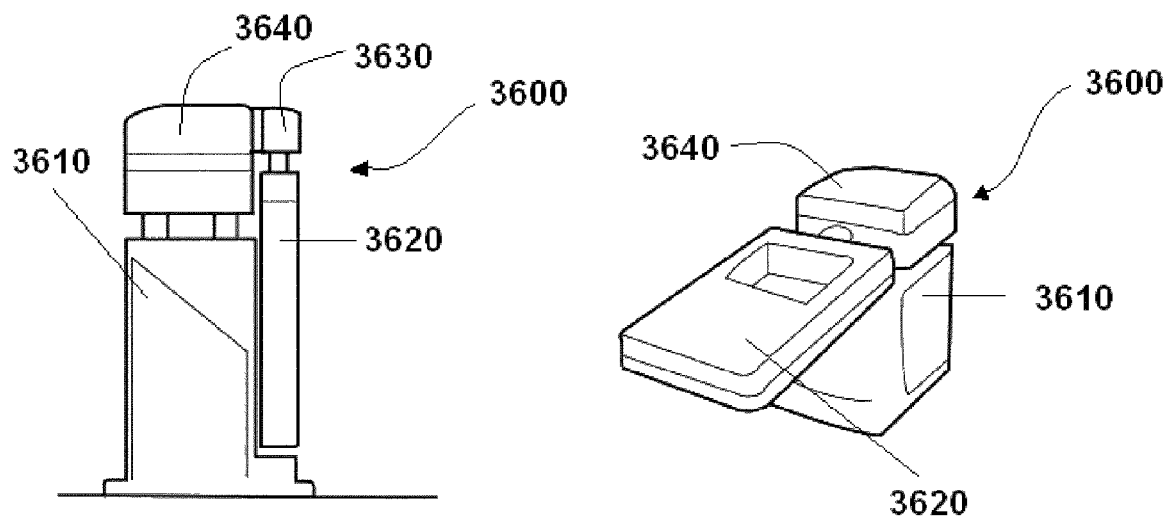

FIG. 117A is a side view of the tray as shown in FIG. 117.

FIG. 117B is a perspective view of the vehicle floor console including the tray pivotally mounted to the support structure, in which the tray is oriented in a substantially horizontal operational position.

Figure 118:
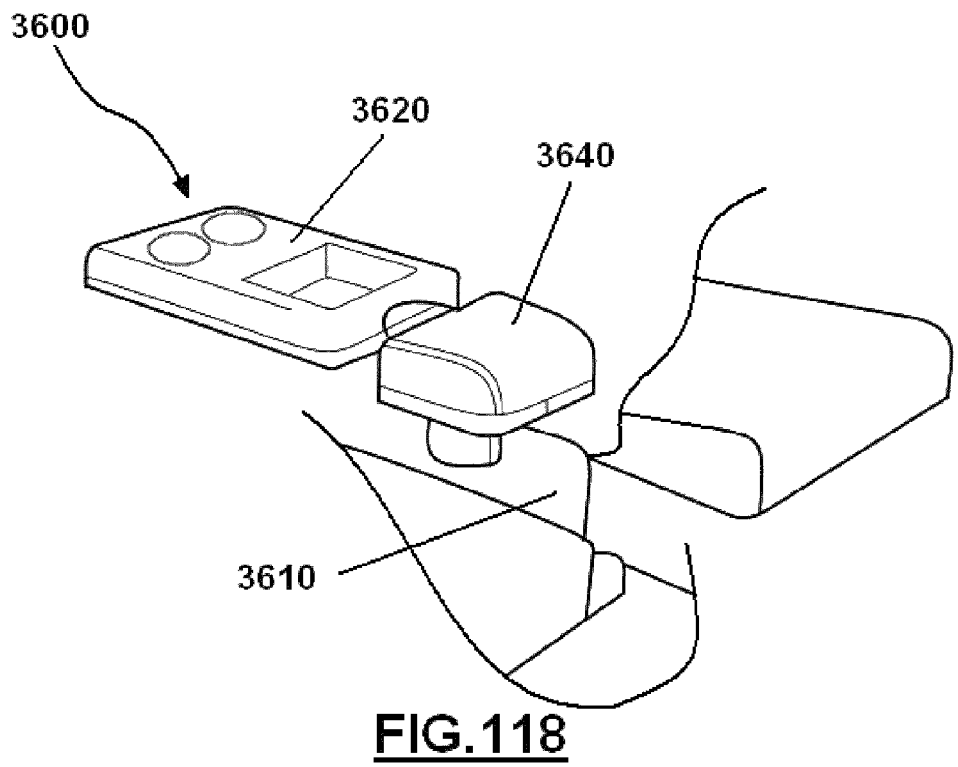

FIG. 118 is a perspective view of the vehicle floor console including the tray pivotally mounted to the support structure, in which the tray is positioned within the second row of seating.

Figures 119, 120:
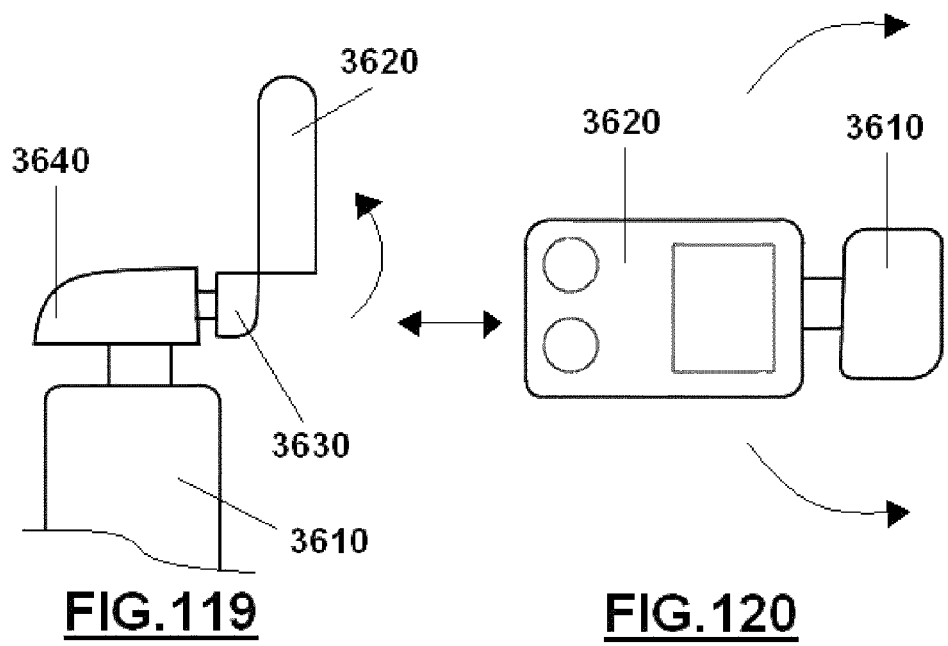

FIG. 119 is a side view of the tray oriented in a substantially vertical transport position.

FIG. 120 is a top view of the tray positioned over a seat bottom of a front passenger seat.

Figure 121:
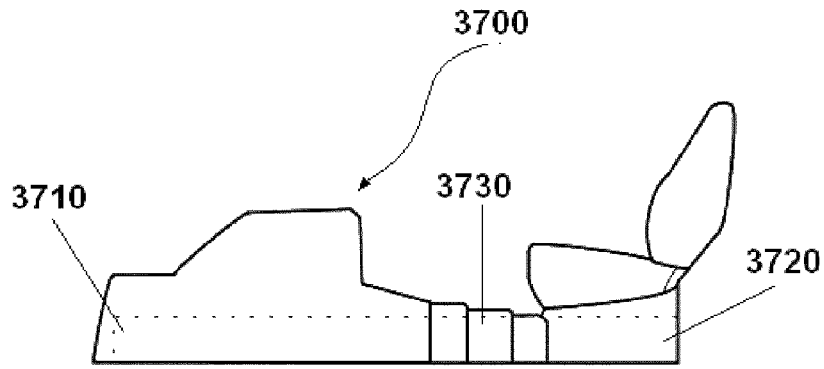

FIG. 121 is a side view of a vehicle floor console including a pass-through configured to facilitate passage of long items into an open space under the console.

Figure 121A:
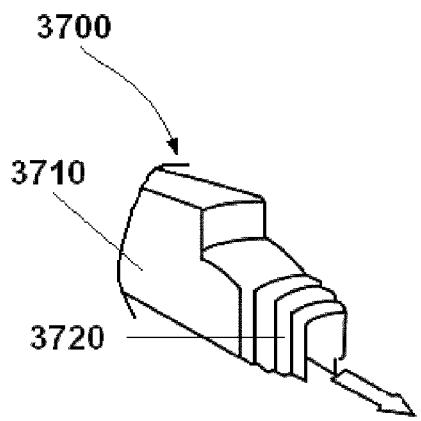

FIG. 121A is a perspective view of a retractable extension configured to enclose an area between the floor console and the second row of seating.

Figure 121B:
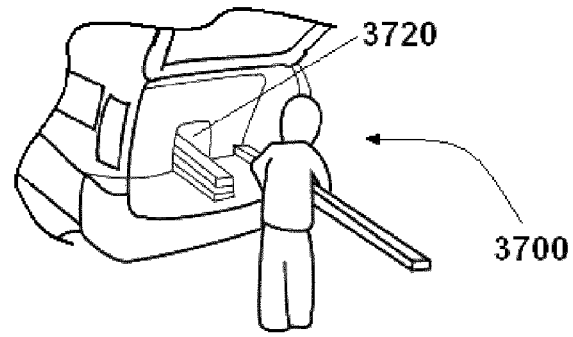

FIG. 121B is a perspective view of a rear of the vehicle, illustrating the pass-through within the second row of seating.

Figure 122:
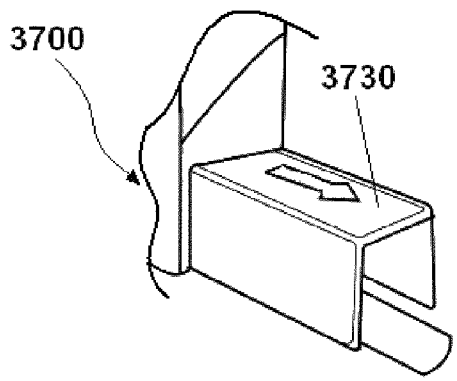

FIG. 122 is a perspective view of an alternative retractable extension configured to enclose the area between the floor console and the second row of seating.

Figure 123:
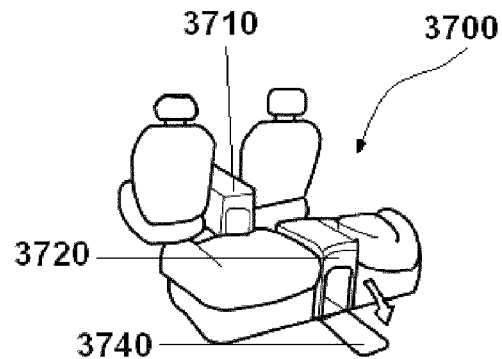

FIG. 123 is a perspective view of the pass-through within the second row of seating.

Figure 124:
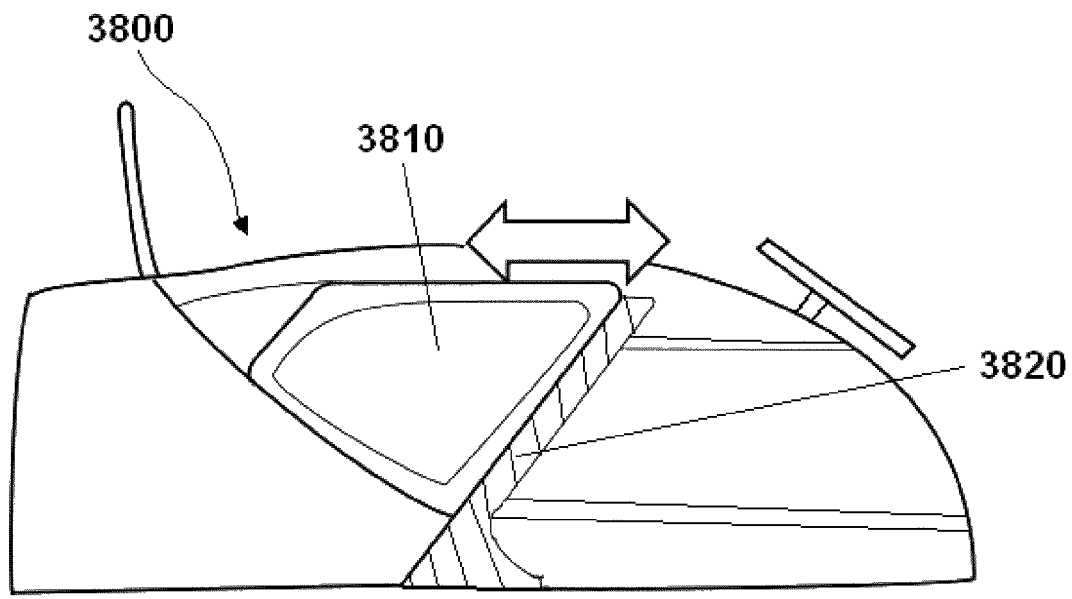

FIG. 124 is a cross-sectional side view of a vehicle floor console including a biased storage compartment wall.

Figure 125:
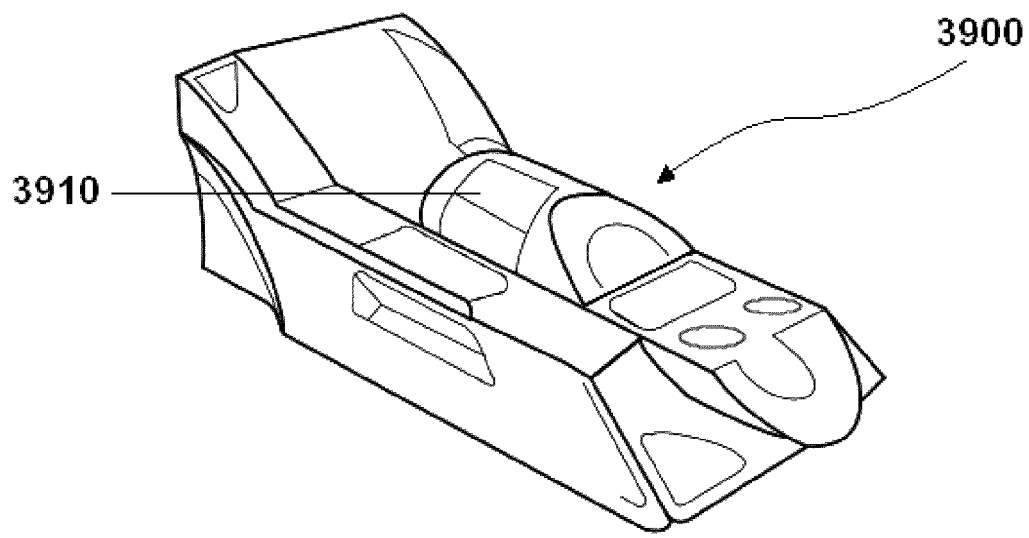

FIG. 125 is a perspective view of a vehicle floor console including a cylindrical rotatable storage compartment in a closed position.

Figure 126:
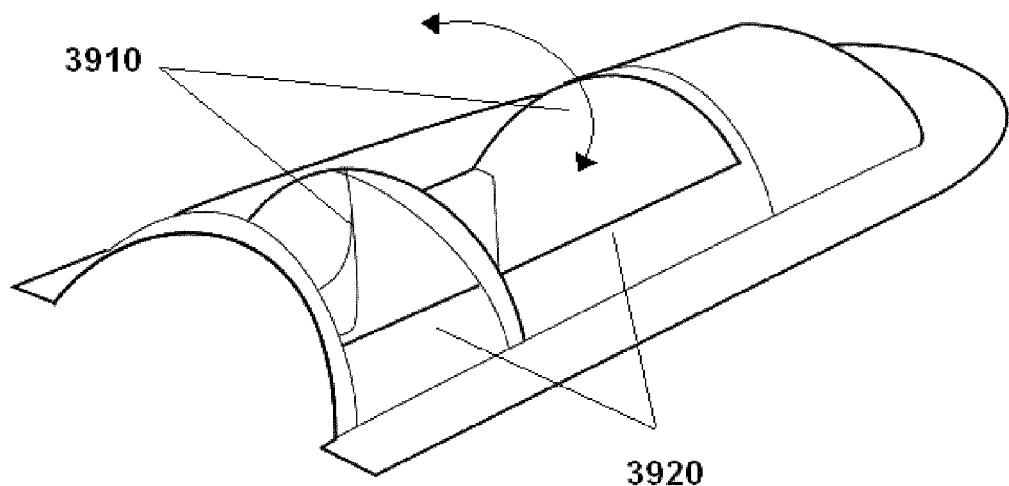

FIG. 126 is a perspective view of the vehicle floor console including the cylindrical rotatable storage compartment in an open position.

Figures 126A, 126B:
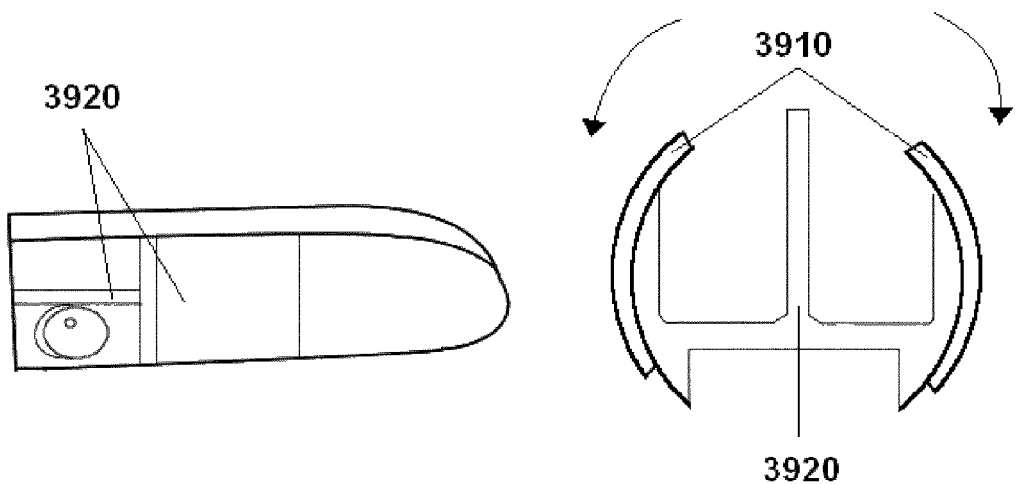

FIG. 126A is a top view of the cylindrical rotatable storage compartment, as shown in FIG. 126.

FIG. 126B is a cross-sectional view of the cylindrical rotatable storage compartment, as shown in FIG. 126.

Figure 127:
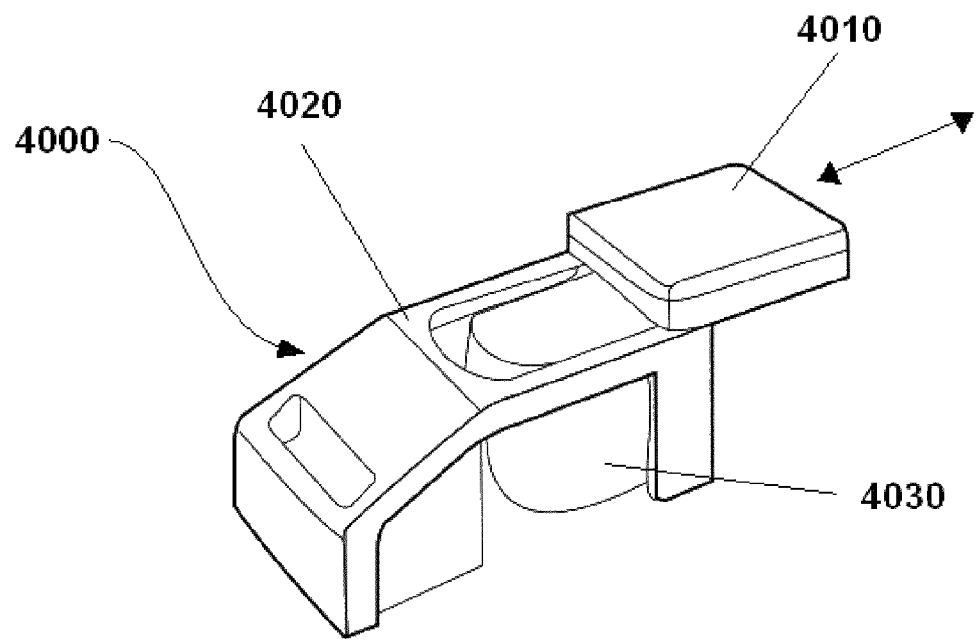

FIG. 127 is a perspective view of a vehicle floor console including a first embodiment of a pair of horizontal support rails configured to suspend a removable storage bag above a vehicle floor.

Figure 128:
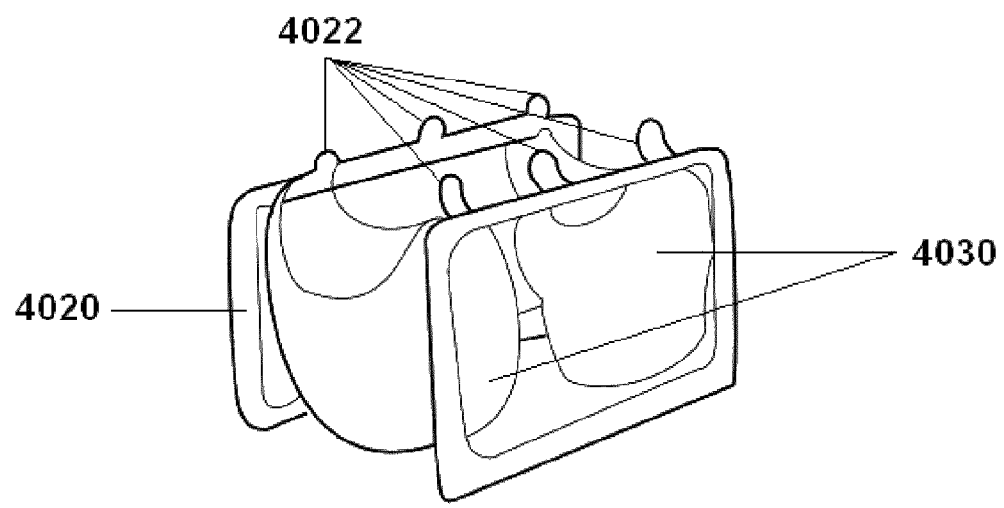

FIG. 128 is a perspective view of a vehicle floor console including a second embodiment of the pair of horizontal support rails configured to suspend the removable storage bag above the vehicle floor.

Figure 129:
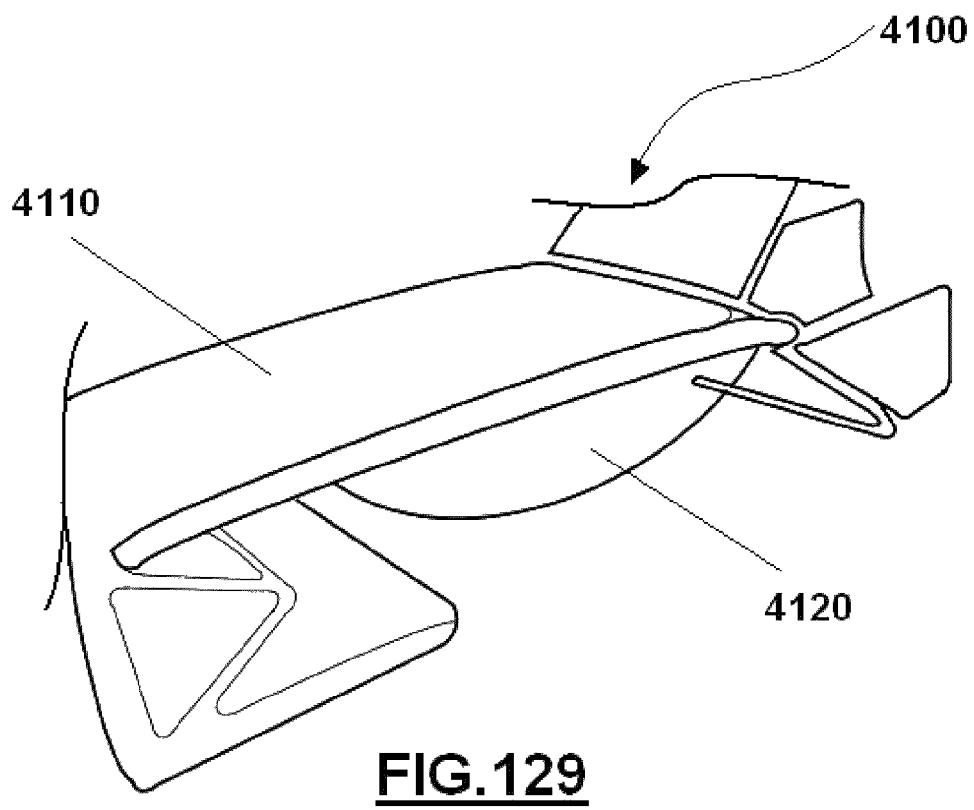

FIG. 129 is a perspective view of a vehicle floor console including a cinchable storage compartment.

Figure 130:
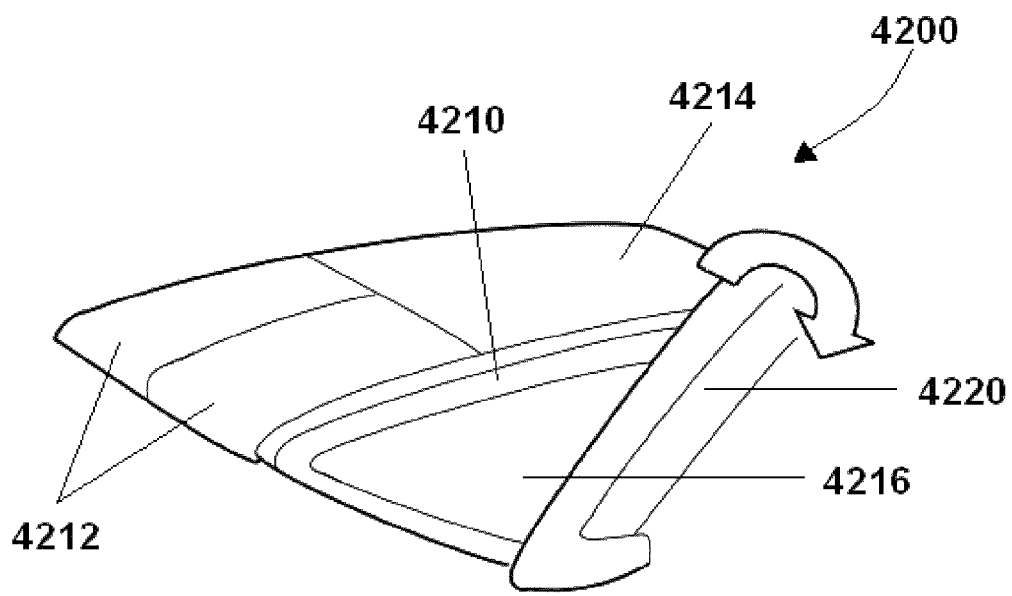

FIG. 130 is a perspective view of a vehicle floor console including a three-position rotatable armrest, in which the armrest is oriented in an extended position.

Figure 131:
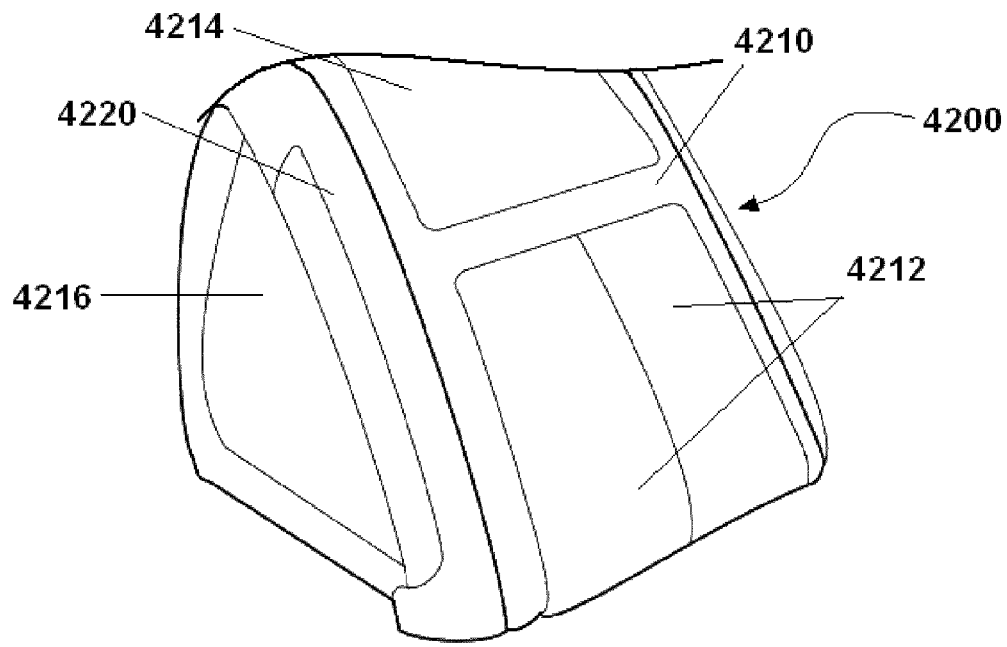

FIG. 131 is a perspective view of the vehicle floor console including the three-position rotatable armrest, in which the armrest is oriented in a retracted position.

Figure 132:
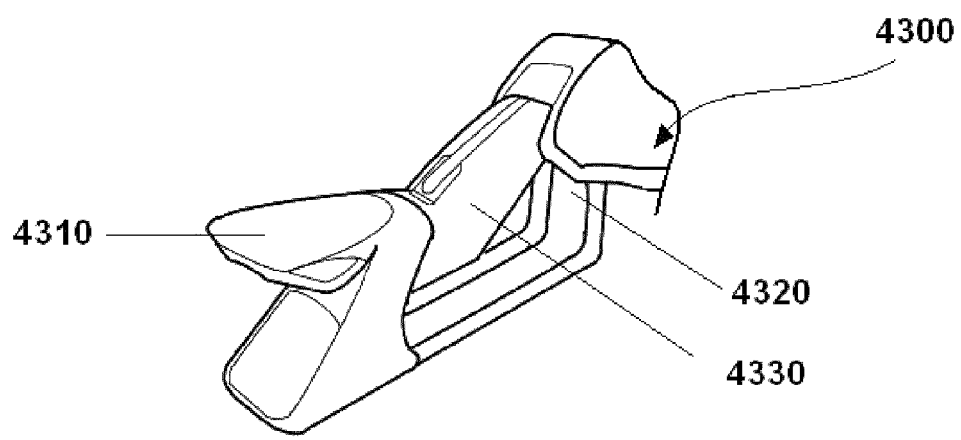

FIG. 132 is a perspective view of a vehicle floor console including a collapsible storage compartment in a deployed position.

Figure 133:
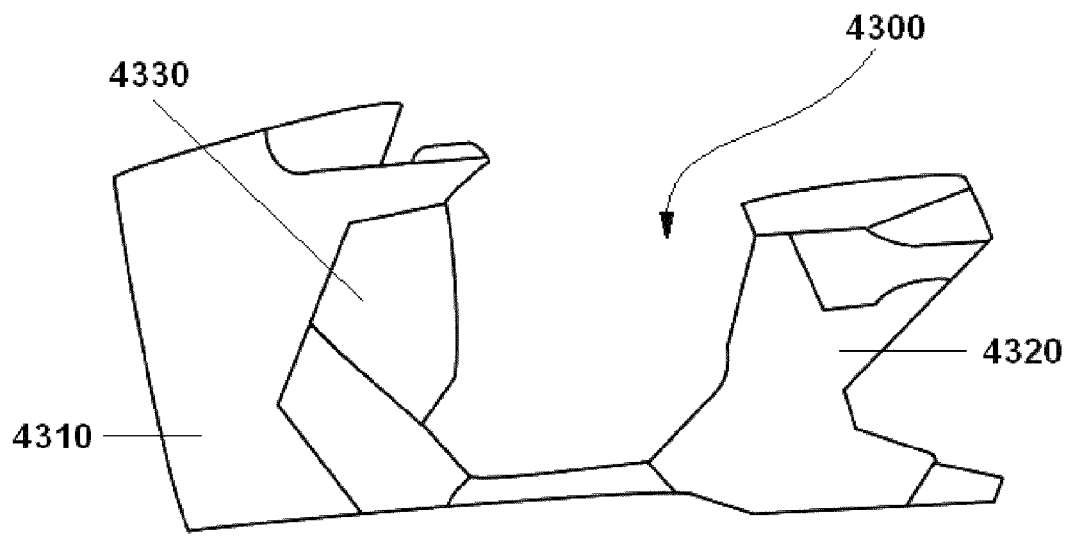

FIG. 133 is a side view of the vehicle floor console including the collapsible storage compartment in a retracted position.

Figure 134:
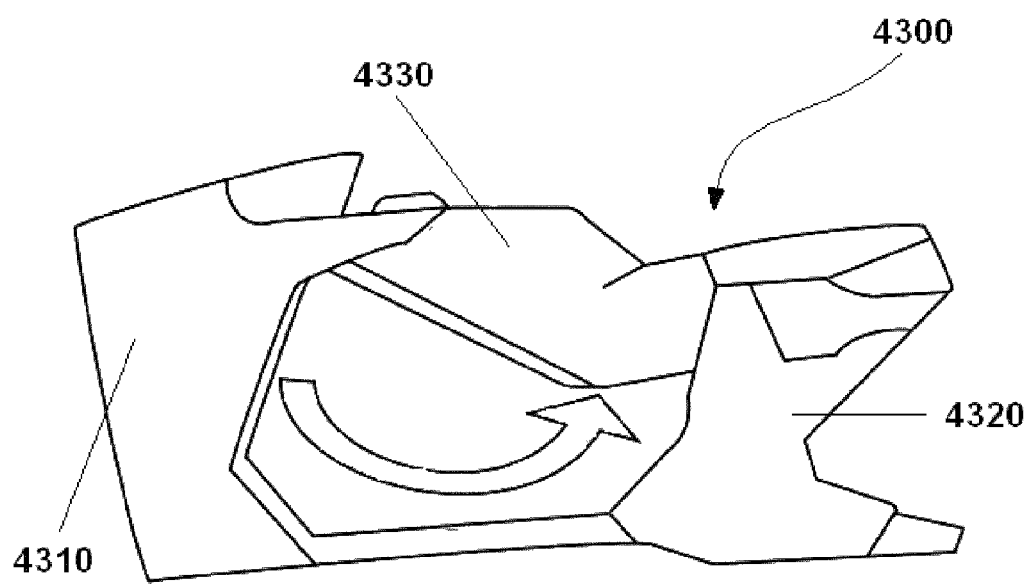

FIG. 134 is a side view of the vehicle floor console including the collapsible storage compartment in the deployed position.

Figure 135:
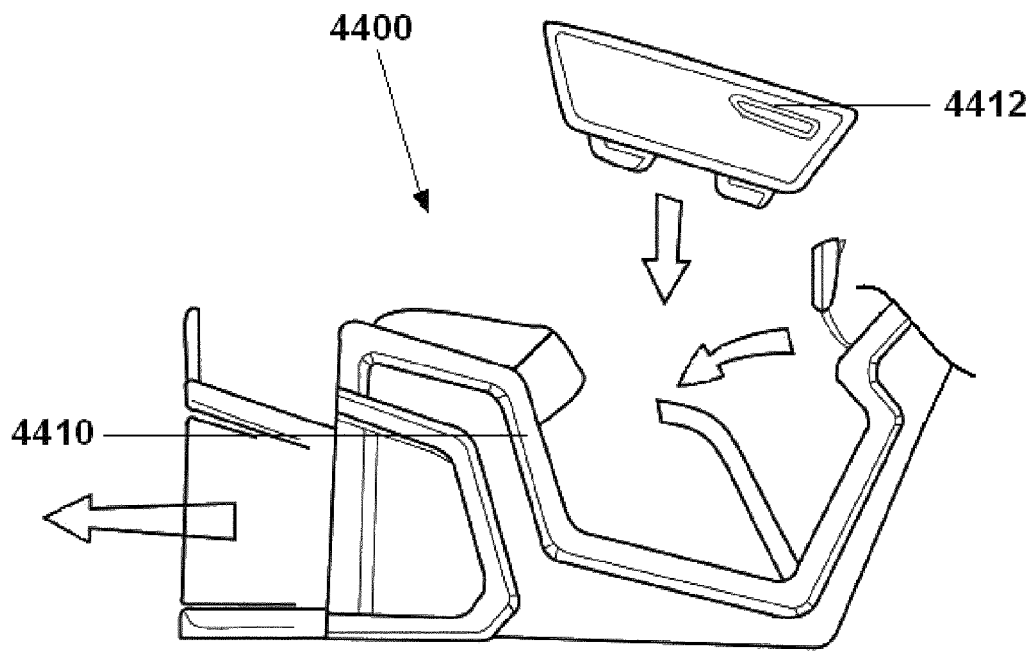

FIG. 135 is a side view of a vehicle floor console including an open storage area configured to receive removable cargo retaining panels.

Figures 136, 137:
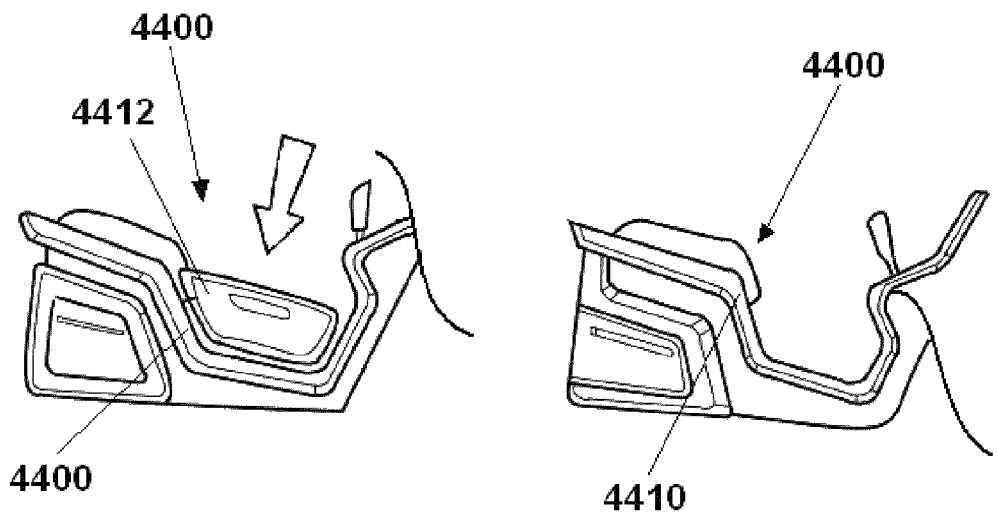

FIG. 136 is a side view of the vehicle floor console including the open storage area, in which the cargo retaining panels have been inserted.

FIG. 137 is a side view of the vehicle floor console including the open storage area, in which the cargo retaining panels have been removed.

DETAILED DESCRIPTION

A floor console is provided that includes various features configured to effectively utilize the space between the driver and passenger seats of a vehicle. In each exemplary embodiment, the vehicle floor console should ideally provide greater containment of loose items and the ability to organize items throughout the vehicle. At the same time, the vehicle floor console should provide better solutions for accessing items while driving, for example, by providing quick storage and retrieval options for quick use items, such as cell phones, and should increase overall capacity for transporting items. Additionally, the vehicle floor console should provide secured storage for electronic devices, while allowing the electronic devices to interact with technology, which has been integrated into the vehicle floor console.

In comparison with current floor consoles, the vehicle floor console provides a perception of a more spacious personal environment, which can be described as a "living room" environment and is more comfortable and spacious during extended trips. The vehicle floor console also provides more flexible storage containers for both confined and dedicated storage space and a greater allowance for seat adjustment based on personal comfort and driving preferences. In various exemplary embodiments, the vehicle floor console uses natural boundaries to contain items and map pockets, among other features, to provide undedicated storage space. In various exemplary embodiments, the various storage features of the vehicle floor console provide simple ways to quickly hide items from unexpected passengers. In various exemplary embodiments, a glove box may be utilized to provide a deep, secure storage space. In various exemplary embodiments, separate storage features are particularly useful for long-term or short-term storage. In such exemplary embodiments, the long-term storage features may be designed such that they avoid interfering with access to the short-term storage features.

In various exemplary embodiments, the vehicle floor console utilizes an open and flexible design, while maximizing package space and providing additional features, content and/or technology, in comparison to current designs, to make the driving experience more personalized and fun. In various exemplary embodiments, transmission controls and/or an emergency brake are moved to the instrument panel and/or may use drive-by-wire controls to provide additional space for the vehicle floor console. In various exemplary embodiments, the vehicle floor console may use sliding storage containers, hidden dividers, collapsing structures and/or box in box designs. The vehicle floor console may provide flexibility in color and material options and/or may use colors and materials present on the exterior of the vehicle. In various exemplary embodiments, the vehicle floor console has ambient lighting features that interact with and/or are integrated with existing lighting features of the vehicle. In various exemplary embodiments, the ambient lighting features allow color adjustability.

Longitudinally Sliding Storage Compartment

In certain embodiments of the floor console, a longitudinally sliding storage compartment is provided within a framework of the floor console. Specifically, the storage compartment is configured to slide fore and aft relative to a front portion of the vehicle interior. Such a configuration may establish both a contained space within the storage compartment and an open space within the framework of the floor console, thereby enhancing utilization of the available area between the front seats.

Figure 1:
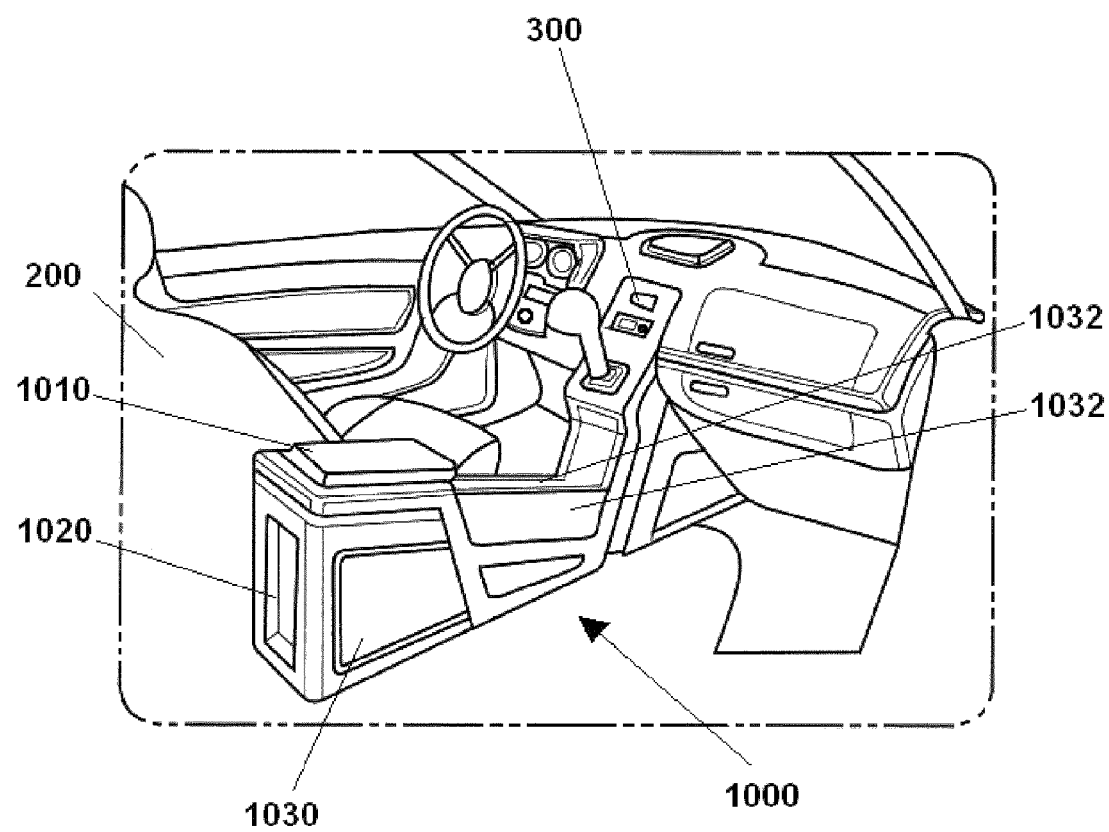
FIG. 1 is a perspective view of a vehicle interior including a vehicle floor console having a longitudinally sliding storage compartment.

FIG. 1 is a perspective view of a vehicle interior including a vehicle floor console 1000 having a longitudinally sliding storage compartment. As illustrated, the vehicle interior includes a driver seat 200, and an instrument panel 300 having controls for an electronic emergency brake (e-brake) and a transmission. With the emergency brake and transmission controls located in the instrument panel 300, more space is available between the driver seat 200 and the passenger seat for the vehicle floor console 1000. As illustrated, the vehicle floor console 1000 is located in the available space between the driver seat 200 and the passenger seat. The vehicle floor console 1000 includes an armrest 1010 located on the top of the vehicle floor console 1000, while a storage bin 1020 is located beneath the armrest 1010. In certain configurations, the storage bin 1020 may expand into the second row (e.g., rear vehicle seats) for access to the available storage within the bin 1020. A storage space 1030 is located in front of the storage bin 1020. The storage space 1030 is defined on two sides by a pair of panels 1032. The panels 1032 may be illuminated to add ambient light to the vehicle interior, as well as to assist in finding objects placed in the storage space 1030.

As discussed in detail below, the storage bin 1020 may slide toward the front of the vehicle and into the storage space 1030. In certain embodiments, the armrest may remain fixed to the console 1000, while the storage bin 1020 slides within the console framework. In such embodiments, the top of the storage bin 1020 may be open, thereby facilitating access to the interior of the storage bin 1020 when the bin is positioned forward of the armrest 1010. In alternative embodiments, the armrest 1010 may serve as a lid for the storage bin 1020. Consequently, the position of the armrest 1010 may be adjusted by moving the storage bin 1020 fore and aft within the console framework. To access, the storage bin 1020, the armrest may be rotated upwardly to expose the interior of the storage bin. In further embodiments, a screen and/or control panel may be positioned at the front portion of the floor console 1000.

Figure 2:
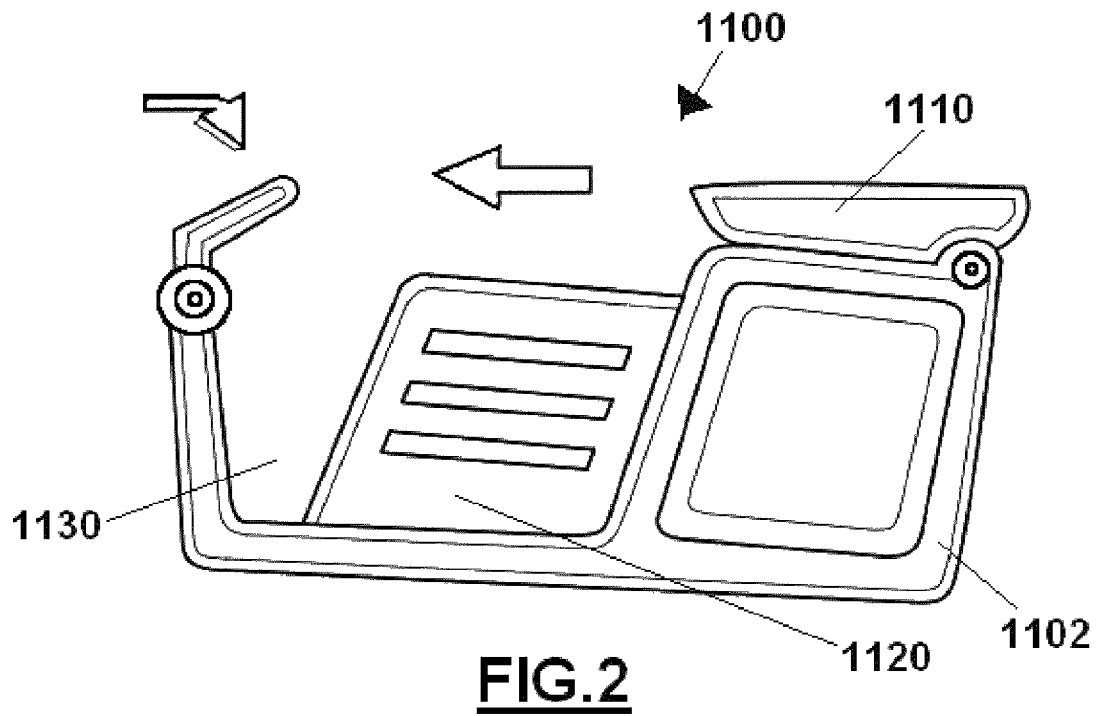
FIG. 2 is a side view of a first embodiment of the longitudinally sliding storage compartment, with the storage compartment in a forward position.

FIGS. 2 through 5 illustrate a first embodiment of the longitudinally sliding storage compartment. FIG. 2 is a side view of a vehicle floor console 1100 including a frame 1102. The frame 1102 defines a storage space 1130 that is located near the front of the vehicle floor console 1100. In contrast to the storage space 1030 shown in FIG. 1, the storage space 1130 does not have any structures similar to the panels 1032, shown in FIG. 1, to define the sides of the storage space 1130. Without the panels 1032 or the like defining the sides of the storage space 1130, the storage space 1130 may be better suited for storing large, self-contained objects, such as a purse, a backpack and/or a grocery bag, which may be wider than the vehicle floor console 1100 and thus wider than the storage space 1130. In the present embodiment, a storage bin 1120 is configured to be pulled out into the storage space 1130 from beneath a first exemplary armrest 1110, thereby facilitating access to the storage bin 1120. Specifically, in the present embodiment, the storage bin 1120 includes an open top configured to expose the interior of the storage bin 1120 when the bin is displaced from the armrest 1110. As will be appreciated, the storage bin 1120 is contained and/or guided by the frame 1102.

Figure 3:
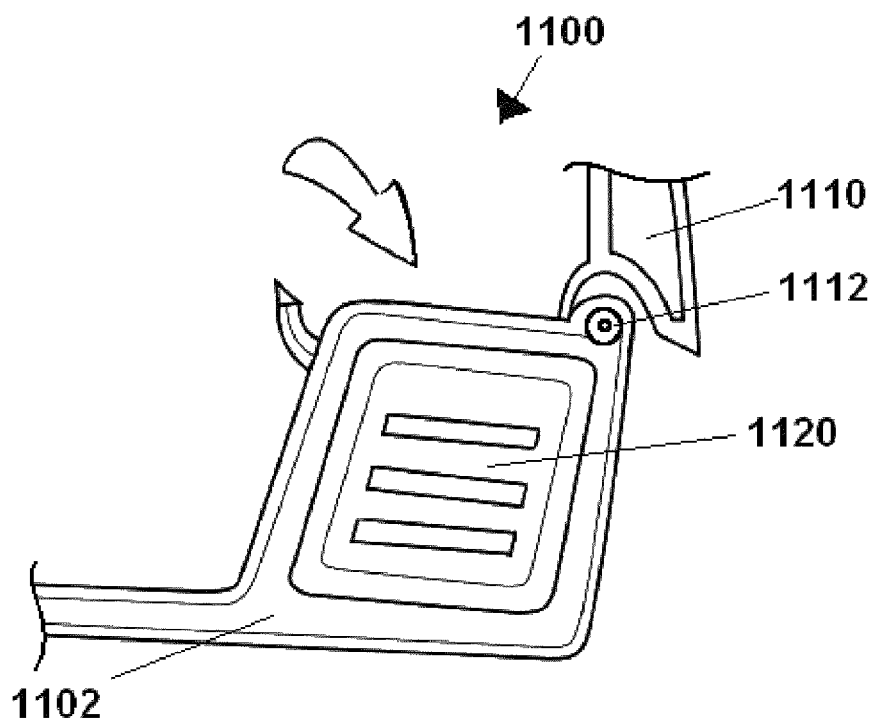
FIG. 3 is a side view of the first embodiment of the longitudinally sliding storage compartment, with the storage compartment in a rearward position.

FIG. 3 is a side view of the floor console 1100 with the storage bin 1120 pushed underneath the armrest 1110. As illustrated, the armrest 1110 is configured to rotate around a hinge 1112 to facilitate access to the storage bin 1120. The hinge 1112 connects the armrest 1110 to the frame 1102. As such, the storage bin 1120 slides independently of the fixed armrest 1110. Consequently, in the present embodiment, the storage bin 1120 may be accessed by either translating the storage bin 1120 into a forward position, or rotating the armrest 1110 upwardly.

Figure 4:
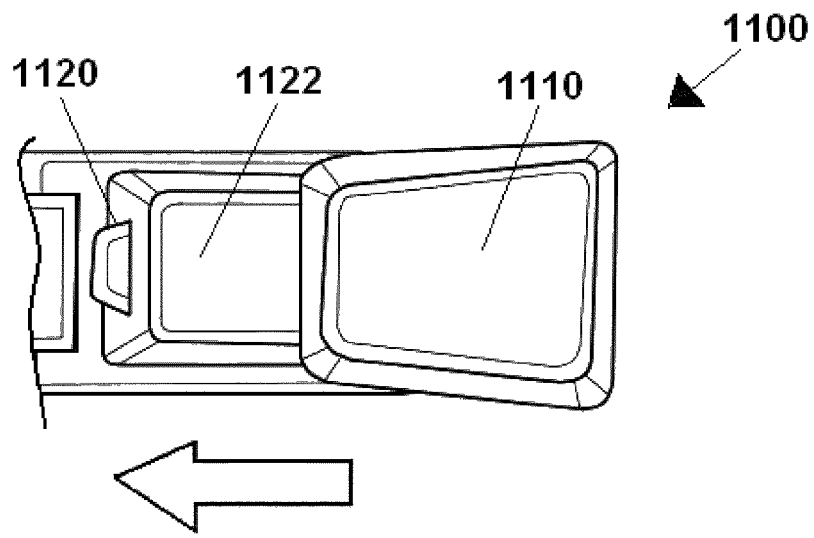
FIG. 4 is a top view of the first embodiment of the longitudinally sliding storage compartment, with the storage compartment in the forward position.
Figure 5:
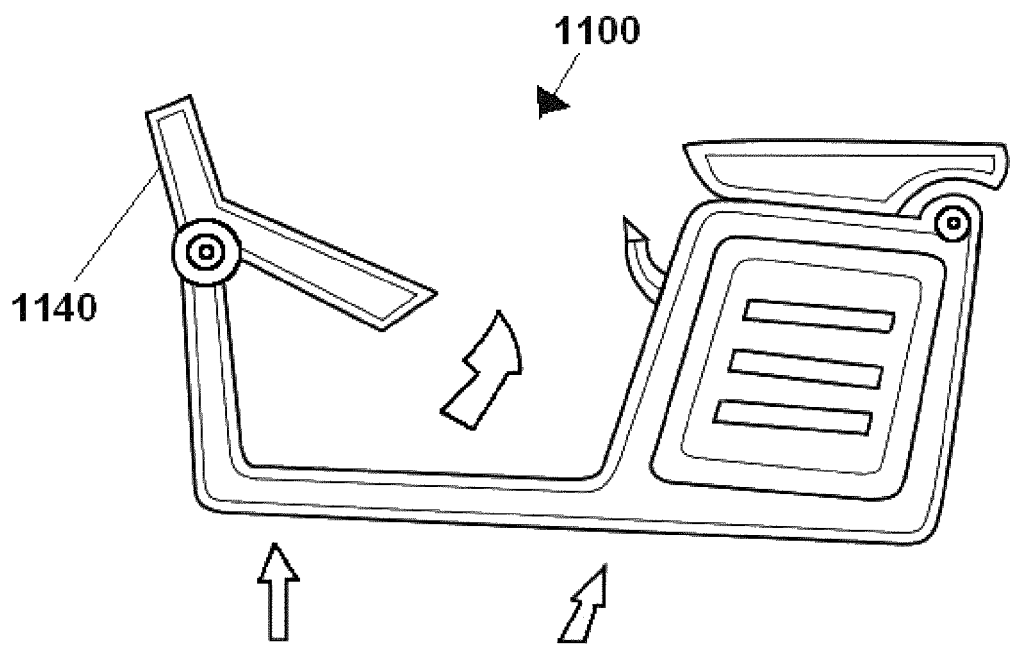
FIG. 5 is a side view of the first embodiment of the longitudinally sliding storage compartment, including a rotatable control panel.

FIG. 4 is a top view of the first embodiment of the vehicle floor console 1100 with a longitudinally sliding storage compartment. As illustrated, the storage bin 1120 is configured to be pulled out from underneath the armrest 1110, facilitating access to the storage bin 1120 through an open top 1122. In certain configurations, the storage bin 1120 may include features configured to limit the range of motion of the bin 1120, thereby ensuring that the bin remains coupled to the frame 1102. FIG. 5 is a side view of the vehicle floor console 1100 with the storage bin 1120 in the retracted position, and including a control panel 1140. The control panel 1140 is connected at the front of the vehicle floor console 1100 by a pivot configured to enable rotation of the control panel 1140 relative to the floor console 1100. As illustrated, the control panel 1140 may be rotated upwardly or downwardly between an exposed and concealed position.

Figure 6:
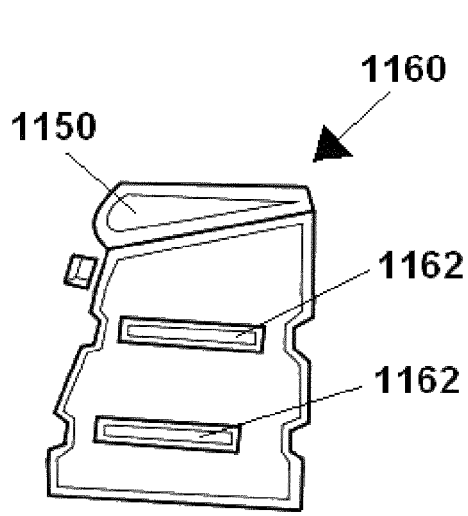
FIG. 6 is a cross-sectional side view of a second embodiment of the longitudinally sliding storage compartment, including reconfigurable cross members.
Figure 7:
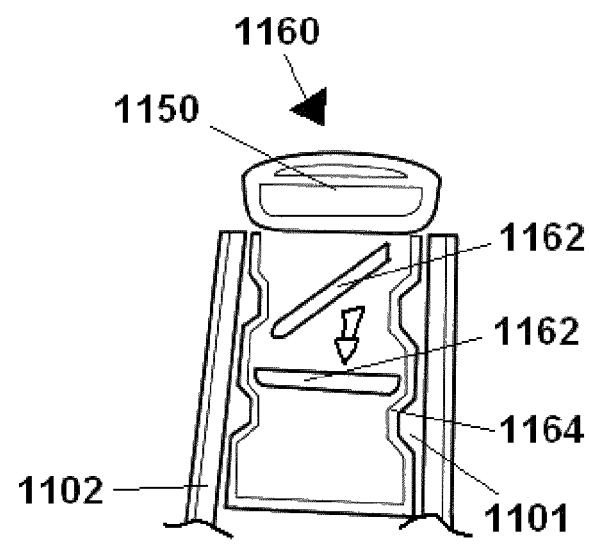
FIG. 7 is a cross-sectional front view of the second embodiment of the longitudinally sliding storage compartment, illustrating installation of the reconfigurable cross members.

FIG. 6 is a cross-sectional side view of a second embodiment of a longitudinally sliding storage compartment 1160, including reconfigurable cross members. As discussed in detail below, the second embodiment of the sliding storage compartment 1160 includes an armrest mounted to a top surface of the storage compartment. In this manner, the armrest slides along with the storage compartment 1160 to provide both passenger comfort and enhanced access to the storage compartment. As illustrated, the storage bin 1160 has one or more cross-members 1162 which can be added, moved or removed to alter the size and type of storage available in the storage bin 1160. An armrest 1150 serves as a lid for the storage bin 1160. In contrast to the armrest 1110 shown in FIGS. 2 through 5, the armrest 1150 is attached by a hinge to the front of the storage bin 1160, rather than being attached to the frame 1102. As shown in FIG. 7, the storage bin 1160 includes one or more grooves 1164 which engage one or more ridges 1101, on the inside of the frame 1102 to enable the storage bin 1160 to slide forward and backward along a defined path. Furthermore, as illustrated, the cross members 1162 may be installed by inserting each cross member 1162 askew to the horizontal plane of the storage bin 1160 and then rotating the cross member 1162 to engage the inside edge of the grooves 1164 on the interior of the storage bin 1160.

It should be appreciated that the storage bin 1120 may have structures similar to the grooves 1164 and the cross-members 1162 shown within the storage bin 1160. It should also be appreciated that the storage bins 1120 and 1160, as well as any other exemplary storage bins may be interchangeable with any of the following configurations and/or exemplary embodiments. It should further be appreciated that the first and second exemplary storage bins 1120 and 1160 can be moved using any known or later-developed structure, such as a track, slides, or the like, either instead of or in addition to the above-outlined grooves 1164 and ridges 1101.

Figure 8:
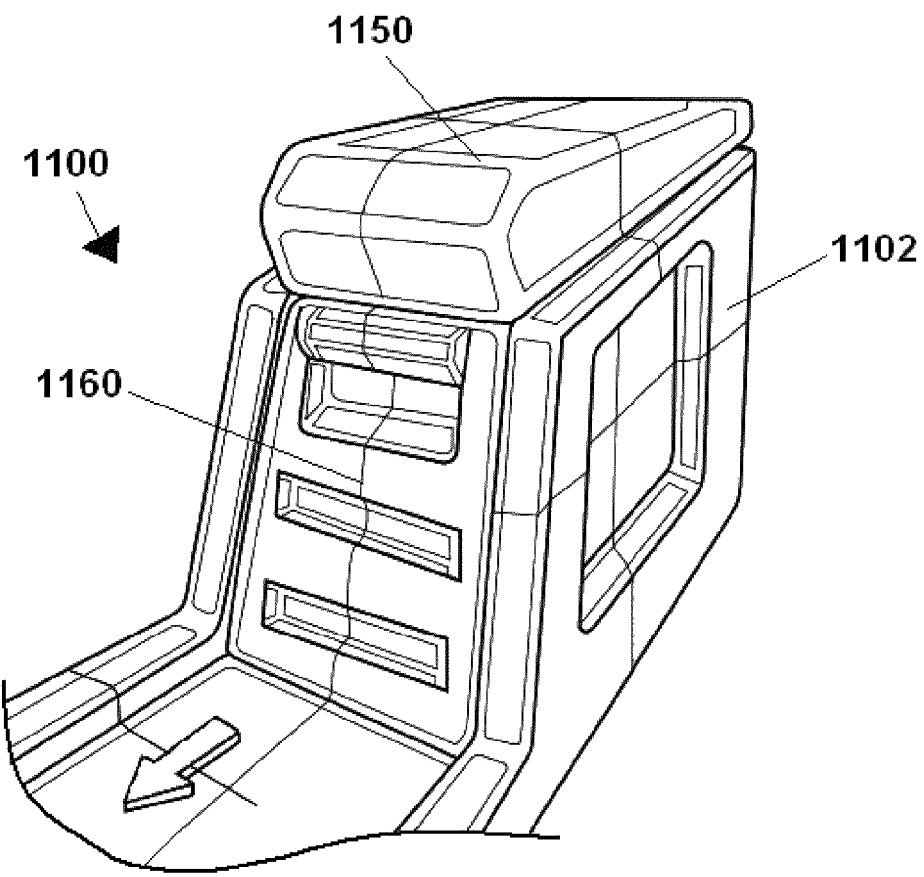
FIG. 8 is a perspective view of the second embodiment of the longitudinally sliding storage compartment.

FIG. 8 is a perspective view of the second embodiment of the longitudinally sliding storage compartment 1160, in which the compartment is positioned at a rear portion of the frame 1102. As previously discussed, the armrest 1150 serves as a lid for the sliding storage compartment 1160 and translates with the compartment along the longitudinal direction. In the present embodiment, the armrest is configured to rotate between a closed position and an open position. In the closed position, the armrest 1150 substantially covers an opening within the top of the storage compartment 1160. In the open position, the armrest 1150 facilitates access to an interior of the storage compartment 1160. As illustrated, the armrest 1150 is in the closed position, thereby substantially enclosing the contents of the storage compartment 1160.

Figure 9:
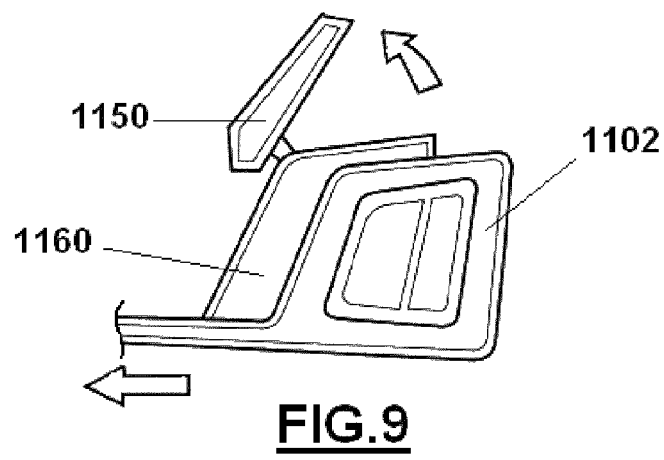
FIG. 9 is a side view of the second embodiment of the longitudinally sliding storage compartment, illustrating an armrest rotated in an upward position.

FIG. 9 is a side view of the second embodiment of the longitudinally sliding storage compartment 1160, in which the armrest 1150 is in the open position. In this configuration, a driver and/or front passenger may access the interior of the storage compartment 1160. While the present embodiment includes an armrest 1150 configured to rotate about a joint positioned at a front portion of the storage compartment 1160, it should be appreciated that alternative embodiments may include an armrest 1150 configured to rotate about a rear or side portion of the compartment 1160. Furthermore, FIG. 9 shows the storage compartment 1160 translated forward along the longitudinal axis. As illustrated, the armrest 1150 moves forward with the storage bin 1160, rather than being attached to the frame 1102. In this configuration, a driver who translates the armrest 1150 into a forward position for comfort may easily access the contents of the storage compartment 1160, which is now positioned directly below the driver arm.

Figure 10:
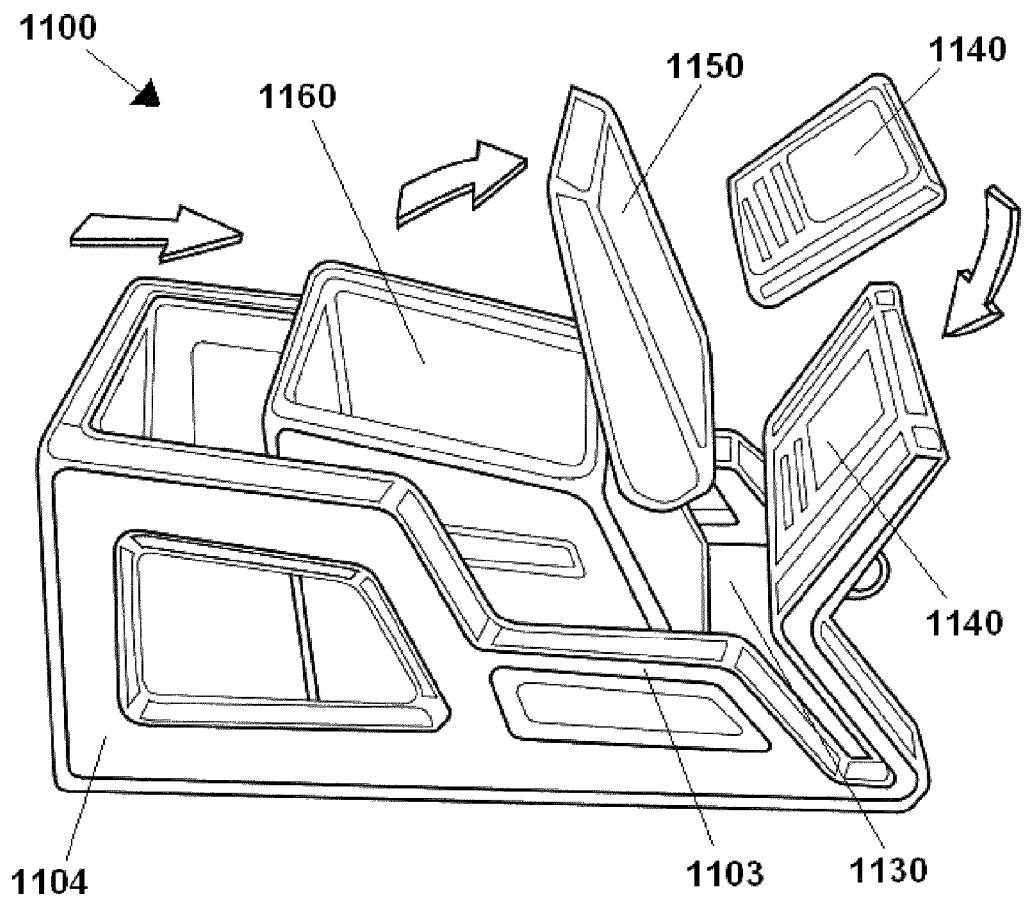
FIG. 10 is a perspective view of the second embodiment of the longitudinally sliding storage compartment, illustrating a control panel positioned at a front portion of the floor console.

FIG. 10 is a perspective view of the second embodiment of the longitudinally sliding storage compartment, illustrating a control panel positioned at a front portion of the floor console 1100. As illustrated, the storage bin 1160 can be moved forward and backward within a frame 1104. In the present embodiment, the frame 1104 is configured to support a removable control panel 1140. As illustrated, the control panel 1140 is shown in both the attached and unattached positions. In addition, the frame 1104 includes side rails 1103 that further define the storage space 1130 both fore and aft of the storage compartment 1160.

Figure 11:
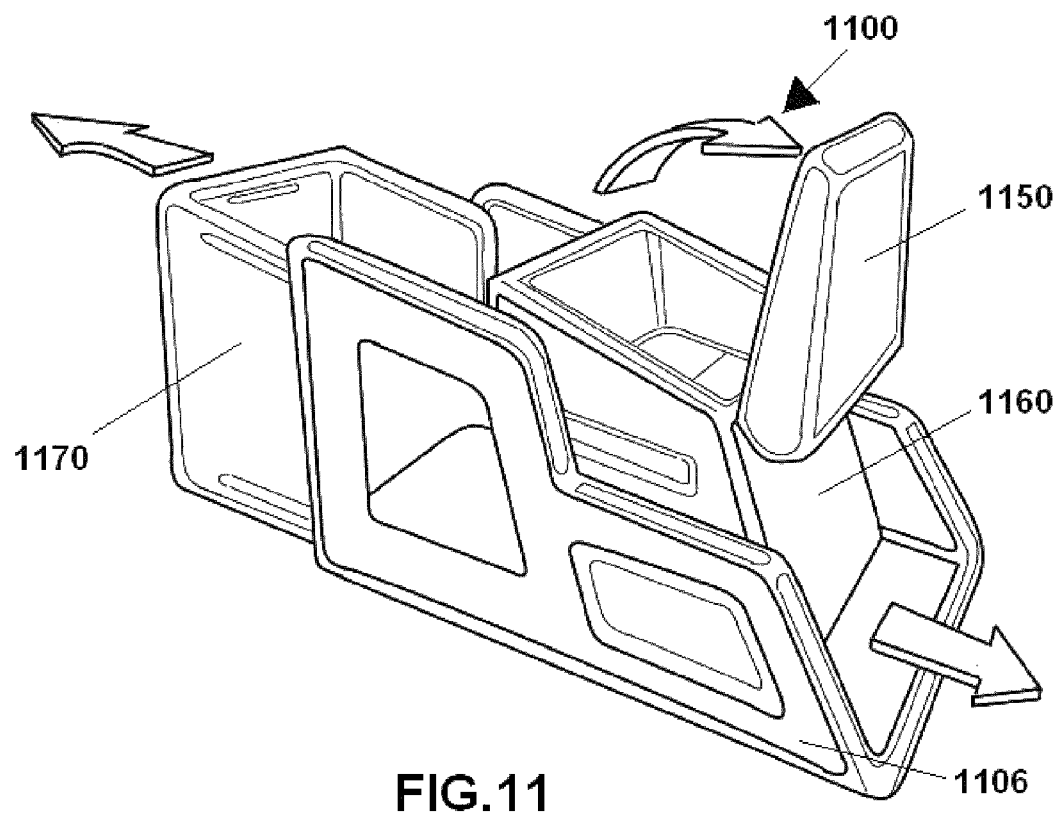
FIG. 11 is a perspective view of the second embodiment of the longitudinally sliding storage compartment, illustrating a storage container extendable into a second row of seating.
Figure 12:
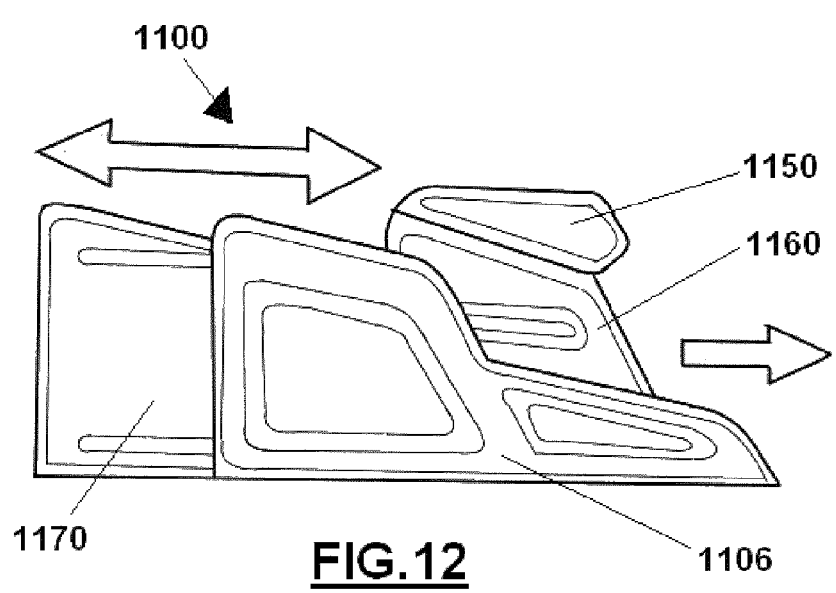
FIG. 12 is a side view of the second embodiment of the longitudinally sliding storage compartment, illustrating the storage container extendable into the second row of seating.

FIGS. 11 and 12 are a perspective view and a side view, respectively, of the second embodiment of the longitudinally sliding storage compartment 1160, illustrating a storage container extendable into a second row of seating. The illustrated frame 1106 retains and/or guides the storage bin 1160 and a second row storage drawer 1170. The storage bin 1160 and the second row storage drawer 1170 move along the same or similar paths within the frame 1106, but in various exemplary embodiments cannot occupy the same space. As such, when the storage bin 1160 is moved forward, the second row storage drawer 1170 can either be extended out toward the rear of the vehicle, or pushed in behind the storage bin 1160. Similarly, when the second row storage drawer 1170 is extended out toward the rear of the vehicle, the storage bin 1160 can either be moved forward or pushed back in front of the second row storage drawer 1170.

Figure 13:
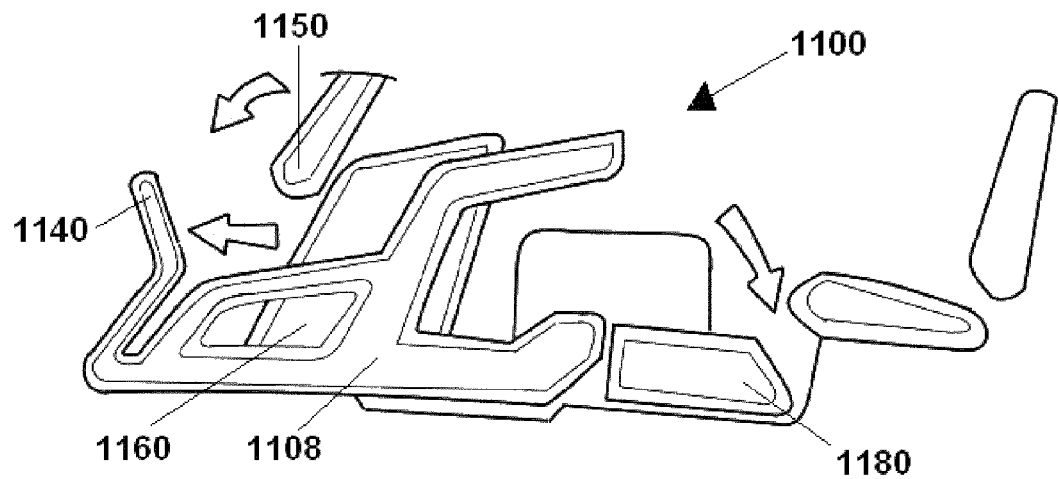
FIG. 13 is a side view of the second embodiment of the longitudinally sliding storage compartment, illustrating a door rotatable into the second row of seating in a lowered position.

FIG. 13 is a side view of the second embodiment of the longitudinally sliding storage compartment 1160, illustrating a door rotatable into the second row of seating in a lowered position. As illustrated, the present frame 1108 has a second row door 1180 instead of the second row storage drawer 1170, shown in FIGS. 11 and 12. The frame 1108 also reincorporates the removable control panel 1140 shown in FIG. 10. The second row door 1180 allows access to the area behind the storage bin 1160 for occupants of the second row of seating. Furthermore, the door 1180 and/or the frame 1108 are configured to block movement of cargo positioned within the door 1180 and/or frame 1108, thereby securing items within the floor console 1100.

Figure 14:
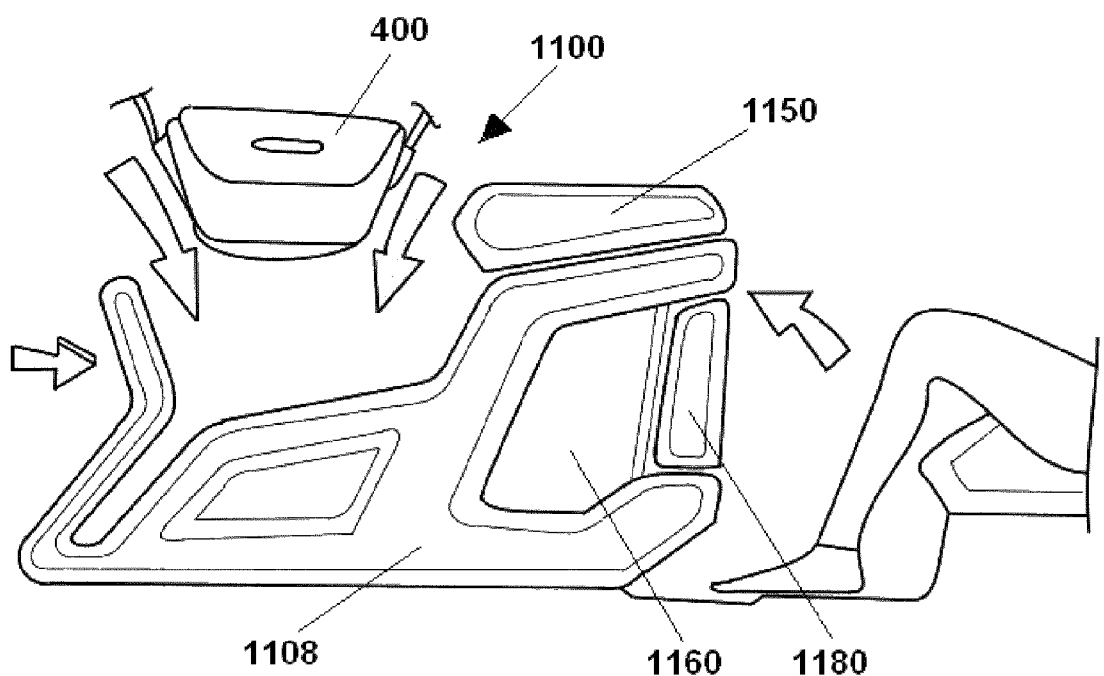
FIG. 14 is a side view of the second embodiment of the longitudinally sliding storage compartment, illustrating the door rotatable into the second row of seating in a raised position.

FIG. 14 is a side view of the second embodiment of the longitudinally sliding storage compartment, illustrating the door 1180 rotatable into the second row of seating in a raised position. As illustrated, when the second row door 1180 is closed and the storage bin 1160 is pushed back, the open space in front of the storage bin 1160 can be used to store one or more large, self contained objects, such as a purse 400, a backpack, a grocery bag and/or any other self contained object. Furthermore, positioning the door 1180 in the raised position establishes significantly more leg room for passengers within the second row of seating.

Figure 15:
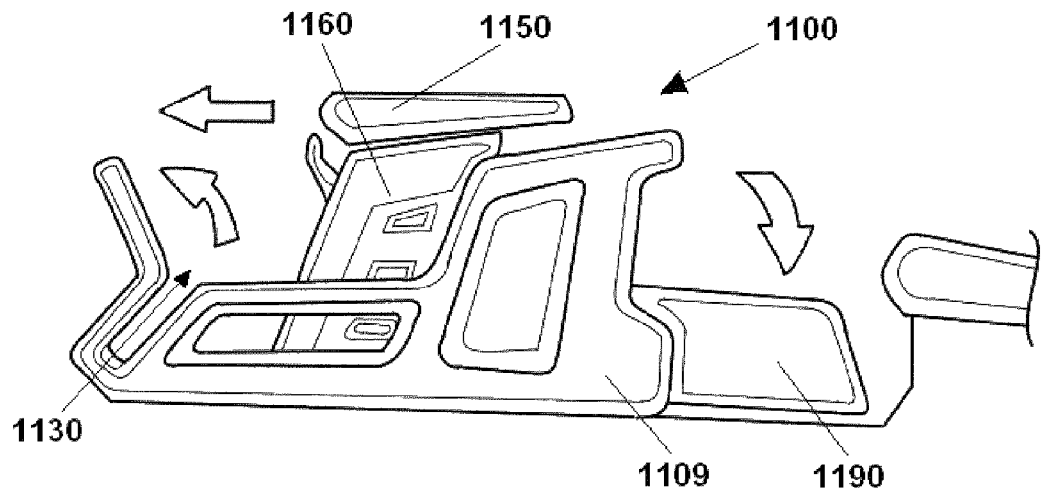
FIG. 15 is a side view of the second embodiment of the longitudinally sliding storage compartment, illustrating a storage container rotatable into the second row of seating in a lowered position.

FIG. 15 is a side view of the second embodiment of the longitudinally sliding storage compartment 1160, illustrating a storage container rotatable into the second row of seating in a lowered position. As illustrated, the frame 1109 has a second row storage bin 1190 rather than the second row door 1180. The second row storage bin 1190 is attached by a hinge to the frame 1109, and may be rotated toward the rear of the vehicle to access items within the second row storage bin 1190. In contrast to the second row door 1180, the second row storage bin 1190 has its own defined storage space rather than allowing access to any space behind the storage bin 1160.

Figures 16, 16A:
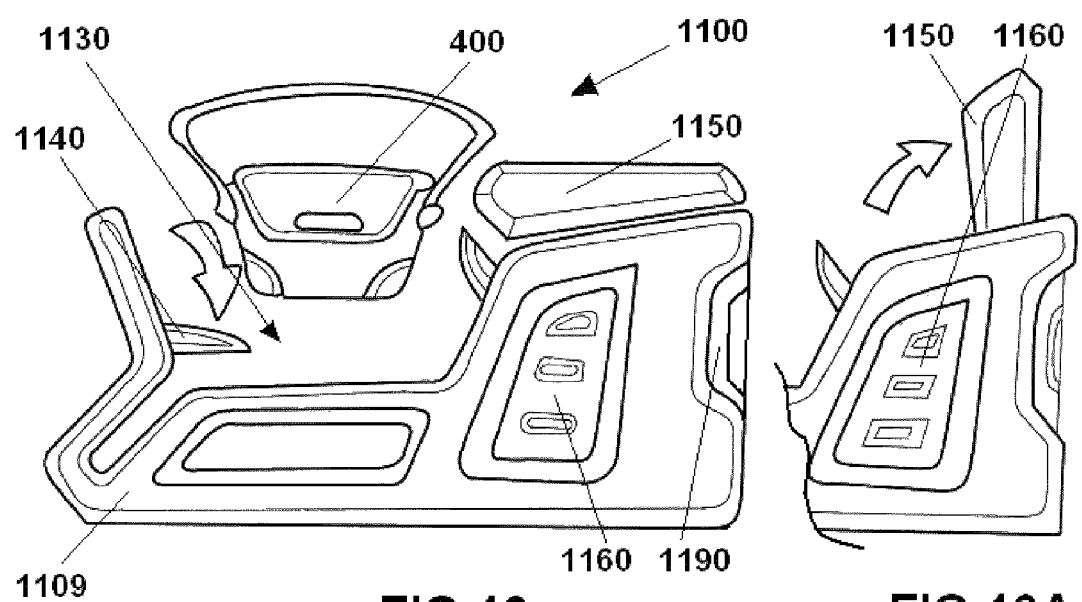
FIGS. 16 and 16A are side views of the second embodiment of the longitudinally sliding storage compartment, illustrating the storage container rotatable into the second row of seating in a raised position.

FIGS. 16 and 16A are side views of the second embodiment of the longitudinally sliding storage compartment, illustrating the storage container 1190 rotatable into the second row of seating in a raised position. As illustrated, rotating the second row storage bin 1190 into the raised position establishes significantly more leg room for passengers within the second row of seating. Furthermore, the storage bin 1160 may be configured such that the armrest 1150 is connected by a hinge at the rear of the storage bin 1160 rather than at the front of the storage bin 1160.

Figure 17:
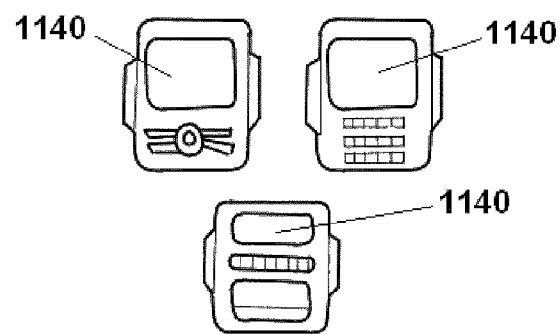
FIG. 17 is a front view of first, second and third exemplary embodiments of a control panel mountable on the floor console.

FIG. 17 is a front view of first, second and third exemplary embodiments of a control panel 1140 mountable on the floor console 1100. The control panel 1140 may be utilized to adjust system settings, user preferences or any other electrically-controlled aspect of the vehicle in which the floor console 1100 is installed. For example, in certain embodiments, the control panel 1140 may facilitate transmission gear selection, activation of a parking brake, control of snow plow features, control of towing features, and/or control of various vehicle systems.

It should be appreciated that this second exemplary embodiment of the vehicle floor console 1100 includes various components which may be optional and/or interchangeable. In such cases, some components not explicitly shown or described together may be usable together. As such, it should be appreciated that any of these components may be integrated into any of the outlined configurations.

Armrest Suspended Above Open Storage Space

Figure 18:
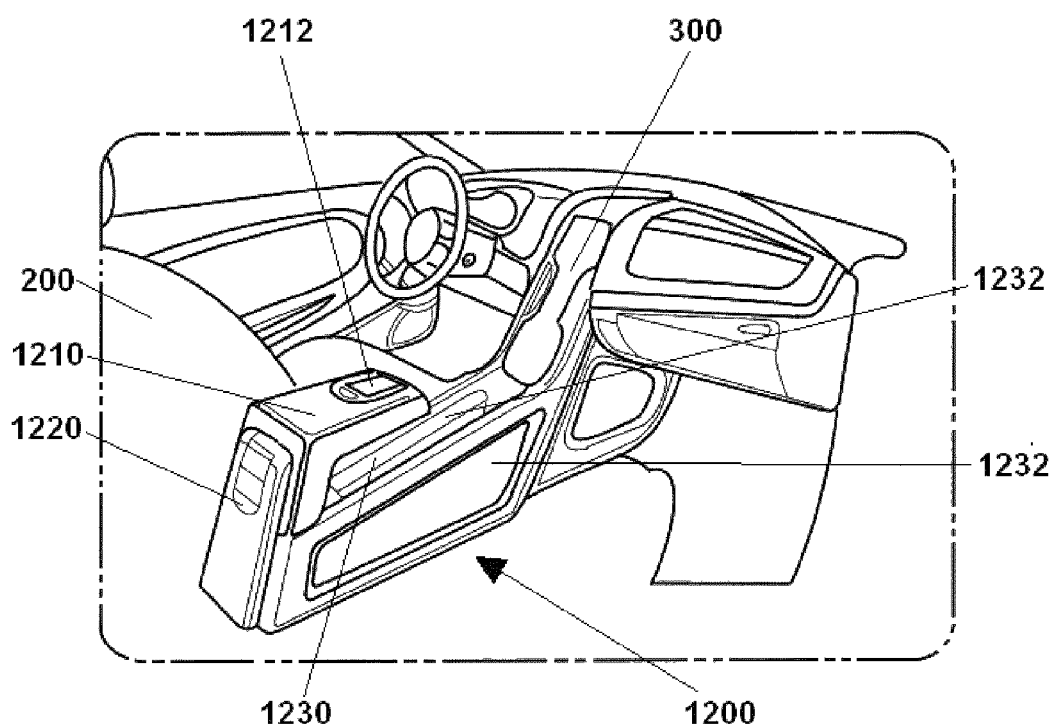
FIG. 18 is a perspective view of a vehicle interior including a vehicle floor console having an armrest suspended above an open storage space.

FIG. 18 is a perspective view of a vehicle interior including a vehicle floor console 1200 having an armrest suspended above an open storage space. The vehicle interior includes a driver seat 200 and a passenger seat. As illustrated, the instrument panel 300 of the vehicle interior has drive-by-wire controls and/or film displays, film controls and/or other control features for an emergency brake and transmission controls. With the emergency brake and transmission controls located in the instrument panel 300, more space is available between the driver seat 200 and the passenger seat. The vehicle floor console 1200 is located in the available space between the driver seat 200 and the passenger seat. The vehicle floor console 1200 has an armrest 1210 located on the top of the vehicle floor console 1200. The armrest 1210 also has a control panel 1212 located on its top surface. A storage bin 1220 is located beneath the armrest 1210. In front of the storage bin 1220 is a storage space 1230. The storage space 1230 is defined by a pair of panels 1232 on two of its sides. The panels 1232 may be illuminated to add ambient light to the car interior, as well as to assist in finding objects placed in the storage space 1230.

Figure 19:
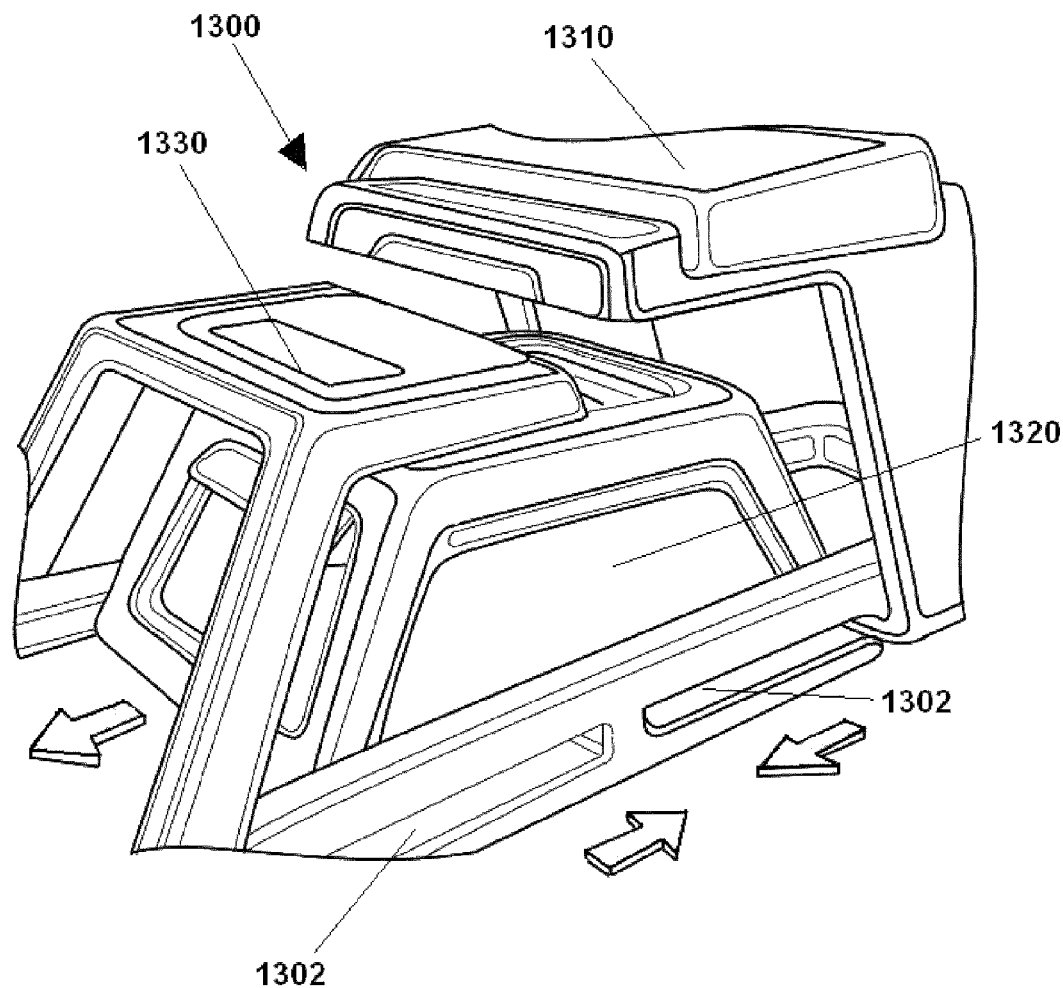
FIG. 19 is a perspective view of a first embodiment of the armrest suspended above the open storage space, including a slidable storage compartment disposed within the open storage space.

FIG. 19 is a perspective view of a first embodiment of the armrest suspended above the open storage space, including a slidable storage compartment disposed within the open storage space. As illustrated, the vehicle floor console 1300 includes an armrest 1310, a storage bin 1320 and a control panel 1330. The armrest 1310 and the control panel 1330 can slide forward and backward along a path defined by grooves 1302 in the vehicle floor console 1300. Similarly, the storage bin 1320 can slide forward and backward beneath the control panel 1330 and the armrest 1310.

Figure 20:
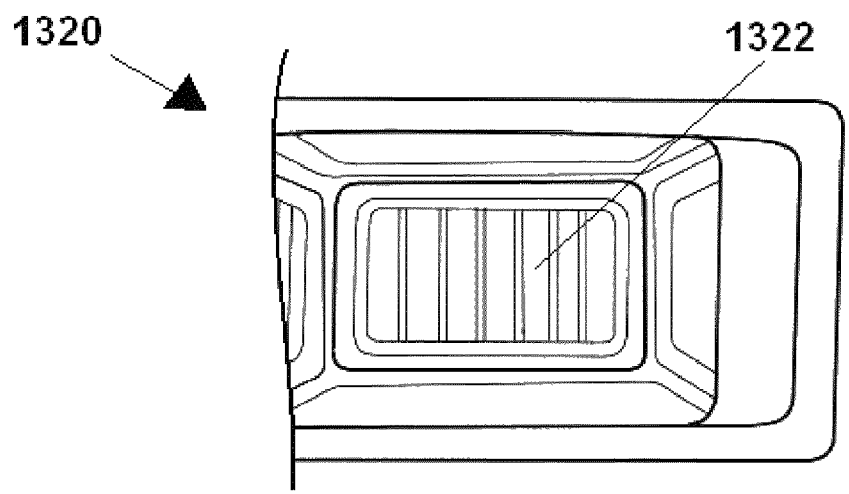
FIG. 20 is a top view of the slidable storage compartment, including a horizontal tambour door.

FIG. 20 is a top view of the slidable storage compartment 1320, including a horizontal tambour door 1322. As will be appreciated, the door 1322 may be transitioned from the illustrated closed position to an open position to facilitate access to items within an interior of the compartment 1320.

Figure 21:
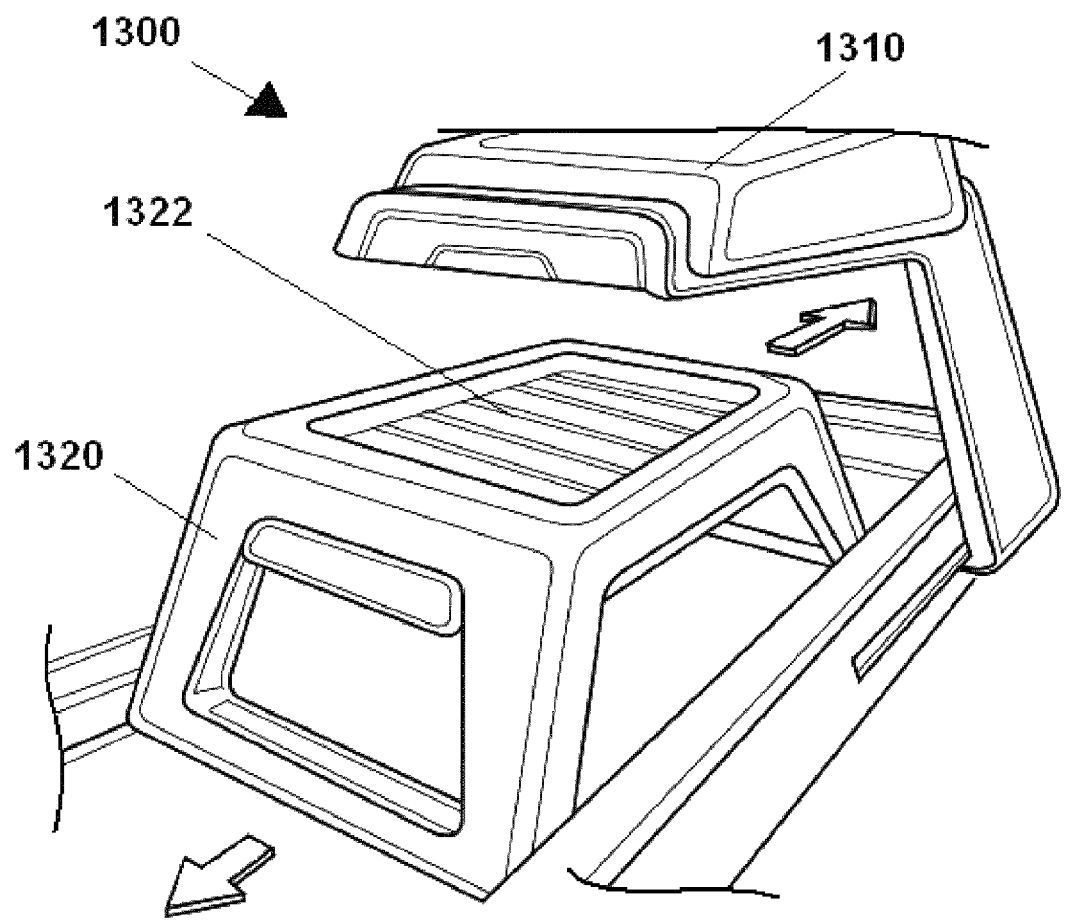
FIG. 21 is a perspective view of the first embodiment of the armrest suspended above the open storage space, including a slidable and removable storage compartment disposed within the open storage space.
Figure 22:
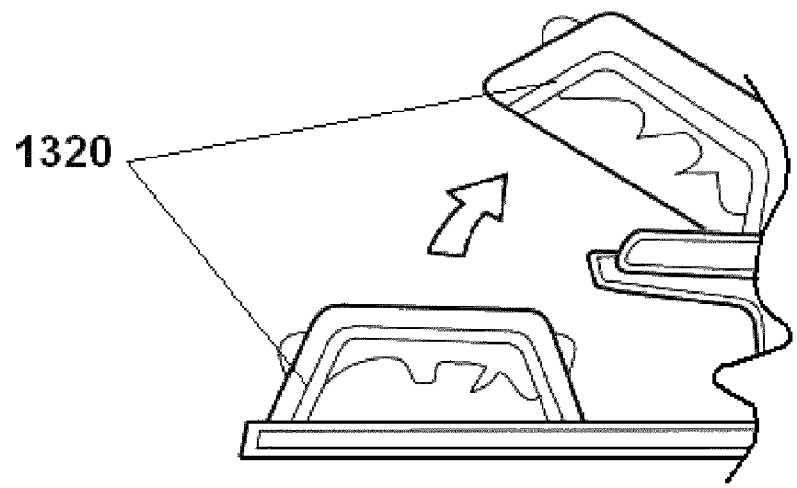
FIG. 22 is a side view of the slidable and removable storage compartment, illustrating the removal process.

FIG. 21 is a perspective view of the first embodiment of the armrest suspended above the open storage space, including a slidable and removable storage compartment 1320 disposed within the open storage space. As illustrated, the storage bin 1320 may be translated in the longitudinal direction toward the front or rear of the vehicle. As shown in FIG. 22, the storage bin 1320 may be removed from the vehicle floor console 1300. Specifically, to remove the storage bin 1320 and its contents from the vehicle floor console 1300, the storage bin 1320 may be moved in front of the armrest 1310 and then lifted out of the vehicle floor console 1300, as shown. As discussed in detail below, a vehicle owner may configure multiple removable storage bins 1320 for various driving situations. For example, one storage bin 1320 may be packed with work related items, while another storage bin is packed with items intended for a vacation. After work, the vehicle owner may remove the first storage bin 1320, and insert the second bin. Such an operation may significantly reduce the duration of loading and unloaded a vehicle.

Figure 23:
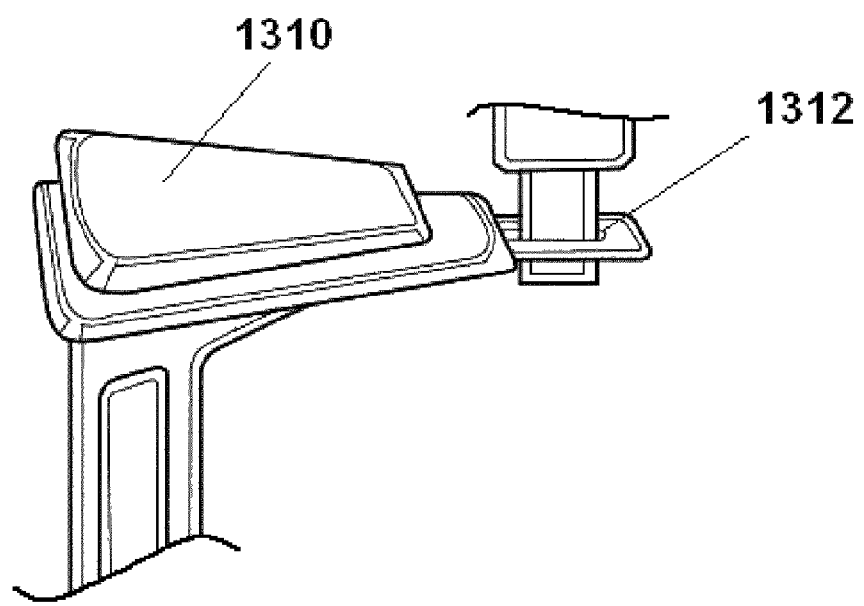
FIG. 23 is a side view of the armrest suspended above the open storage space, including a cup holder disposed at the front portion of the armrest.
Figure 24:
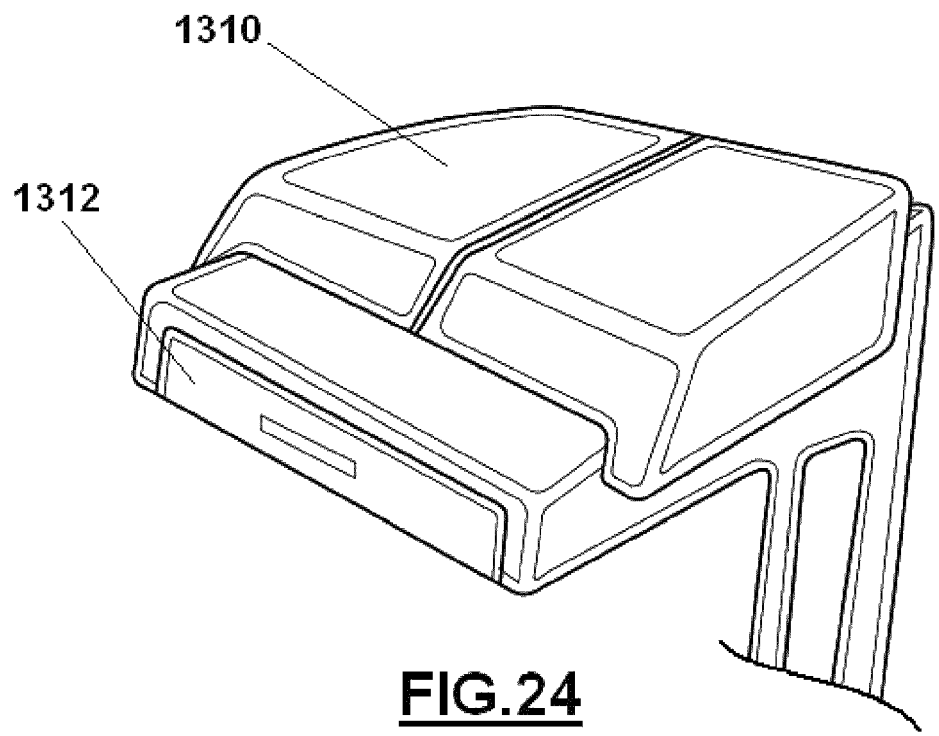
FIG. 24 is a perspective view of the armrest suspended above the open storage space, including a retractable cup holder in a retracted position.
Figure 25:
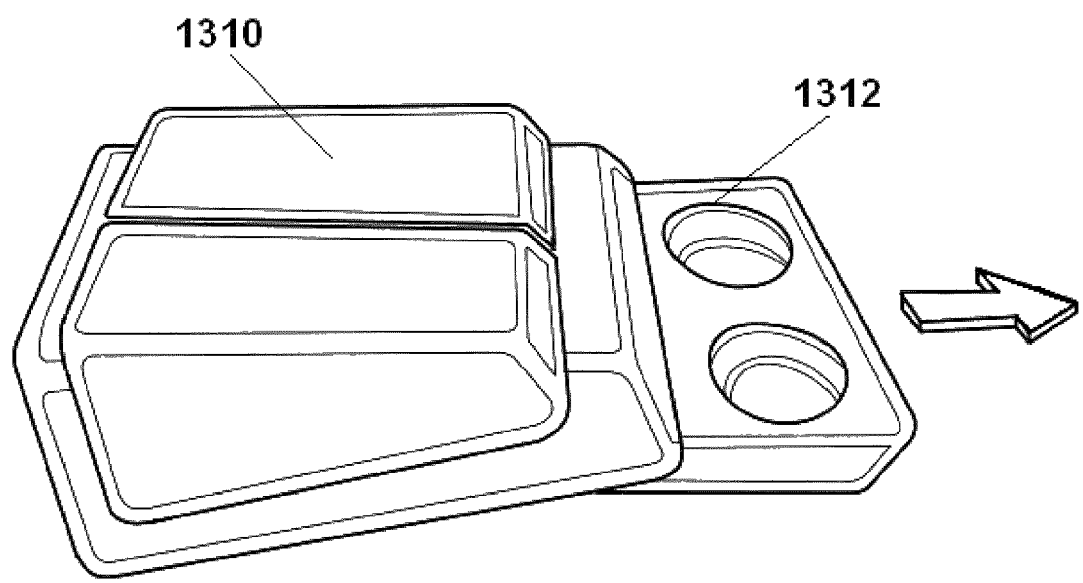
FIG. 25 is a perspective view of the armrest suspended above the open storage space, including the retractable cup holder in an extended position.

FIG. 23 is a side view of the armrest 1310 suspended above the open storage space, including a cup holder 1312 disposed at the front portion of the armrest. As illustrated, the cup holder tray 1312 can extend out from the armrest 1310 to support a drink cup. As shown in FIG. 24, when not in use, the cup holder tray 1312 may be concealed inside the armrest 1310. FIG. 25 is a perspective view of the armrest 1310 suspended above the open storage space, including the retractable cup holder 1312 in an extended position. As illustrated, the cup holder tray 1312 extended out from the armrest 1310 is ready to accept and support a drink cup.

Figure 26:
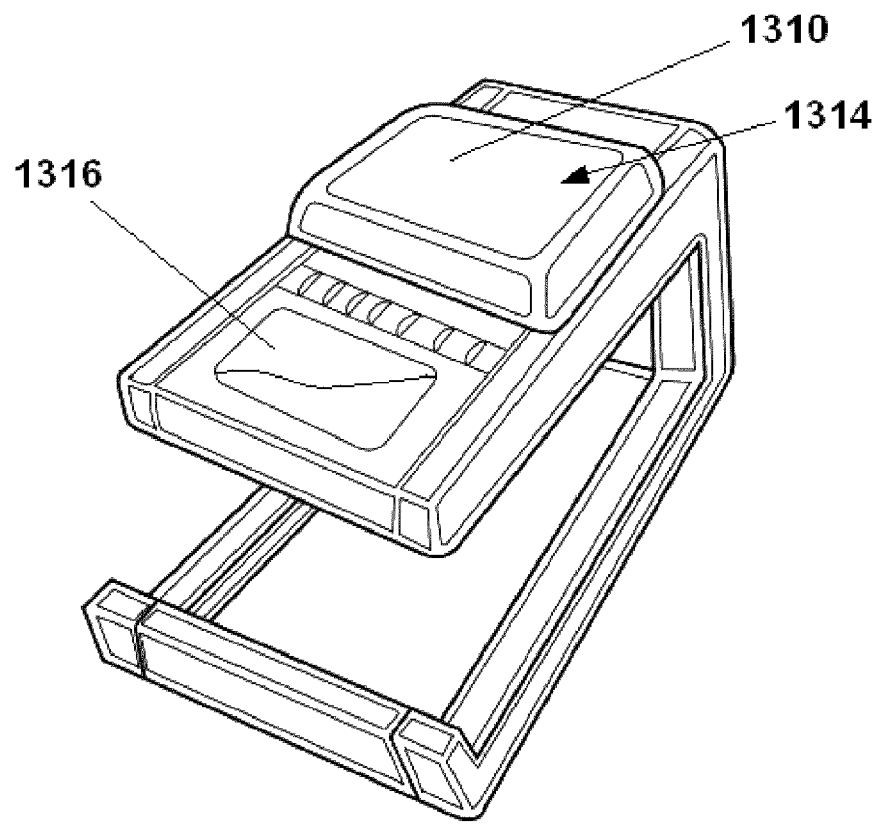
FIG. 26 is a perspective view of the first embodiment of the armrest suspended above the open storage space, including a control panel disposed forward of the armrest.

FIG. 26 is a perspective view of the first embodiment of the armrest 1310 suspended above the open storage space, including a control panel 1316 disposed forward of the armrest. As illustrated, the armrest 1310 may be fixed to the vehicle floor console 1300, rather than being able to slide, as shown in FIGS. 19 and 21. Additionally, a pad 1314 of the armrest 1310 may slide back to reveal a built-in control panel 1316.

Figure 27:
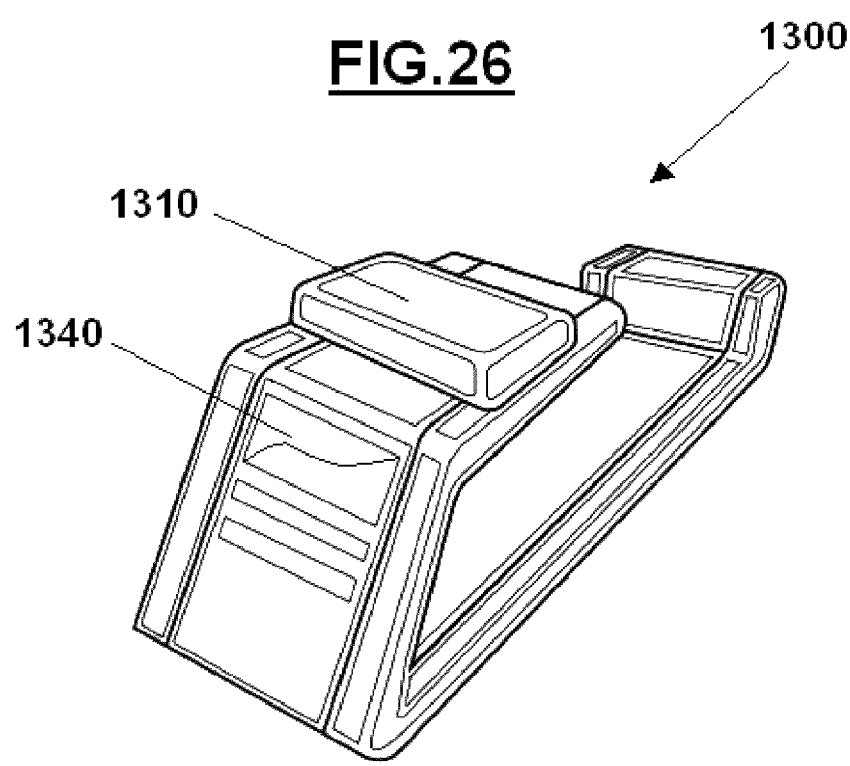
FIGS. 27 and 27A are perspective and side views of the first embodiment of the armrest suspended above the open storage space, including a control panel disposed behind the armrest.
Figure 27A:
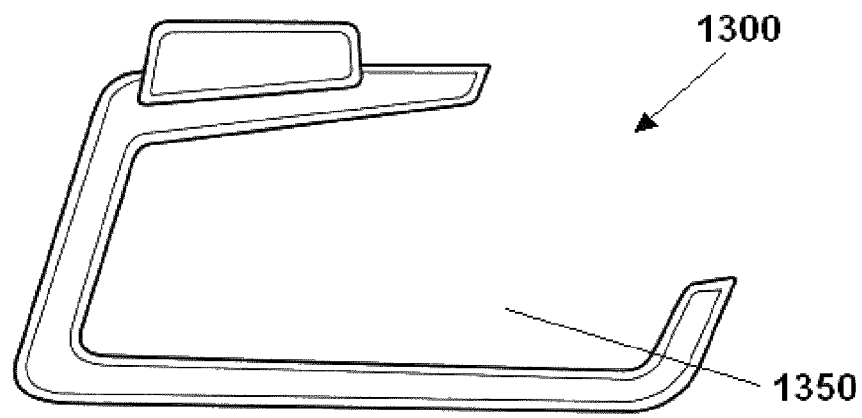

FIGS. 27 and 27A are perspective and side views of the first embodiment of the armrest 1310 suspended above the open storage space, including a control panel disposed behind the armrest. As shown in FIG. 27, the vehicle floor console 1300 may have a rear control panel 1340, which may be removable from the rear surface of the console. As shown in FIG. 27A, without the storage bin 1320 and the control panel 1330 beneath the armrest 1310, a large storage area 1350 is provided beneath the armrest 1310.

Figure 28:
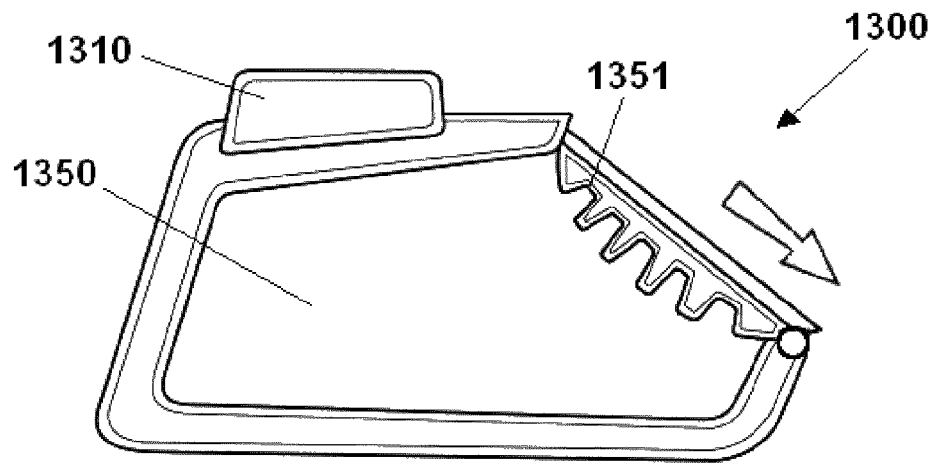
FIG. 28 is a side view of a second embodiment of the armrest suspended above the open storage space, including a retractable fabric cover extendable over a front portion of the floor console.

FIG. 28 is a side view of a second embodiment of the armrest suspended above the open storage space, including a retractable fabric cover extendable over a front portion of the floor console. As illustrated, a hammock-style covering 1351 is positioned over the front surface of the large storage space 1350. The hammock-style covering 1351 may extend out from the armrest 1310 and may be retractable when not in use. As discussed in detail below, the covering itself may serve as an additional storage space. Specifically, by extending the covering 1351 into the illustrated position, an expandable storage space is established within the curvature of the covering. For example, the natural curve of the fabric covering 1351 may serve to secure small items such as keys, access cards, sunglasses, etc. Consequently, a driver or front passenger may create an additional storage space by extending the covering 1351 into the extended position.

Figure 29:
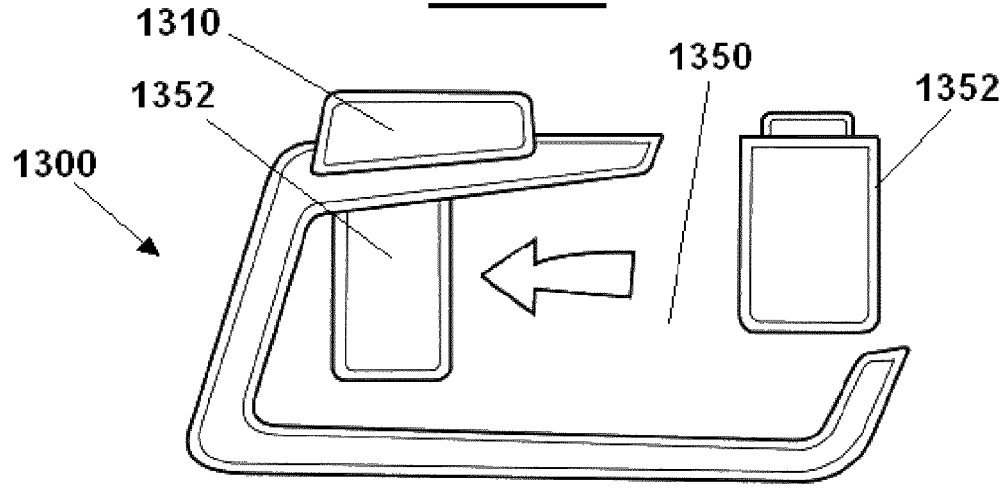
FIG. 29 is a side view of a third embodiment of the armrest suspended above the open storage space, including a railing configured to suspend removable storage containers.

FIG. 29 is a side view of a third embodiment of the armrest 1310 suspended above the open storage space, including a railing configured to suspend removable storage containers. As illustrated, a storage bag 1352 may be attached to the undersurface of the armrest 1310 as another way of making use of the large storage area 1350. As will be appreciated, various storage bags 1352 may be utilized, including backpacks and purses, as well as bags particularly configured to mount to the rails.

Figure 30:
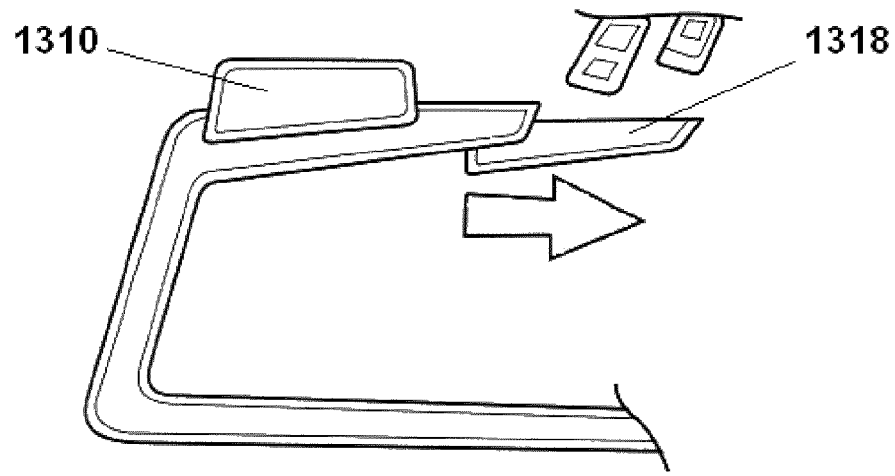
FIG. 30 is a side view of the third embodiment of the armrest suspended above the open storage space, including a retractable storage container disposed at a front portion of the armrest.

FIG. 30 is a side view of the third embodiment of the armrest suspended above the open storage space, including a retractable storage container or drawer 1318 disposed at a front portion of the armrest. The drawer 1318 can be used to store small items and may have an inductive charger provided within the drawer 1318 to charge small electronic devices, such as cell phones, media players or the like.

Figure 31:
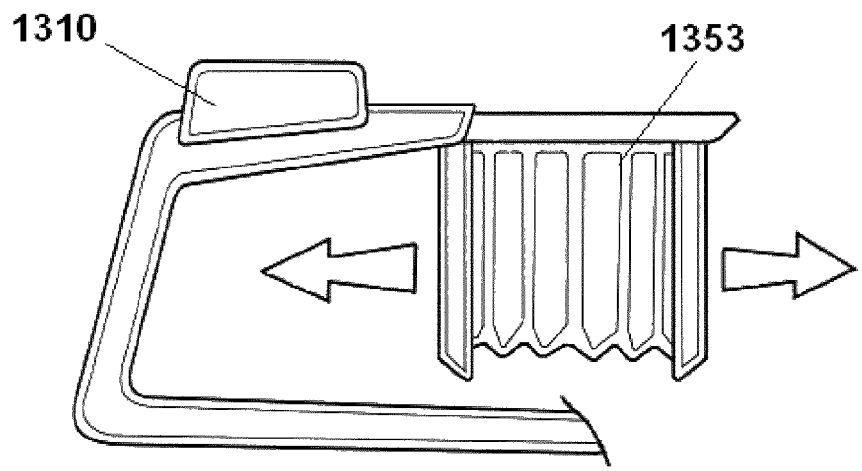
FIG. 31 is a side view of the third embodiment of the armrest suspended above the open storage space, illustrating an expandable and removable storage container.
Figure 32:
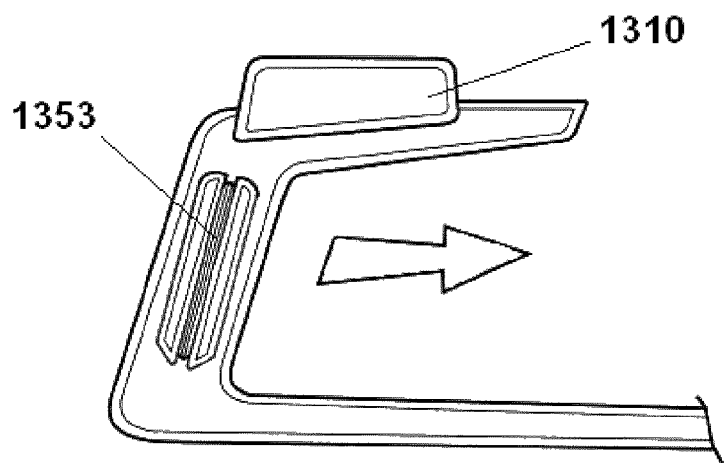
FIG. 32 is a side view of the third embodiment of the armrest suspended above the open storage space, illustrating the expandable and removable storage container in a collapsed position.
Figure 33:
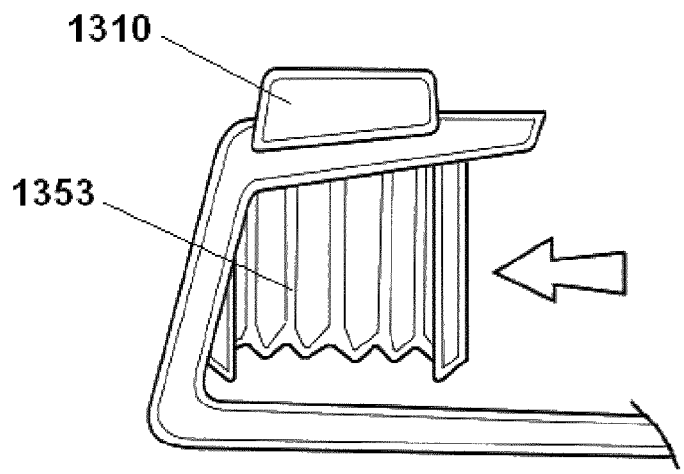
FIG. 33 is a side view of the third embodiment of the armrest suspended above the open storage space, illustrating the expandable and removable storage container in an expanded position.

FIG. 31 is a side view of the third embodiment of the armrest suspended above the open storage space, illustrating an expandable and removable storage container. As illustrated, an expandable storage bag 1353 may be extended out beyond the armrest 1310. Furthermore, the bag 1353 may be collapsed and stored underneath the armrest 1310, as shown in FIG. 32, or expanded and positioned beneath the armrest 1310, as shown in FIG. 33.

Figure 34:
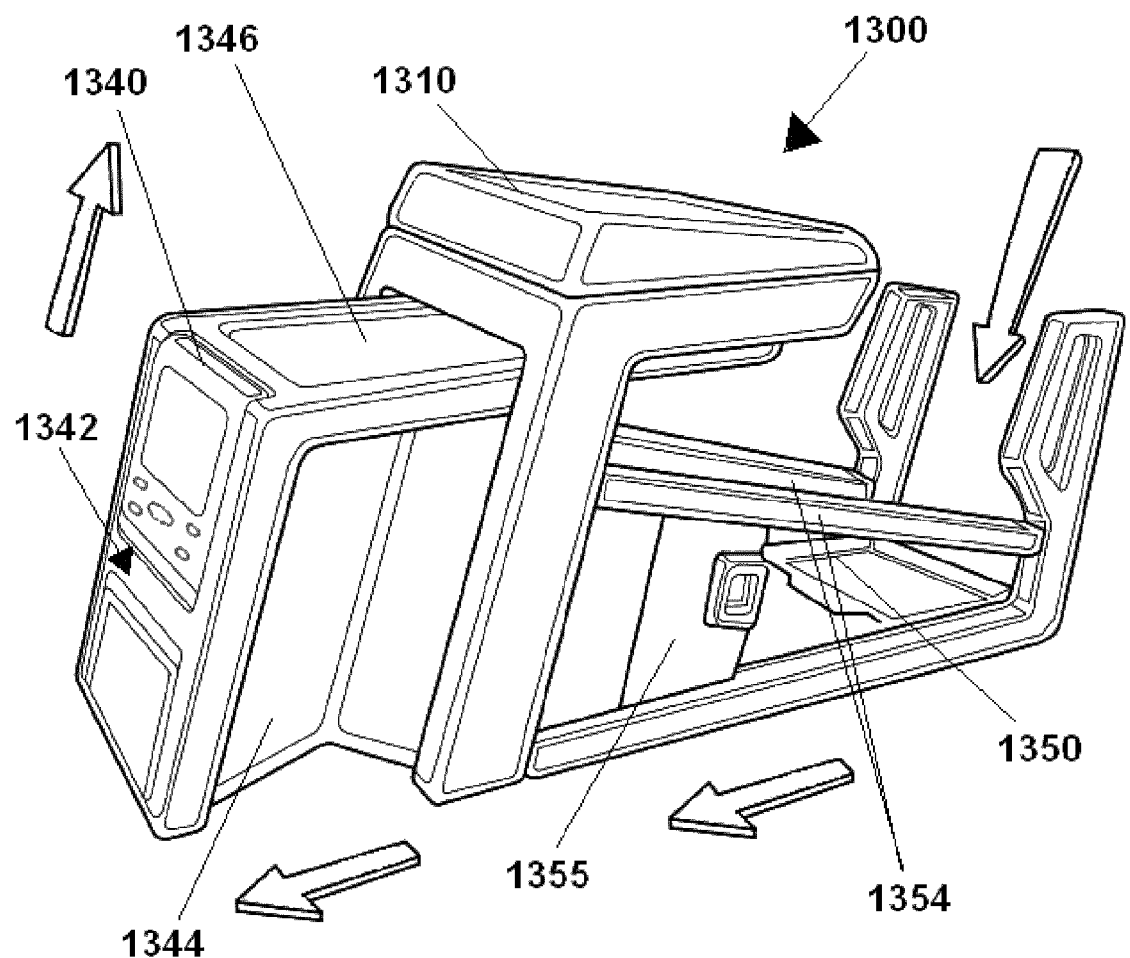
FIG. 34 is a perspective view of a fourth embodiment of the armrest suspended above the open storage space, including a storage container expandable into the second row of seating.

FIG. 34 is a perspective view of a fourth embodiment of the armrest suspended above the open storage space, including a storage container expandable into the second row of seating. As illustrated, a pair of rails 1354 are provided on the sides of the storage area 1350 to better define the storage area 1350 and to confine objects placed in the storage area 1350. Additionally, soft sided panels 1355 may be provided to optionally close or open the sides of the storage area 1350. Also shown in FIG. 34, the back of the vehicle floor console 1300 may have a surface 1342 that can be extended out from under the armrest 1310, expanding side panels 1344, to provide a storage pouch 1346.

Figure 35:
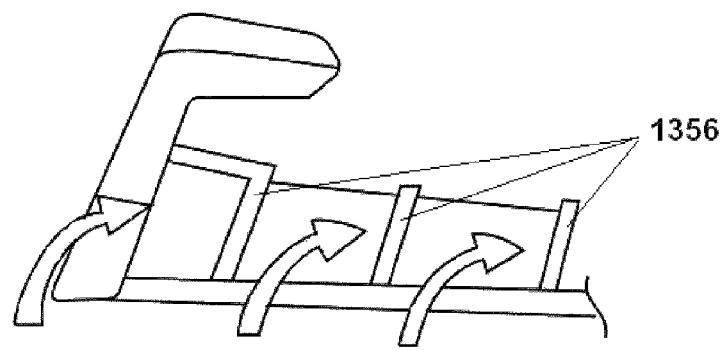
FIG. 35 is a cross-sectional side view of a fifth embodiment of the armrest suspended above the open storage space, including collapsible dividers disposed within the open storage space.

FIG. 35 is a cross-sectional side view of a fifth embodiment of the armrest suspended above the open storage space, including collapsible dividers disposed within the open storage space. As illustrated, the floor of the storage space 1350 includes collapsible dividers 1356 which can be collapsed or expanded to separate items within the storage space 1350. The dividers 1356 flip up to be expanded and flip down to be collapsed.

Vertical Tambour Door

Figure 36:
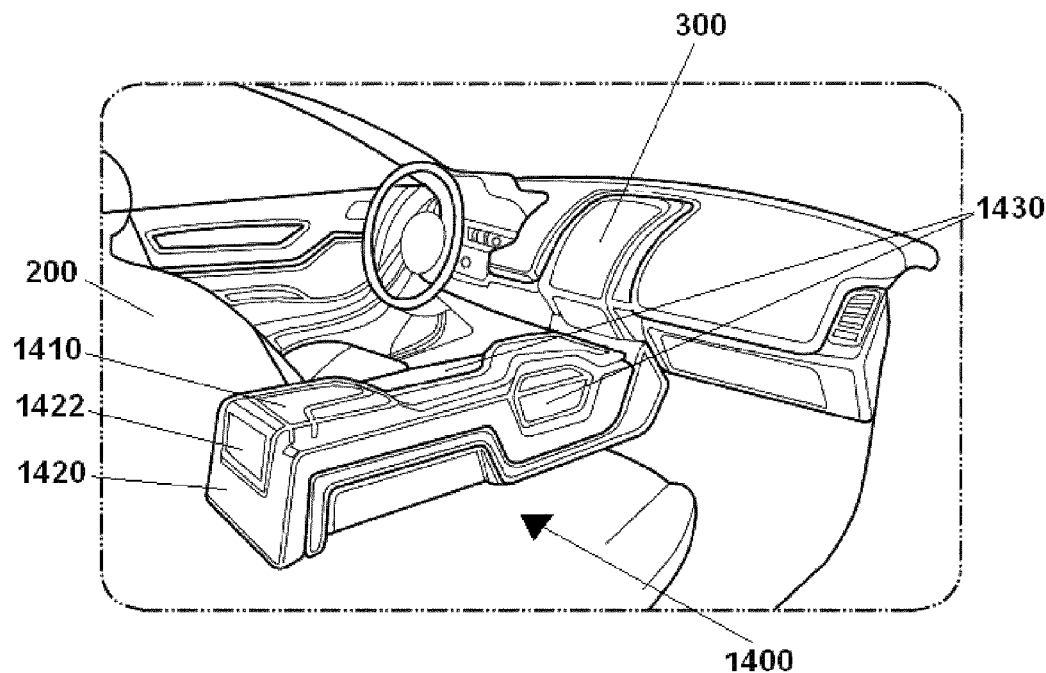
FIG. 36 is a perspective view of a vehicle interior including a vehicle floor console having vertical tambour doors.

FIG. 36 is a perspective view of a vehicle interior including a vehicle floor console 1400 having vertical tambour doors. The interior of the vehicle has a driver seat 200 and a passenger seat (not shown). As illustrated, an instrument panel 300 of the vehicle has controls for an emergency brake and transmission controls. These controls are thin-film controls with adjustable content and adjustable color ribbon lighting. With the emergency brake and transmission controls located in the instrument panel 300, more space is available between the driver seat 200 and the passenger seat for a vehicle floor console. The vehicle floor console 1400 is located in the available space between the driver seat 200 and the passenger seat. An armrest 1410 is located at the top of the vehicle floor console 1400. The armrest 1410 is asymmetrical and adjustable to conform to the needs of the users. Beneath the armrest 1410 is a storage bin 1420 which has a detachable rear seat control panel 1422. A storage space 1430 is provided at the front of the storage bin 1420. The storage space 1430 may be part of the adjustable armrest 1410 and may include interchangeable utility trays. The utility trays may be interchanged to provide different functionality, such as cup holders, different storage and/or an E-bin for charging and storing small electronic devices. As discussed in detail below, the storage space 1430 may be enclosed by one or more vertically oriented tambour doors.

Figure 37:
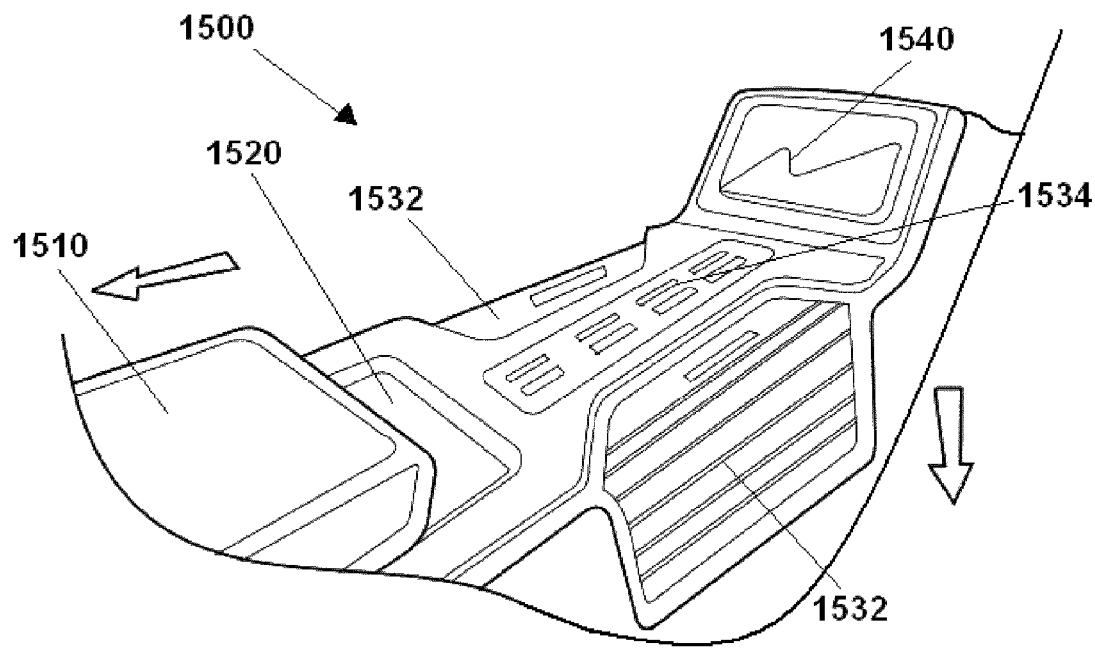
FIG. 37 is a perspective view of a first embodiment of the console having vertical tambour doors, in which each door extends to a center horizontal portion of the console.

FIG. 37 is a perspective view of a first embodiment of the console having vertical tambour doors, in which each door extends to a center horizontal portion of the console. As illustrated, the vehicle floor console 1500 has an armrest 1510, which slides backward to reveal a storage space 1520. Two tambour doors 1532 in front of the armrest 1510 allow access to more storage in the interior of the vehicle floor console 1500. The vertical tambour doors 1532 open to reveal the additional storage. A console interface 1534 with film buttons is located between the tambour doors 1532. As illustrated, each tambour door 1532 extends to the console interface 1534. Furthermore, a control panel with a screen 1540 is located at the front of the vehicle floor console 1500.

Figure 38:
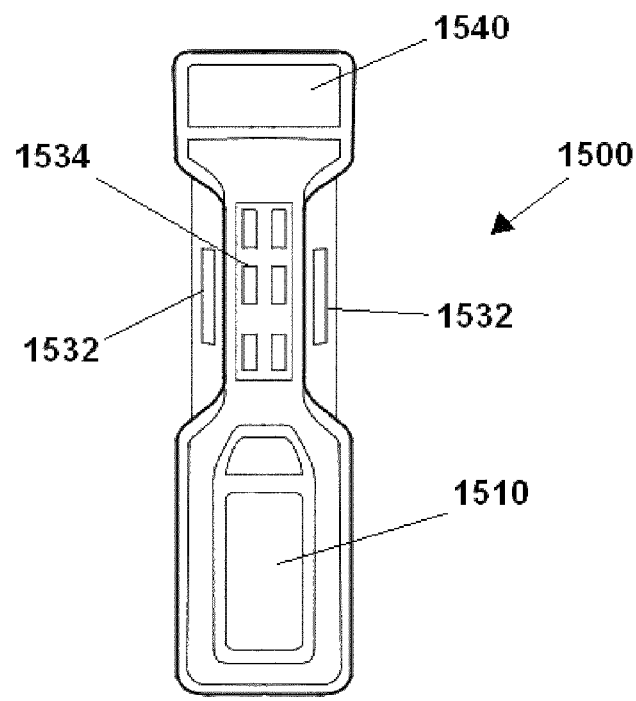
FIG. 38 is a top view of the first embodiment of the console having vertical tambour doors.
Figure 39:
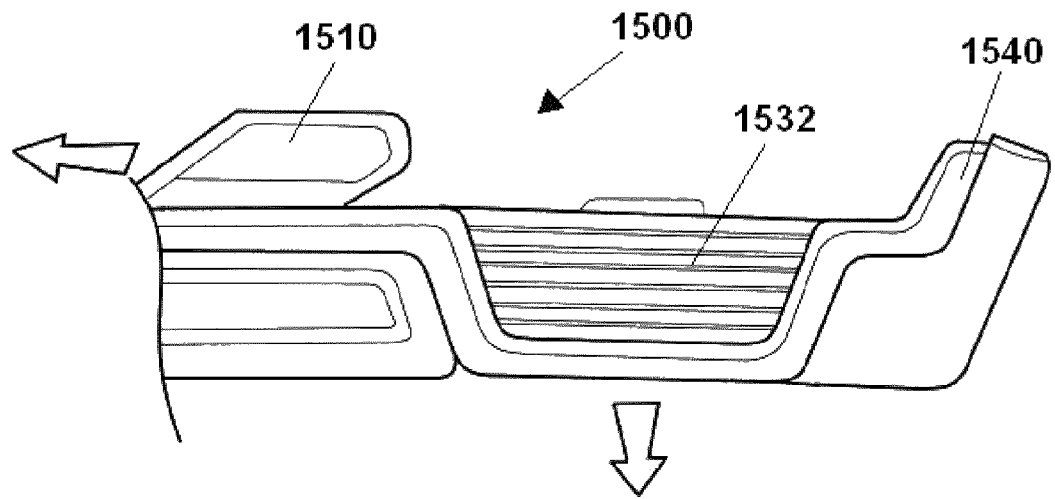
FIG. 39 is a side view of the first embodiment of the console having vertical tambour doors.

FIG. 38 is a top view of the first embodiment of the console 1500 having vertical tambour doors 1532. As illustrated, the console 1500 includes the control panel and screen 1540, the console interface 1534, the tambour doors 1532 and the armrest 1510. As best seen in FIG. 38, the vertical tambour doors 1532 include a horizontal portion that intersects the console interface 1534. Likewise, FIG. 39 is a side view of the control panel and screen 1540, tambour door 1532 and armrest 1510 of the vehicle floor console 1500. As illustrated, the tambour doors 1532 open downward and may be semi-clear or semi-transparent.

Figure 40:
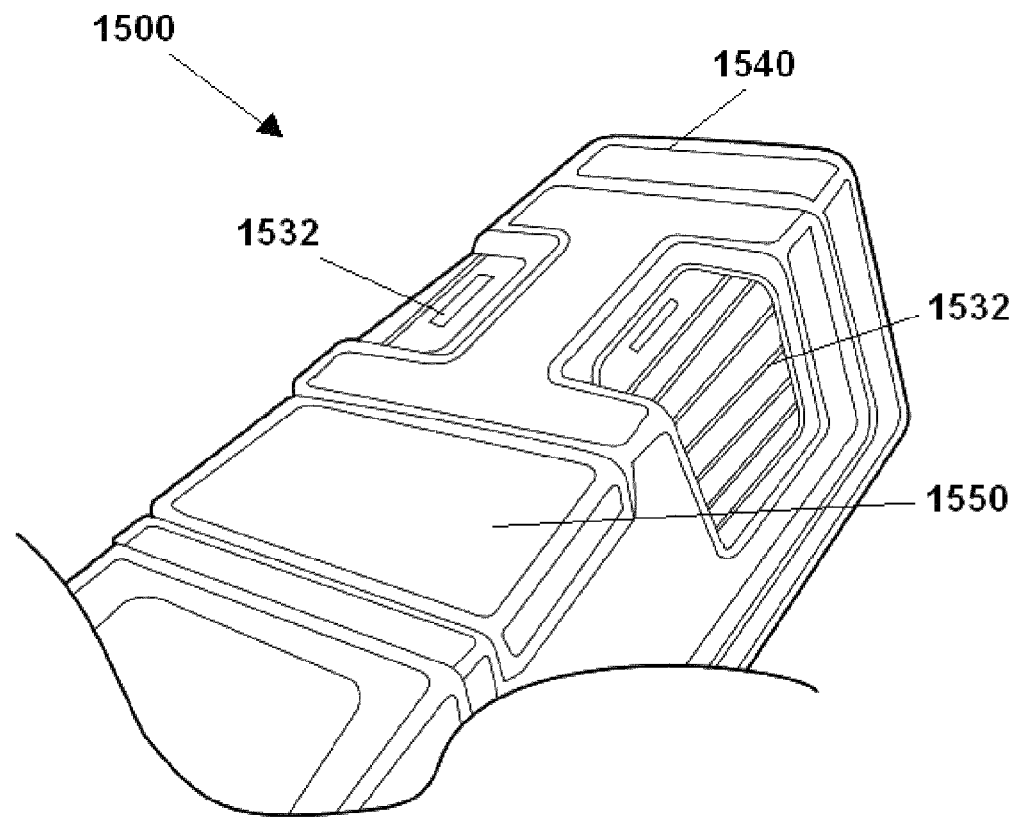
FIG. 40 is a perspective view of the first embodiment of the console having vertical tambour doors, including a single collapsible armrest.

FIG. 40 is a perspective view of the first embodiment of the console 1500 having vertical tambour doors, including a single collapsible armrest 1550. The collapsible or pop-up armrest 1550 can be depressed, as shown in FIG. 40, when not in use, and can be "popped-up" when needed. Additionally, the control panel and screen 1540 can be recessed into the vehicle floor console 1500 when not in use. As shown in FIG. 40, the console interface 1534, shown in FIGS. 37 through 39, may be omitted.

Figure 41:
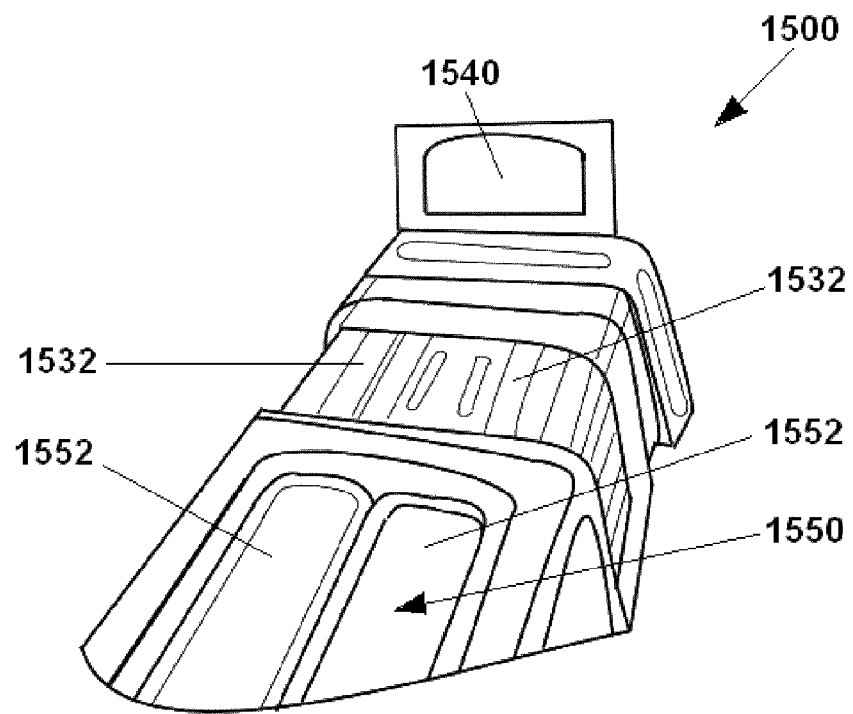
FIG. 41 is a perspective view of a second embodiment of the console having vertical tambour doors, in which the tambour doors contact one another along a horizontal surface of the console.
Figure 42:
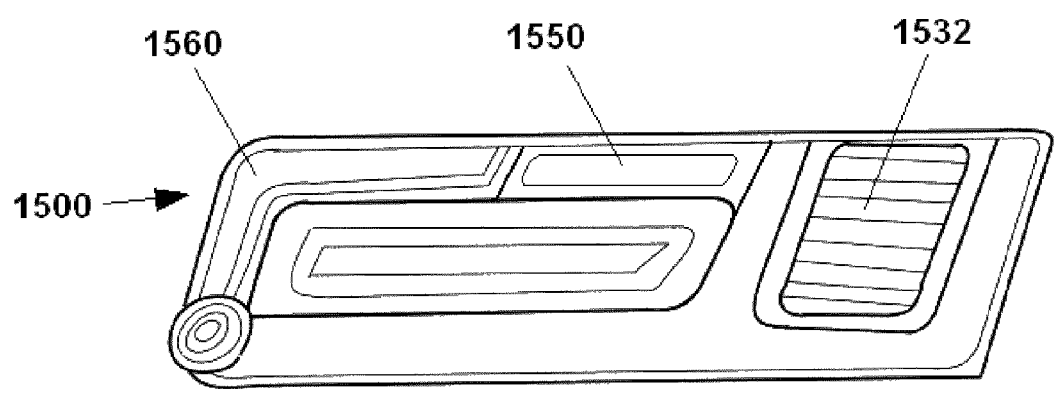
FIG. 42 is a side view of the second embodiment of the console having vertical tambour doors.

FIG. 41 is a perspective view of a second embodiment of the console having vertical tambour doors, in which the tambour doors contact one another along a horizontal surface of the console. As illustrated, the tambour doors 1532 may meet at the middle of the console 1500, and the pop-up armrest 1550 may be split into two halves 1552 which can pop-up or be depressed individually. FIG. 42 is a side view of the second embodiment of the console having vertical tambour doors. As illustrated, when the armrest 1550 is collapsed it is generally flush with the top of the console 1500. Also shown in FIG. 42 is a second row storage door 1560.

Figure 43:
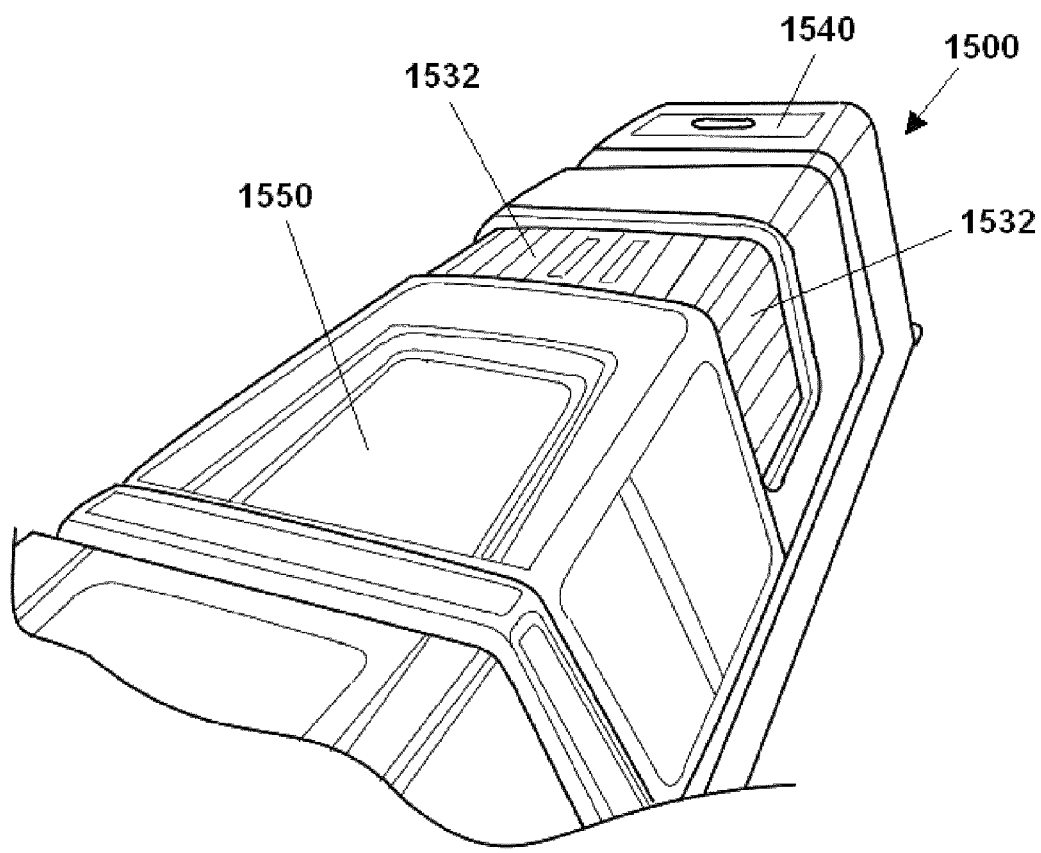
FIG. 43 is a perspective view of the second embodiment of the console having vertical tambour doors, including a single collapsible armrest.
Figure 44:
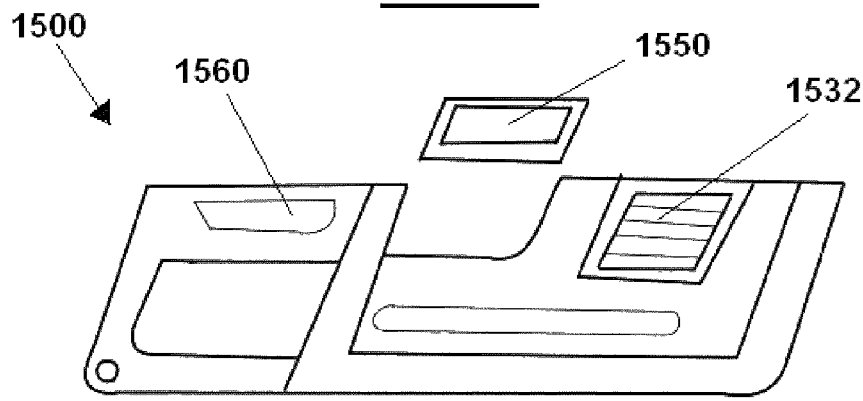
FIG. 44 is a side view of the second embodiment of the console having vertical tambour doors, including the single collapsible armrest.
Figure 45:
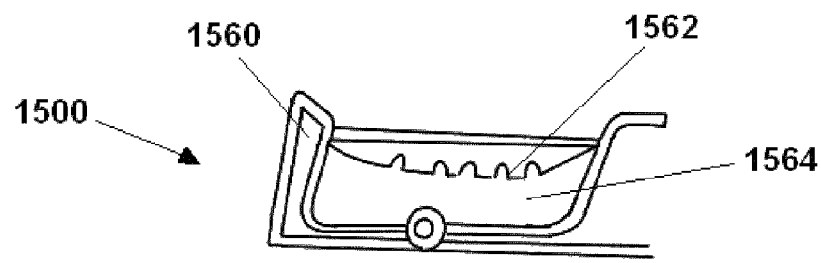
FIG. 45 is a side view of the second embodiment of the console having vertical tambour doors, including a fabric cover enclosing a storage space within the console.

FIG. 43 is a perspective view of the second embodiment of the console having vertical tambour doors, including a single collapsible armrest. As illustrated, console 1500 includes the armrest 1550, which is not necessarily split into separate halves 1552 as shown in FIG. 41, the tambour doors 1532 and the control panel and screen 1540, which is shown collapsed into the vehicle floor console 1500. As shown in FIGS. 44 and 45, the rear storage door 1560 is normally closed and, when opened, reveals a storage space 1564. As shown in FIG. 45, the storage space 1564 may be covered with a hammock style storage divider 1562.

Collapsible Armrest

In certain embodiments, the vehicle floor console includes a support structure and a driver side armrest vertically extendable from the support structure. A position of the driver side armrest is adjustable along a longitudinal axis of a vehicle. The vehicle floor console also includes a passenger side armrest vertically extendable from the support structure. Similar to the driver side armrest, a position of the passenger side armrest is adjustable along the longitudinal axis of the vehicle independently of the driver side armrest. In certain embodiments, the driver side armrest and the passenger side armrest are configured to mount substantially flush with the support structure while in a retracted position. Providing both vertical and longitudinal adjustment of the armrest may enhanced driver and front passenger comfort. Furthermore, by enabling the armrests to collapse and mount substantially flush with the support structure, access between the driver seat and passenger seat may be improved. For example, if a driver attempts to transfer an item (e.g., laptop bag) from the driver side to the passenger side of the vehicle interior, fixed armrests may block passage of the item. In the present embodiment, the driver may collapse both the driver and passenger side armrests into the floor console to establish a clear path between the driver and passenger sides of the vehicle, thereby facilitating transfer of the item.

Figure 46:
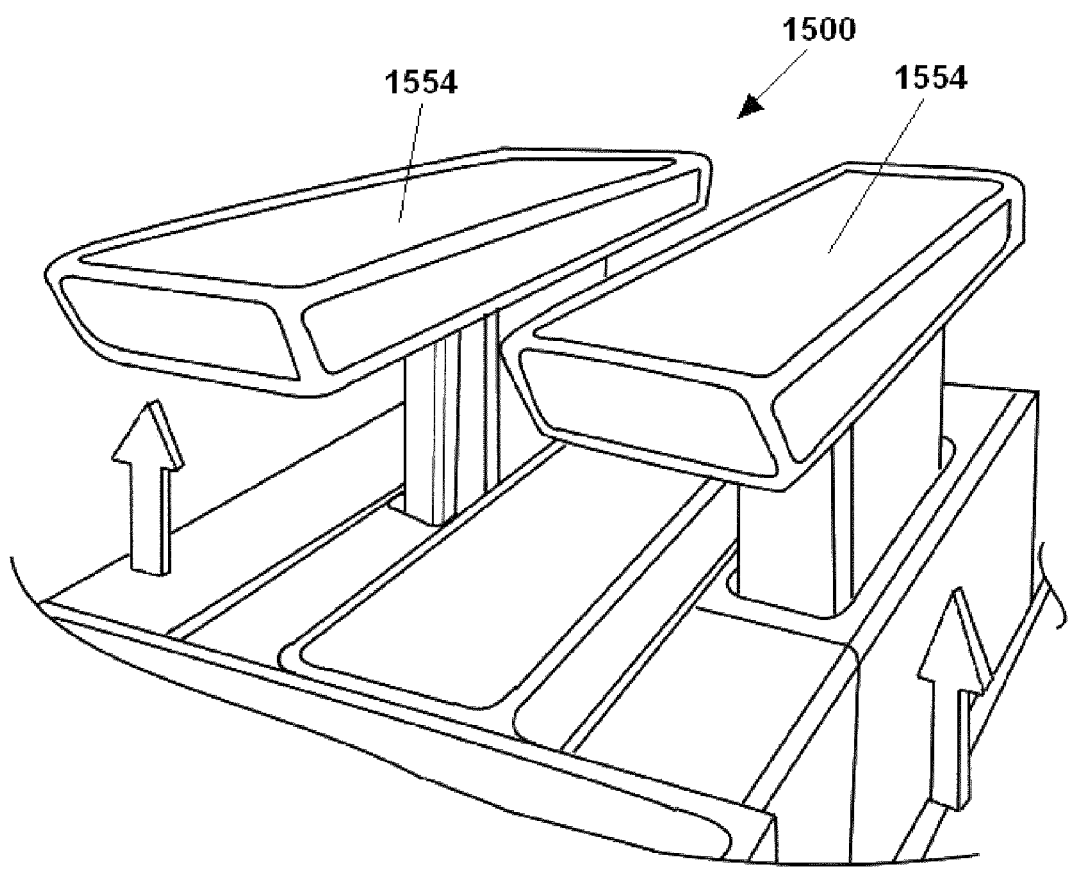
FIG. 46 is a perspective view of the vehicle floor console including collapsible armrests.

FIG. 46 is a perspective view of the vehicle floor console including collapsible armrests. As illustrated, the collapsible armrests 1554 "pop-up" when in use and collapse down when not in use to provide a clean look and to facilitate transfer of items between the passenger and driver sides of the vehicle interior. In the present configuration, the vertical height of each armrest 1554 is independently adjustable. For example, as illustrated, the passenger side armrest extends vertically above the driver side armrest. As will be appreciated, the height of the armrest may be adjusted based on the height of the occupant to facilitate occupant comfort. Furthermore, as discussed in detail below, each armrest 1554 may be translated in a longitudinal direction between the front and rear of the vehicle, thereby corresponding to a position of an adjustable seat.

Figure 47:
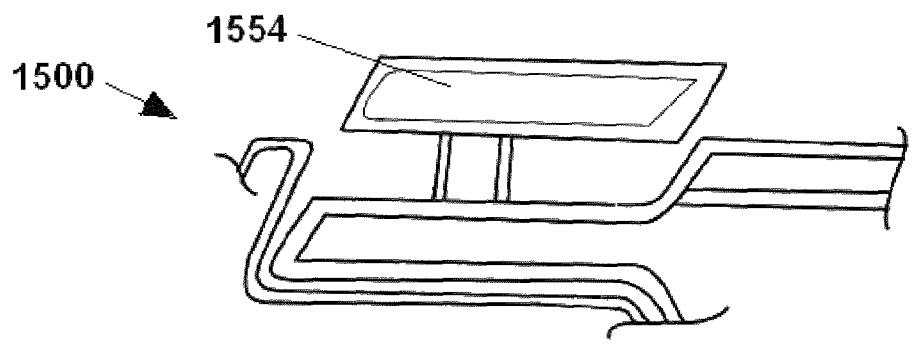
FIG. 47 is a side view of the vehicle floor console including collapsible armrests.

FIG. 47 is a side view of the vehicle floor console including collapsible armrests 1554. As illustrated, when the armrests 1554 are "popped up," the top surface of each armrest is higher than the top of the rest of the floor console. Consequently, once the armrests 1554 have been extended above the level of the top surface of the console 1500, the armrests may translate fore and aft along the longitudinal axis without obstruction. However, to return the armrests to the retracted position, the armrests 1554 may first be translated to an aft position (i.e., aligned with the armrest retaining recess), and then collapsed into the floor console 1500. As previously discussed, the armrests 1554 are configured to mount flush with the console 1500 in the retracted position. Therefore, when the armrests 1554 are collapsed, the top surface of the armrests 1554 may be flush with the top surface of the floor console 1500. Such a configuration may provide a clean appearance and facilitate passage of cargo between the driver and front passenger seats.

Figure 48:
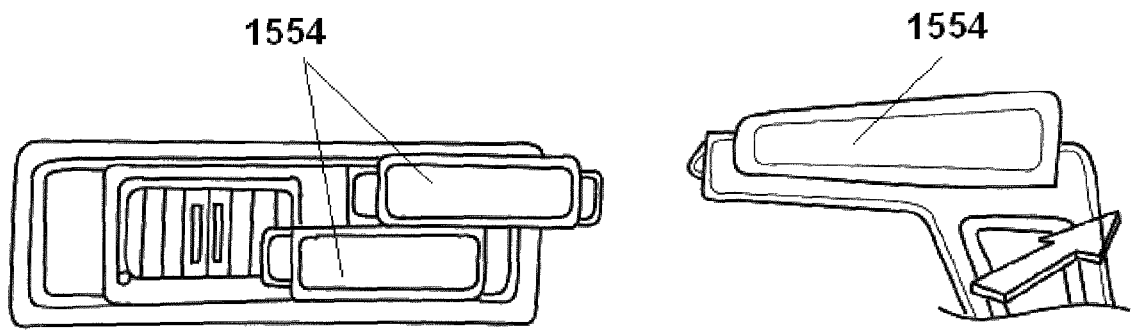
FIG. 48 is a series of perspective views of the collapsible armrests configured to translate fore and aft relative to the vehicle floor console.
Figure 48:
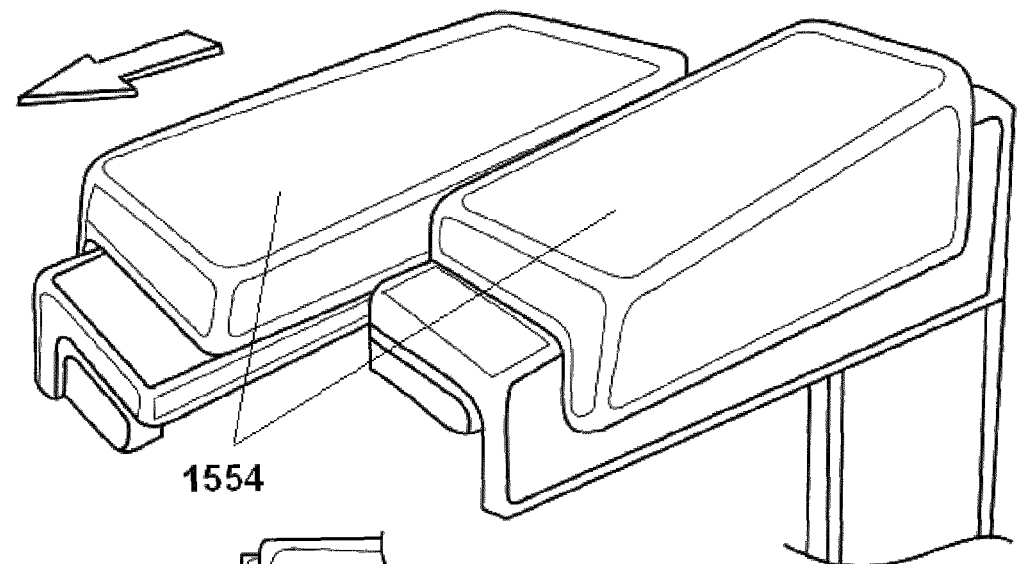
Figure 48:
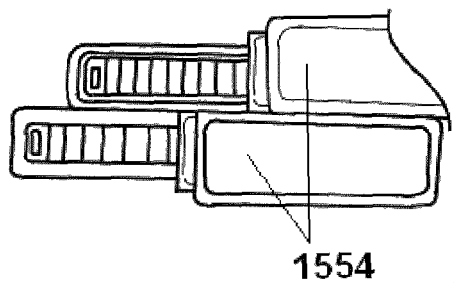

FIG. 48 is a series of perspective views of the collapsible armrests configured to translate fore and aft relative to the vehicle floor console. As illustrated, the armrests 1554 can individually move along a longitudinal direction relative to a front and rear of the vehicle. As previously discussed, such adjustment may facilitate passenger comfort by locating each armrest 1554 at a position corresponding to the fore/aft position of each vehicle seat. For example, as illustrated, the passenger armrest may be positioned fore of the driver armrest. By facilitating adjustment of the armrests 1554 in both the vertical and longitudinal directions, passenger comfort may be enhanced compared to embodiments in which the armrests are only longitudinally adjustable. Furthermore, by enabling the armrests to collapse within the floor console 1500, access between the driver and front passenger seats may be enhanced.

Reconfigurable Storage Bin

Figure 49:
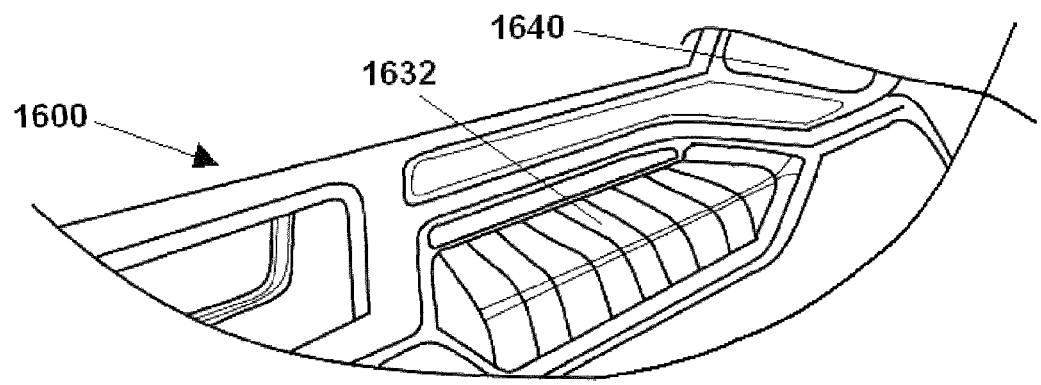
FIG. 49 is a perspective view of the vehicle floor console including reconfigurable storage bins having tambour doors in a closed position.

FIG. 49 is a perspective view of the vehicle floor console 1600 including reconfigurable storage bins having tambour doors in a closed position. As illustrated, the vehicle floor console 1600 has a tambour door 1632, which slides forward and backward, as opposed to up and down, along the floor console 1600. A control panel and screen 1640 are provided in front of the tambour door 1632. As discussed in detail below, the tambour door 1632 houses a storage bin which may be configured to contain a variety of different items.

Figure 50:
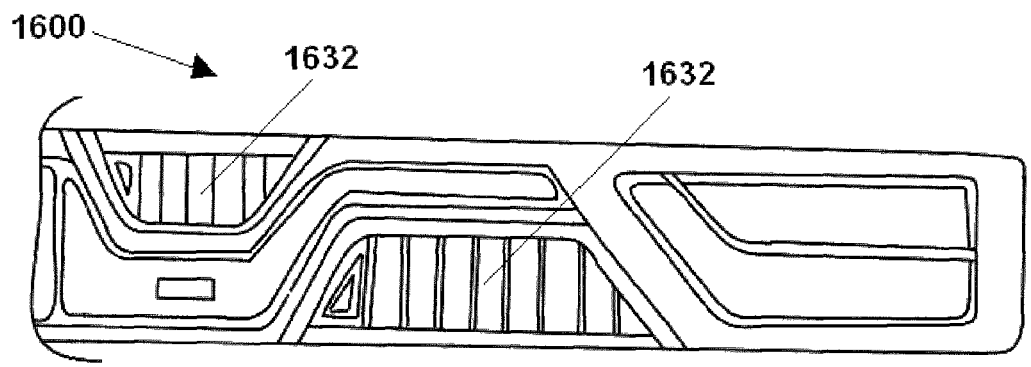
FIG. 50 is a top view of the vehicle floor console including reconfigurable storage bins having tambour doors in the closed position.

FIG. 50 is a top view of the vehicle floor console including reconfigurable storage bins having tambour doors in the closed position. As illustrated, the floor console 1600 may include multiple tambour doors 1632, which can each be pulled back to reveal storage.

Figure 51:
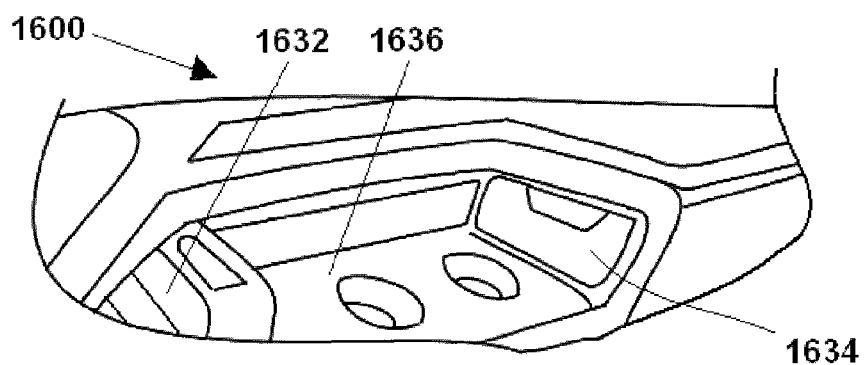
FIG. 51 is a perspective view of the vehicle floor console including reconfigurable storage bins having tambour doors in an open position, illustrating insertion of various storage bin configurations.

FIG. 51 is a perspective view of the vehicle floor console including reconfigurable storage bins having tambour doors in an open position, illustrating insertion of various storage bin configurations. As illustrated, the storage revealed beneath the tambour door 1632 can use interchangeable elements, including drawers 1634 of various sizes and shapes and/or cup holders 1636, to configure the storage area for different uses. For example, in certain embodiments, the drawers 1634 may include inductive chargers to power portable electronic devices.

Figure 53:
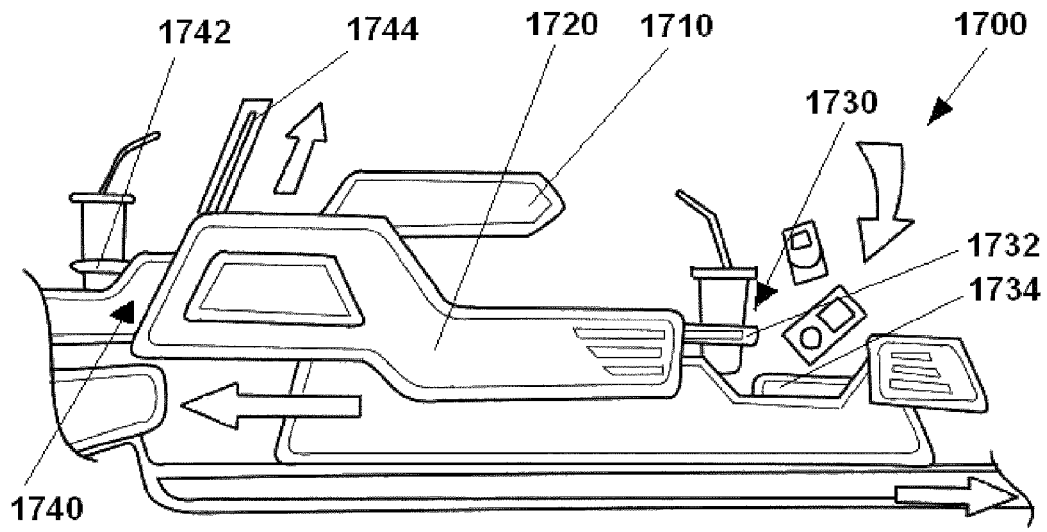
FIG. 53 is a side view of the vehicle floor console having the adjustable housing, in which the housing is positioned in an expanded position.
Figures 52, 54:
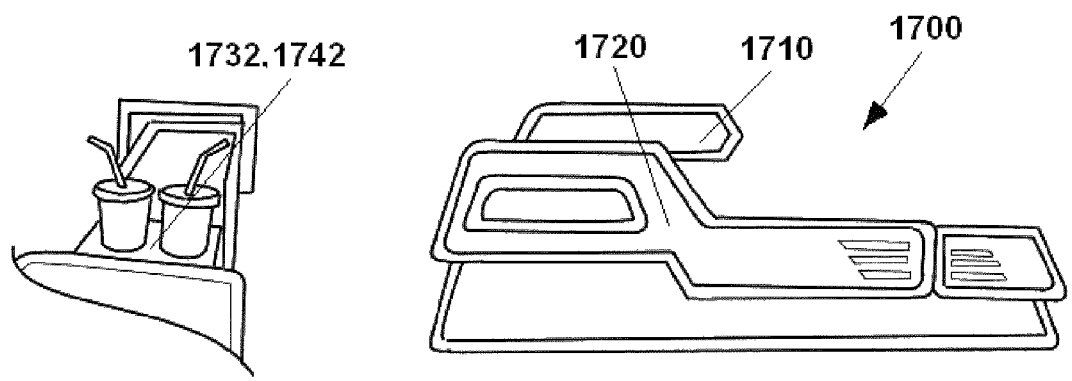
FIG. 52 is a side view of a vehicle floor console having an adjustable housing, in which the housing is positioned in a retracted position.
FIG. 54 is a perspective view of a portion of the vehicle console having the adjustable housing, as shown in FIG. 53.

FIGS. 52 through 54 show an exemplary embodiment of a vehicle floor console 1700 having an adjustable housing. As shown in FIG. 52, the vehicle floor console 1700 includes an armrest 1710 and a slidable housing 1720. As shown in FIG. 53, the slidable housing 1720 can slide back into the second row to reveal storage features 1730 and 1740 in the first and second row, respectively. The first row storage features 1730 may include cup holders 1732 and/or an e-storage bin 1734. The second row storage features 1740 may include cup holders 1742 and/or a screen 1744. As shown in FIG. 54, the cup holders 1732 or 1742 may include room for two cups.

Open Space Under Floor Console

Figure 55:
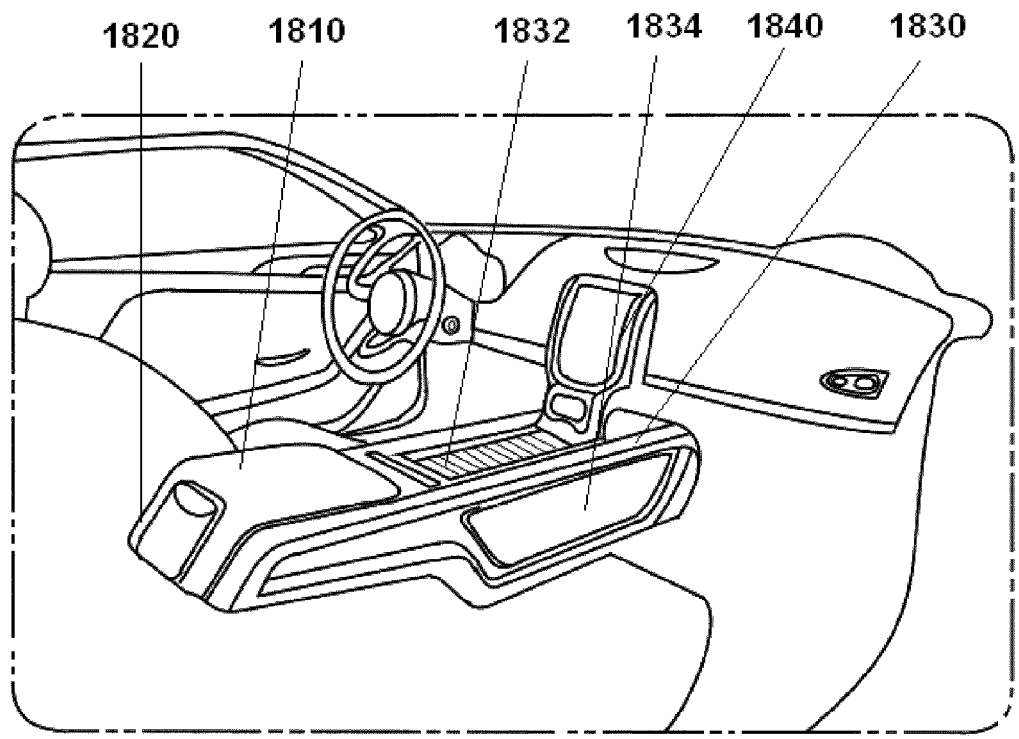
FIG. 55 is a perspective view of a vehicle interior including a floor console configured to establish an open space beneath the console.

FIG. 55 is a perspective view of a vehicle interior including a floor console 1800 configured to establish an open space beneath the console. As illustrated, the vehicle floor console 1800 has a flip-up, pivoting, repositionable, tablet style control and display console 1840, a storage area 1830 with tambour doors 1832 and metal accent pieces 1834, a second row storage drawer 1820, and an armrest 1810. The vehicle floor console 1800 has decorative halo effect accent lighting throughout the various components of the vehicle floor console 1800. As illustrated, the console 1800 is suspended from the front console in a cantilever arrangement. This configuration establishes an additional storage area beneath the console 1800 for storage of large or irregularly shaped items.

Figure 56:
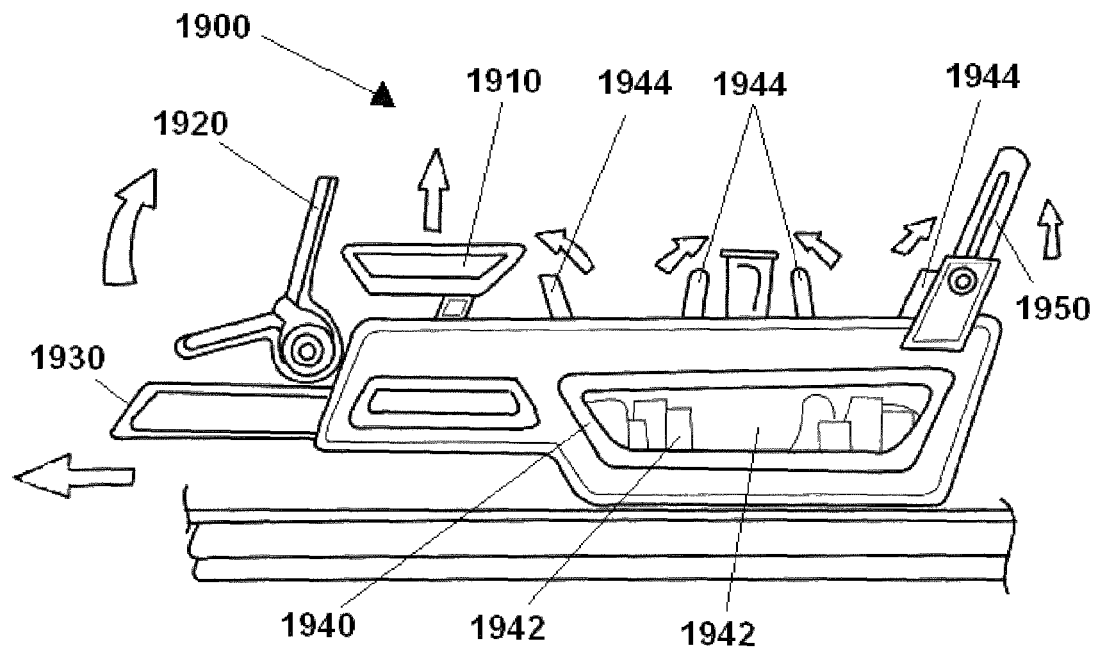
FIG. 56 is a side view of a first embodiment of the vehicle floor console configured to establish an open space beneath the console, in which the open space is provided at a rear portion of the console.
Figure 57:
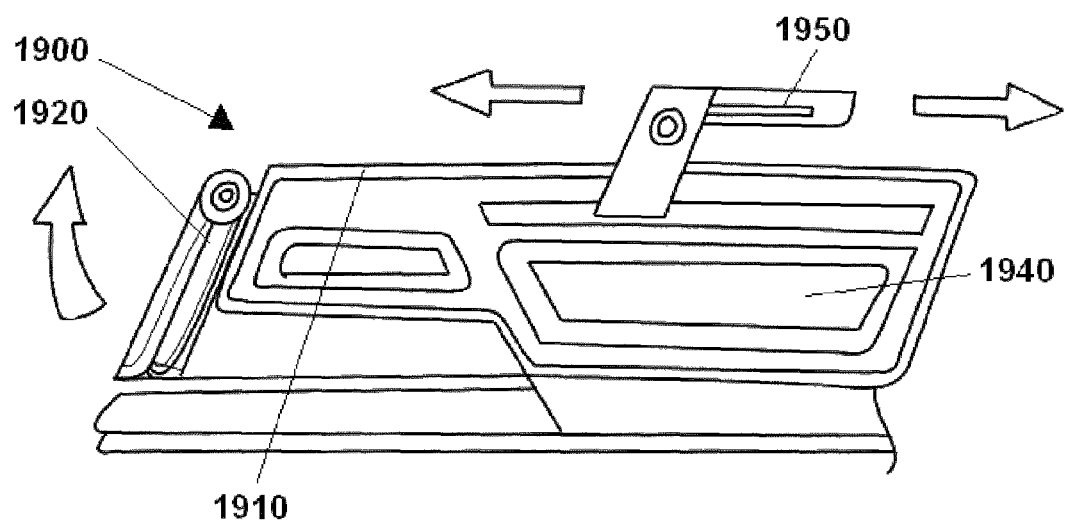
FIG. 57 is a side view of the first embodiment of the vehicle floor console configured to establish an open space beneath the console, in which the open space is provided at the rear portion of the console.

FIG. 56 is a side view of a first embodiment of the vehicle floor console 1900 configured to establish an open space beneath the console, in which the open space is provided at a rear portion of the console. As illustrated, the vehicle floor console 1900 has a pop-up armrest 1910, a second row control screen 1920, an expandable second row storage bin 1930, a storage area 1940 and a front control panel 1950. The storage area 1940 has transparent sides 1942 and top doors 1944. As shown in FIG. 57, the armrest 1910, the second row control screen 1920, the second row storage bin 1930 and the front row control panel 1950 can all be folded or collapsed to take up less space and stowaway. Likewise, the front row control panel 1950 can be moved forward and backward on the vehicle floor console 1900.

Figure 58:
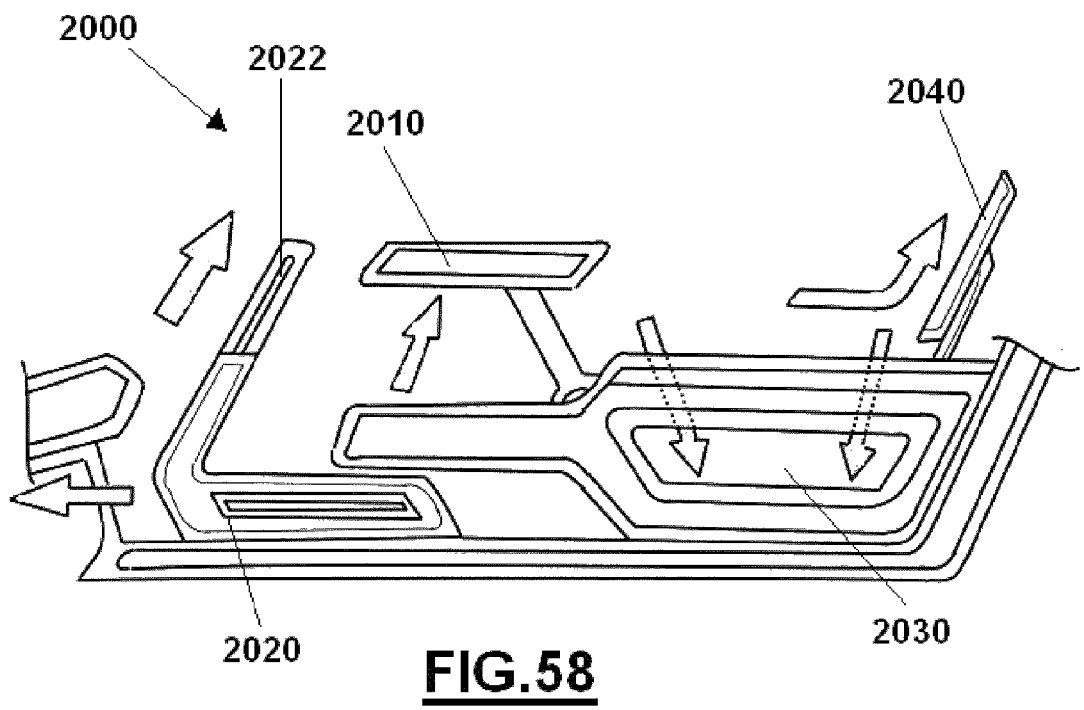
FIG. 58 is a side view of a second embodiment of the vehicle floor console configured to establish an open space beneath the console, including a second row storage drawer disposed within the open space in an extended position.

FIG. 58 is a side view of a second embodiment of the vehicle floor console 2000 configured to establish an open space beneath the console, including a second row storage drawer disposed within the open space in an extended position. As illustrated, the vehicle floor console 2000 includes an extendable armrest 2010, a second row storage drawer 2020 which has a screen 2022, a storage area 2030 and a front control screen 2040. As illustrated, the drawer 2020 is extended into the second row of seating, and the screen 2022 is deployed upwardly to enhance visibility by passengers within the second row of seating.

Figure 59:
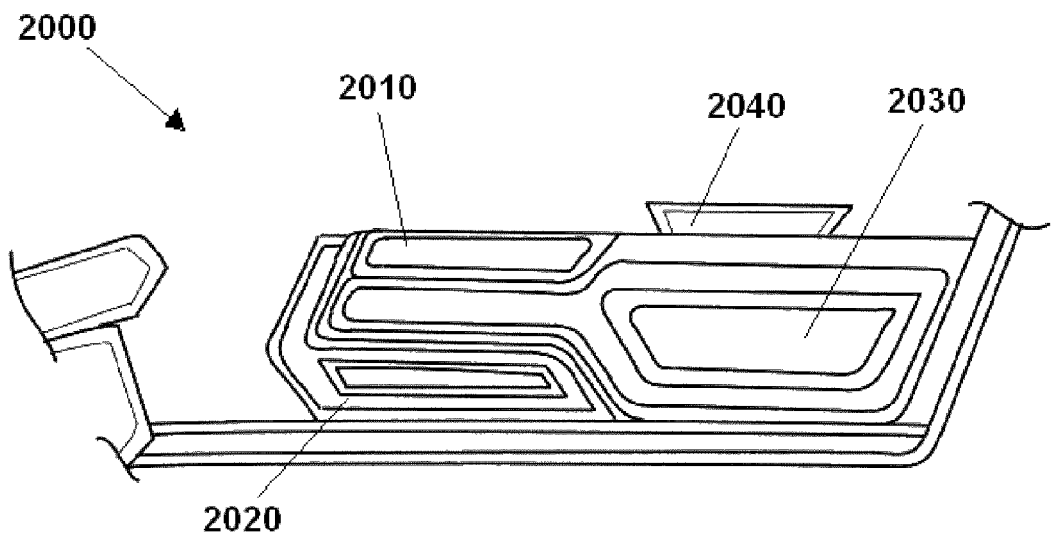
FIG. 59 is a side view of the second embodiment of the vehicle floor console configured to establish an open space beneath the console, in which the second row storage drawer is in a retracted position.
Figure 60:
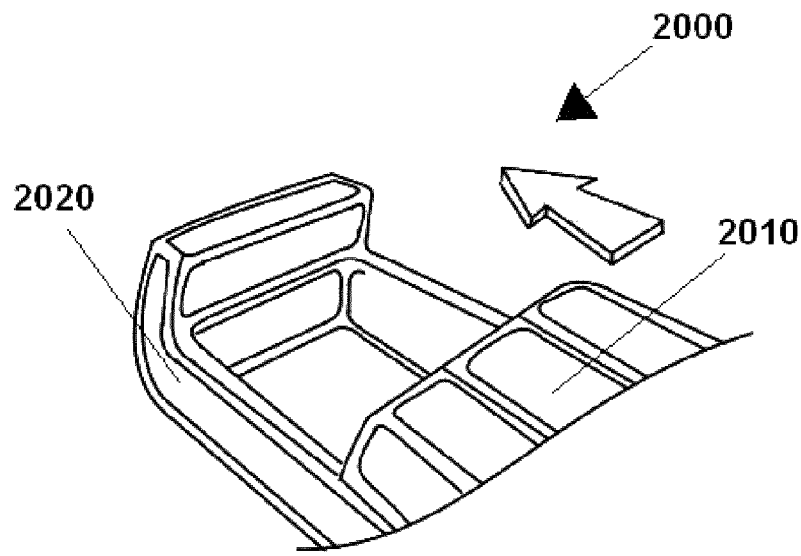
FIG. 60 is a perspective view of the second embodiment of the vehicle floor console configured to establish an open space beneath the console, in which the second row storage drawer is in the extended position.

FIG. 59 is a side view of the second embodiment of the vehicle floor console configured to establish an open space beneath the console, in which the second row storage drawer is in a retracted position. As illustrated, the screen 2022 of the second row drawer 2020 can collapse into the second row storage drawer 2020, and the second row storage drawer 2020 can slide forward underneath the armrest 2010. Furthermore, the armrest 2010 may collapse down to be substantially flush with the top of the vehicle floor console 2000, and the front control screen 2040 may fold down for protection, convenience and/or to close the access to the storage space 2030.

Figure 61:
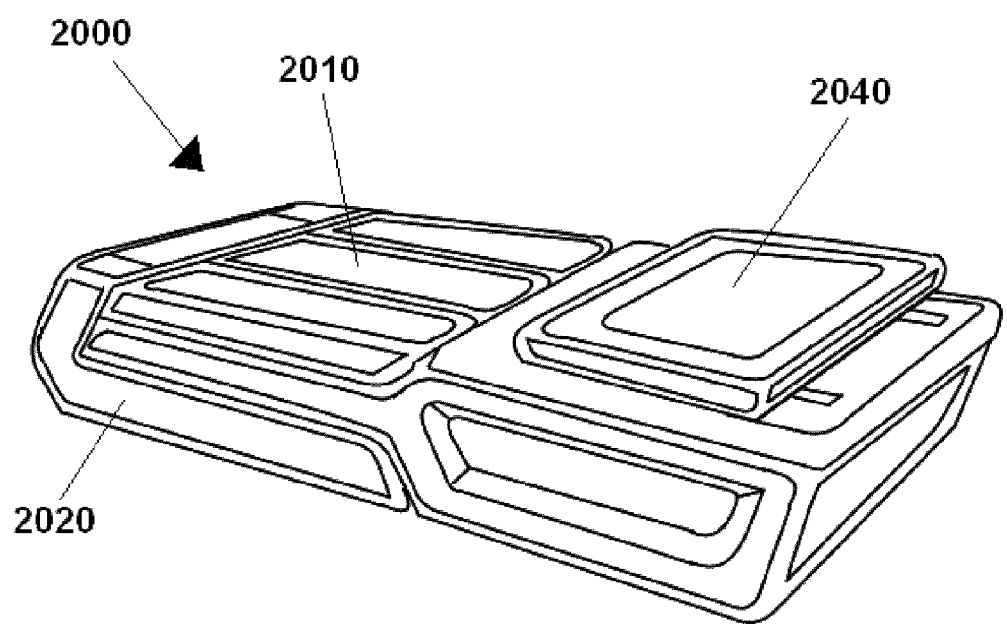
FIGS. 61 and 61A are perspective views of the second embodiment of the vehicle floor console configured to establish an open space beneath the console, in which the second row storage drawer is in the retracted position.
Figure 61A:
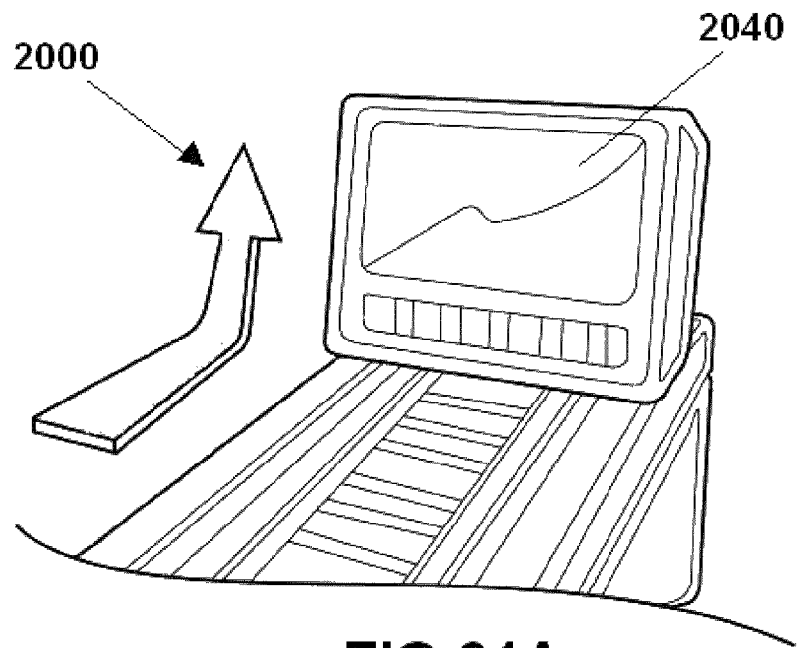
Figure 62:
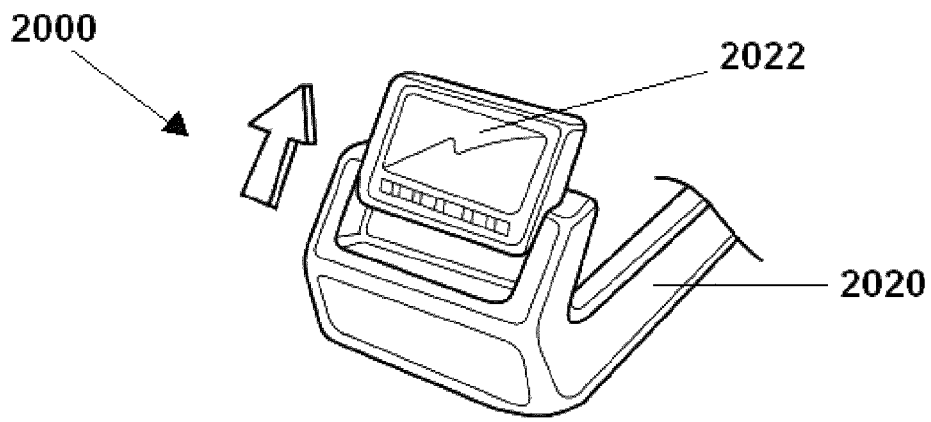
FIG. 62 is a perspective view of the second embodiment of the vehicle floor console configured to establish an open space beneath the console, including a control panel disposed to a rear surface of the second row storage drawer.
Figure 63:
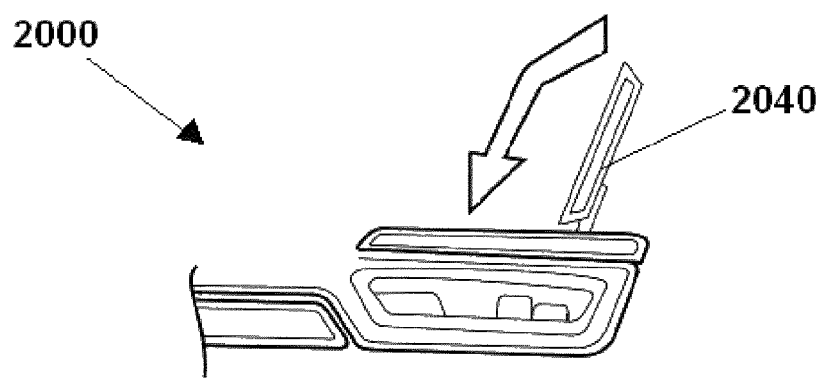
FIG. 63 is a side view of the second embodiment of the vehicle floor console configured to establish an open space beneath the console, including a control panel coupled to a front portion of the floor console.

FIG. 60 through 63 are perspective views of the second embodiment of the vehicle floor console configured to establish an open space beneath the console. As illustrated, the second row storage drawer 2020 slides under the armrest 2010 when closed and slides out when opened. As shown in FIG. 62, the control screen 2022 of the second row storage drawer 2020 slides up and down and may be detachable from the second row storage drawer 2020. As shown in FIGS. 61, 61A and 63, the front control screen 2040 can be folded backwards to be flat with the top of the vehicle floor console 2000 but still be accessible, as shown in FIG. 61, the front control screen 2040 can fold up and slide to a vertical position, as shown in FIG. 61A, or the front control screen 2040 can be flipped forward to conceal the front of the control screen 2040, as shown in FIG. 63.

Figure 64:
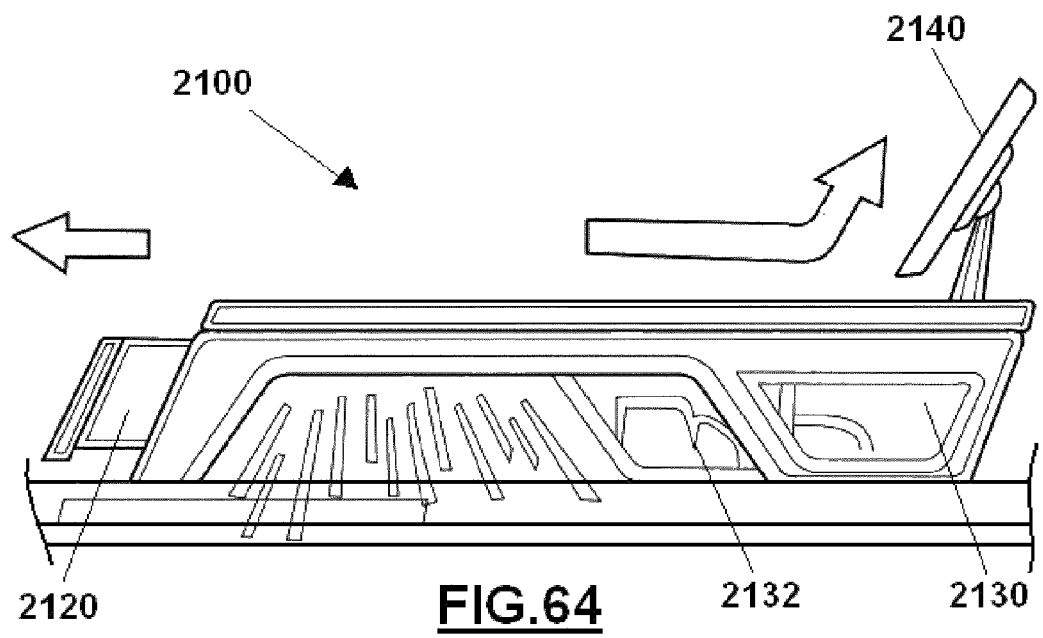
FIG. 64 is a side view of a third embodiment of the vehicle floor console configured to establish an open space beneath the console, in which the console is coupled to the vehicle floor at front and rear portions of the console.
Figure 65:
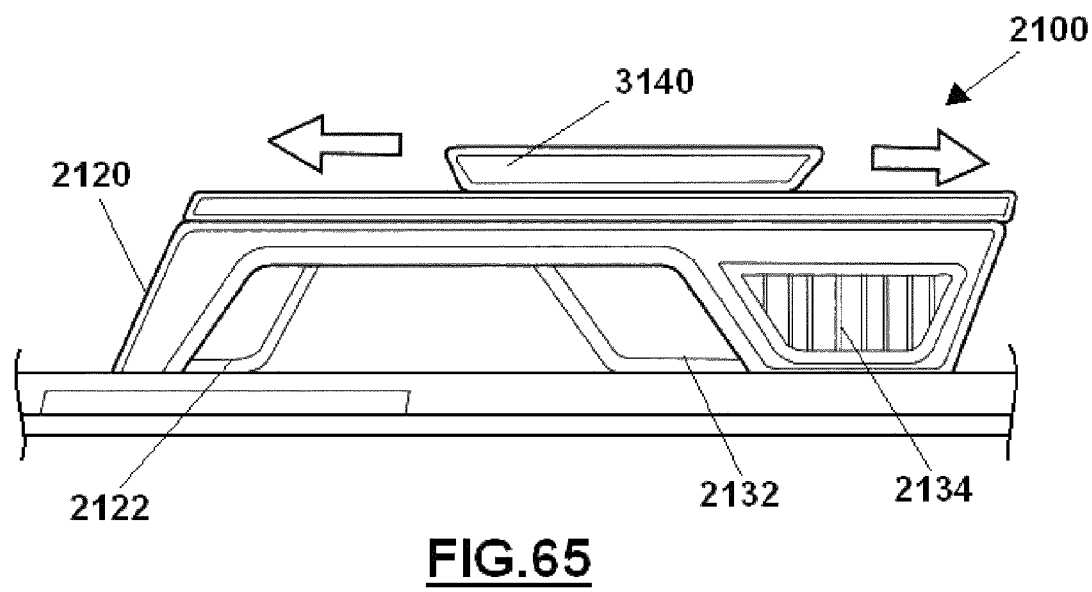
FIG. 65 is a side view of the third embodiment of the vehicle floor console configured to establish an open space beneath the console, including a vertical tambour door enclosing a storage compartment.

FIG. 64 is a side view of a third embodiment of the vehicle floor console 2100 configured to establish an open space beneath the console, in which the console is coupled to the vehicle floor at front and rear portions of the console. As illustrated, the vehicle floor console 2100 has a second row storage drawer 2120, a front storage bin 2130, which has a semi-transparent portion 2132, and a control screen 2140. As shown in FIG. 65, the control screen 2140 can fold down and move forward and backward for safety and convenience. Furthermore, the second row storage drawer 2120 has a semi-transparent portion 2122, while a tambour door 2134 provides side access to the storage area 2130.

Figure 66:
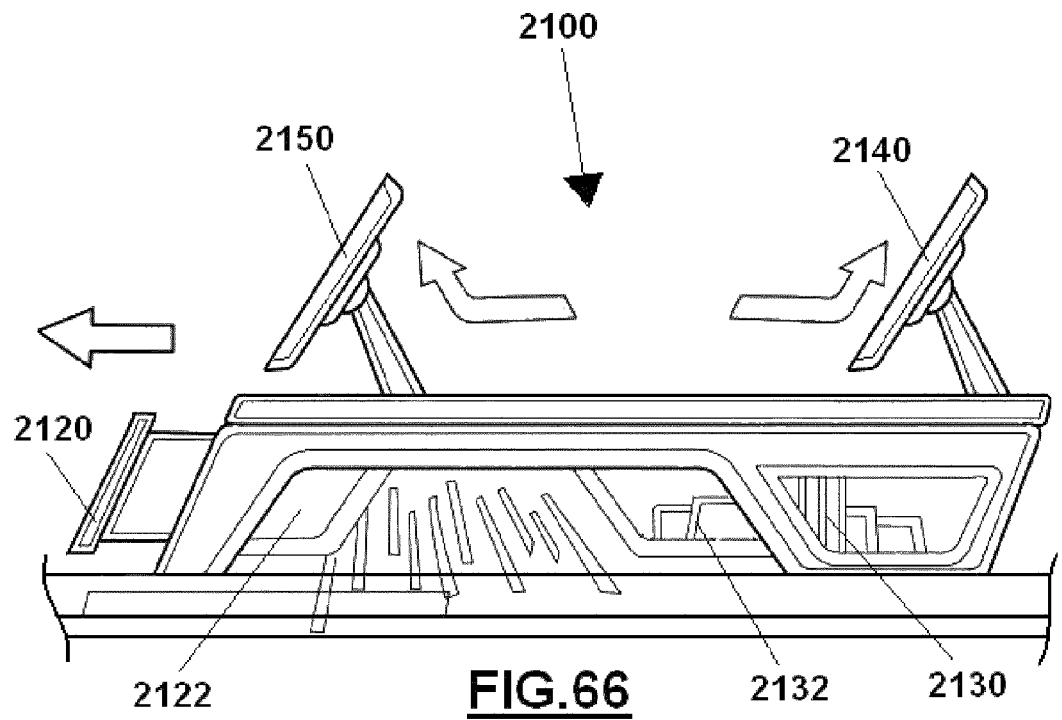
FIG. 66 is a side view of the third embodiment of the vehicle floor console configured to establish an open space beneath the console, including multiple control panels in a raised position.
Figure 67:
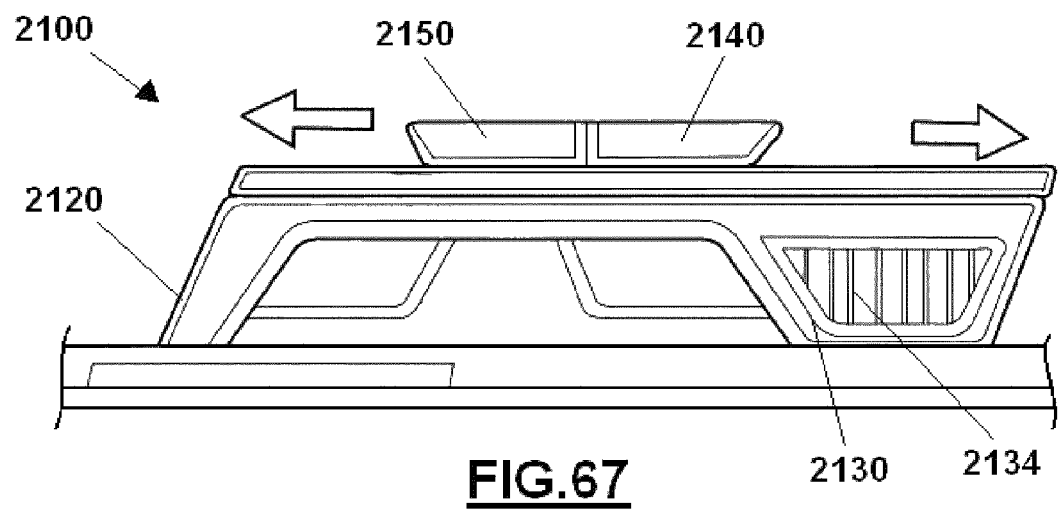
FIG. 67 is a side view of the third embodiment of the vehicle floor console configured to establish an open space beneath the console, including multiple control panels in a lowered position.

FIG. 66 is a side view of the third embodiment of the vehicle floor console 2100 configured to establish an open space beneath the console, including multiple control panels in a raised position. As illustrated, the vehicle floor console 2100 includes a second row control screen 2150. As shown in FIG. 67, the control screens 2140 and 2150 may fold flat and slide forward and backward on the vehicle floor console 2100. The control screens 2140 and 2150 may also be connected to each other. When connected, the two control screens 2140 and 2150 may be used as a single control screen.

Figure 68:
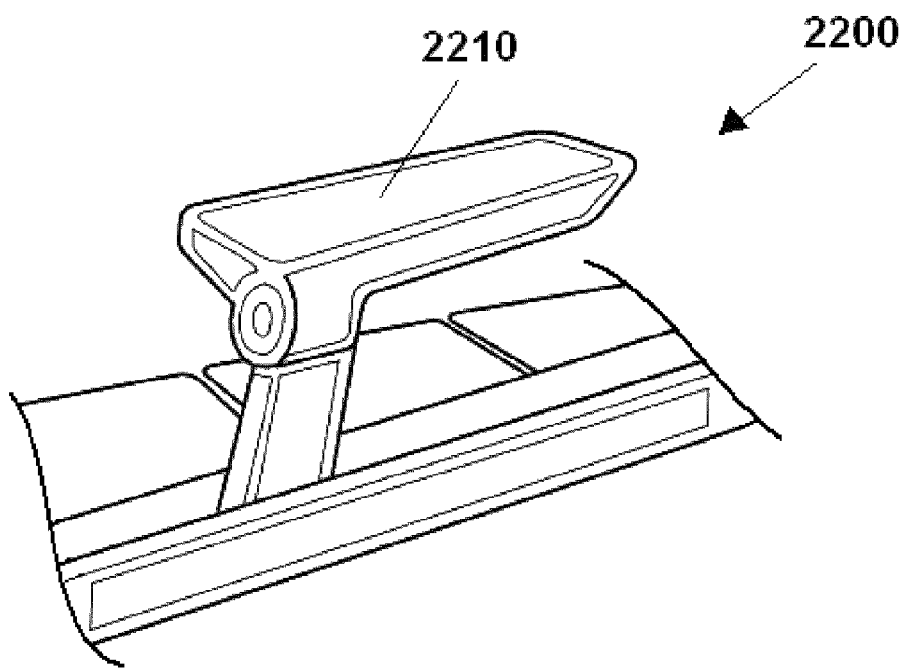
FIG. 68 is a perspective view of an alternative embodiment of the collapsible armrest shown in FIGS. 46 through 48.
Figure 69:
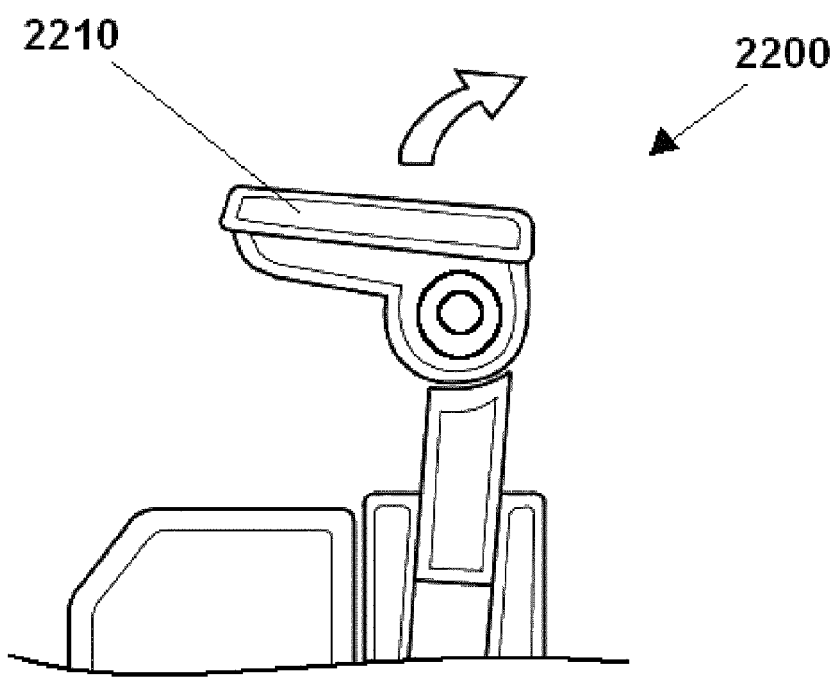
FIG. 69 is a rear view of the alternative embodiment of the collapsible armrest, as shown in FIG. 68.
Figure 70:
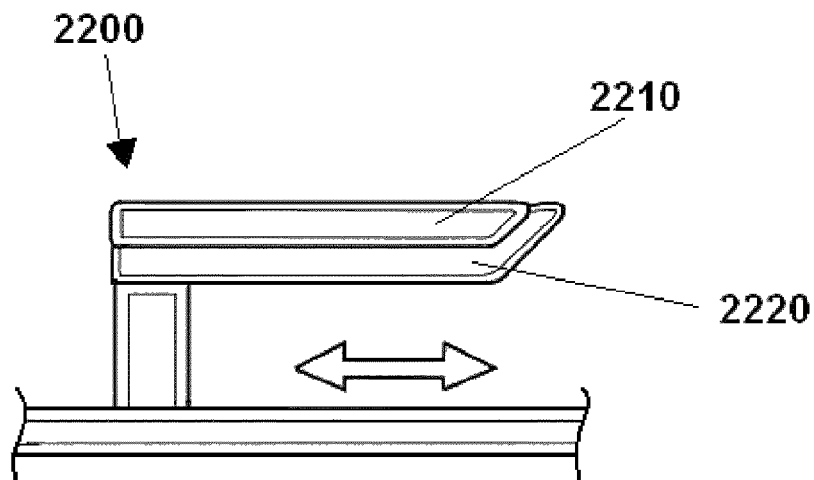
FIG. 70 is a side view of the alternative embodiment of the collapsible armrest, as shown in FIG. 68.
Figure 71:
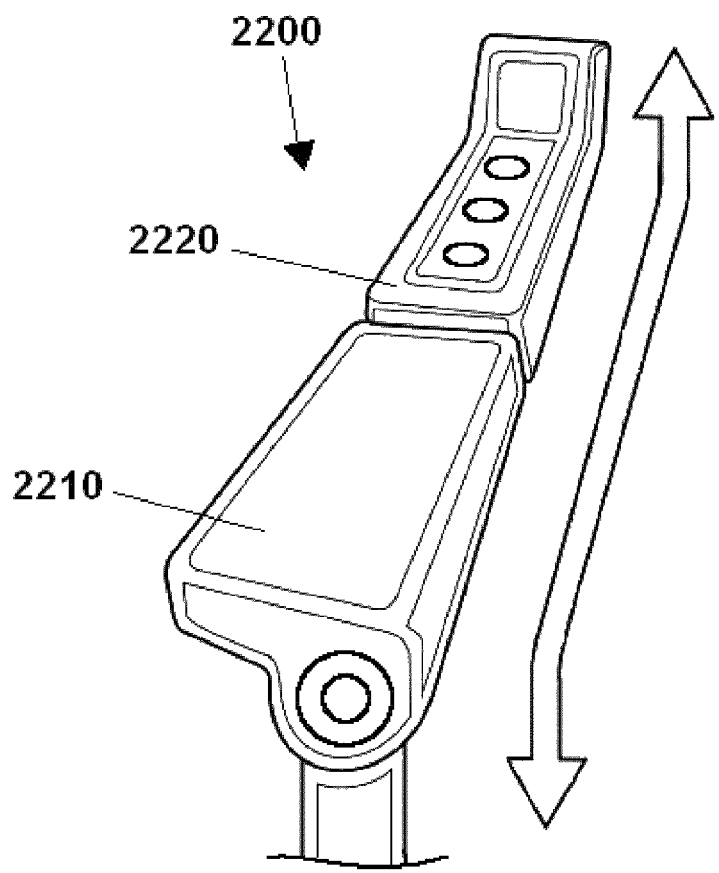
FIG. 71 is a perspective view of the alternative embodiment of the collapsible armrest, as shown in FIG. 68, including a retractable control panel.

FIG. 68 is a perspective view of an alternative embodiment of the collapsible armrest shown in FIGS. 46 through 48. As illustrated, the vehicle floor console 2200 includes an armrest 2210 and a control panel 2220 located underneath the armrest 2210. Similar to the previously described collapsible armrest, both the vertical and longitudinal positions of the armrest 2210 are adjustable, as best seen in FIGS. 69 and 70, respectively. Furthermore, the armrest 2210 is configured to retract into a position substantially flush with the console 2200. As illustrated in FIG. 71, the control panel 2220 also includes storage areas and/or cup holders. In the present configuration, the armrest 2210 can rotate upwardly to access the control panel 2220 and/or the storage beneath the armrest 2210. As shown in FIGS. 70 and 71, the control panel 2220 can slide forward and upward to align with the armrest 2210.

Armrest with Pass-Through Opening

Figure 72:
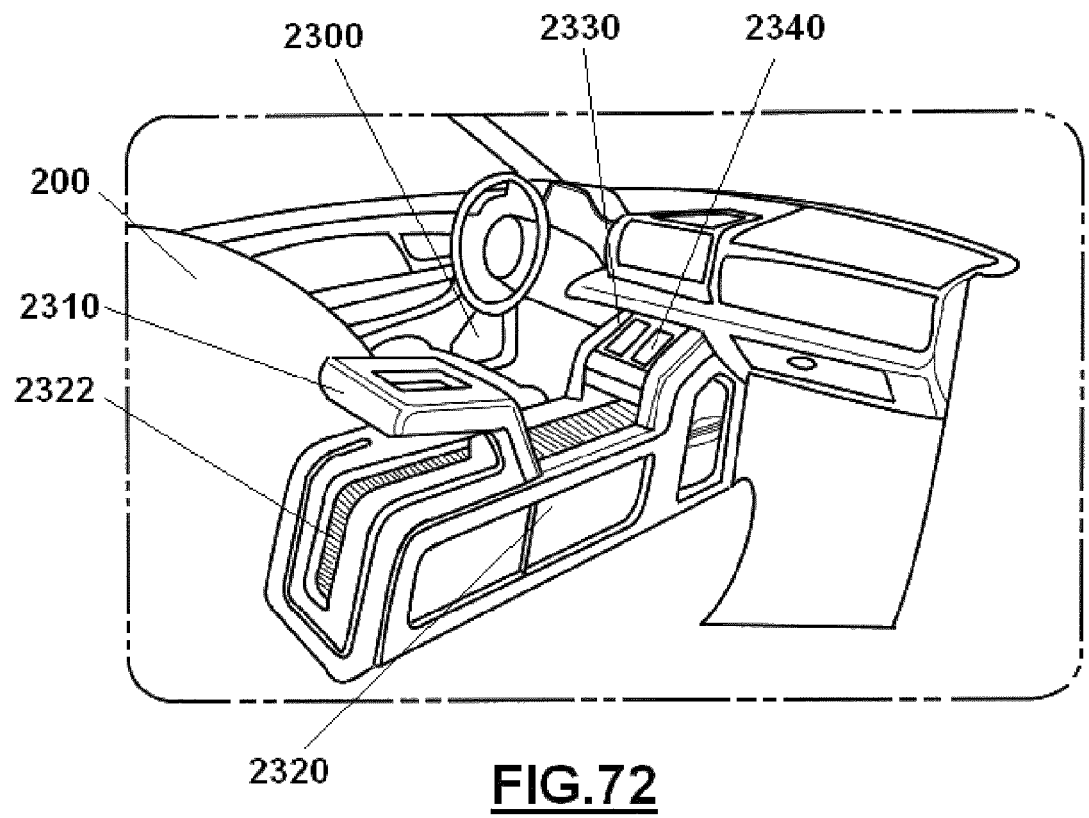
FIG. 72 is a perspective view of a vehicle interior including an armrest having an opening configured to facilitate access to a storage compartment disposed beneath the armrest.

FIG. 72 is a perspective view of a vehicle interior including an armrest having an opening configured to facilitate access to a storage compartment disposed beneath the armrest. The interior of the vehicle has a driver seat 200 and a passenger seat (not shown). The vehicle floor console 2300 is located between the driver seat 200 and the passenger seat and has an armrest 2310, a storage area 2320, a transmission control 2330 and an E-bin 2340. The armrest 2310 is an access style armrest and is shown in greater detail in FIG. 73. The storage area 2320 has a tambour door 2322. As shown in FIG. 72, the tambour door 2322 extends the entire length of the floor console 2300, creating a large accessible surface at the top of the storage area 2320. The storage area 2320 may also use collapsible storage dividers and sliding access panels. The E-bin 2340 is an electronics storage space and location where small electronic devices can be charged, possibly by inductive charging.

Figure 73:
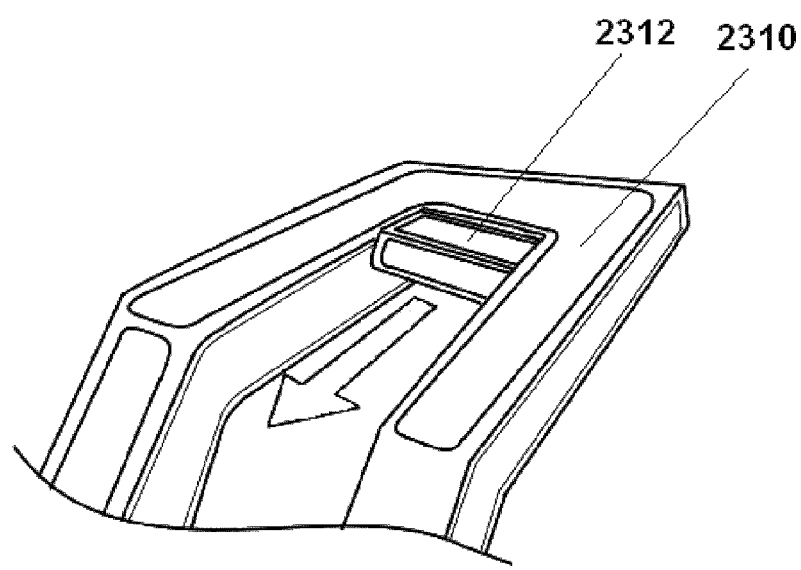
FIG. 73 is a series of views of the armrest shown in FIG. 72.

FIG. 73 shows an access style armrest 2310 usable with the vehicle floor console 2300. As illustrated, the armrest 2310 has a cross beam 2312. The cross beam 2312 can slide forward and backward. By sliding the cross beam 2312 back, a user can more easily reach through the armrest 2310, which will now be in a substantially U-shaped configuration, to access the area beneath the armrest. Additionally, a soft storage feature may be included between the cross beam 2312 and the armrest 2310. The soft storage feature thus provides an expandable storage space in the armrest 2310. For example, small items such as keys, access cards, and/or sunglasses may be placed within a natural curve of the soft storage feature. These items may be retained between the storage feature and the inner walls of the armrest.

Removable Storage Bin

In certain embodiments, the vehicle floor console includes a support structure and a removable storage compartment configured to interlock with the support structure in a retained position, and to detach from the support structure in a released position. In certain configurations, the removable storage compartment may include a lid rotatably coupled to a top portion of the compartment and configured to enclose items within the storage compartment. Such a configuration may enable a vehicle owner to configure multiple removable storage bins for various driving situations. For example, one storage bin may be packed with work related items, while another storage bin is packed with items intended for a vacation. After work, the vehicle owner may remove the first storage bin, and insert the second bin. Such an operation may significantly reduce the duration of loading and unloaded a vehicle.

Figure 74:
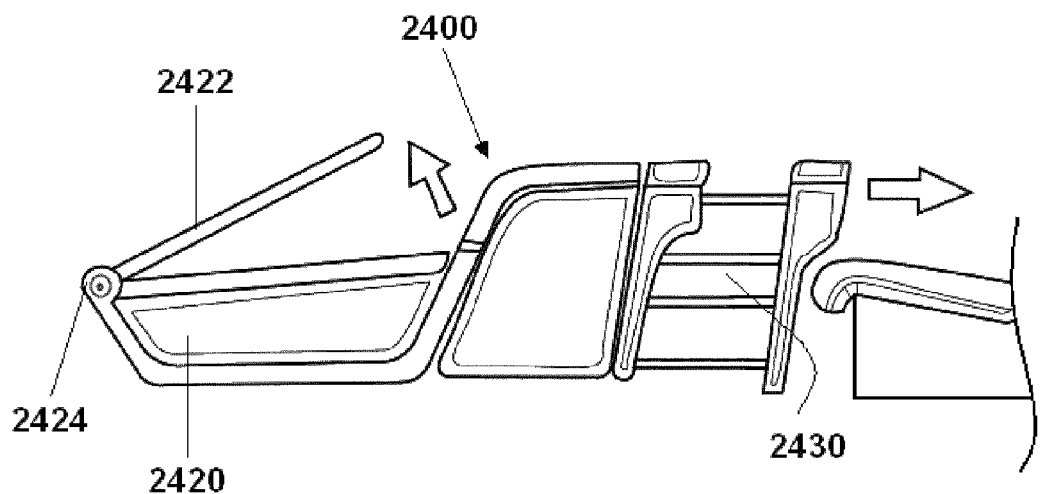
FIG. 74 is a side view of a first embodiment of a vehicle floor console including a removable storage bin, in which the removable storage bin includes a pivoting lid in a raised position.

FIG. 74 is a side view of a first embodiment of a vehicle floor console 2400 including a removable storage bin, in which the removable storage bin includes a pivoting lid in a raised position. As illustrated, the vehicle floor console 2400 has a large storage bin 2420 in the front and a storage drawer 2430 that expands into the second row. The storage bin 2420 has a lid 2422 that is connected to the rest of the vehicle floor console 2400 by one or more hinges 2424 at the front of the vehicle floor console 2400. As will be appreciated, the lid 2422 may be opened to facilitate access to the interior of the removable storage compartment 2420. Conversely, the lid 2422 may be closed to substantially enclose items within the compartment 2420. In certain configurations, the lid 2422 may be lockable to limit access to items within the compartment 2420. Furthermore, the removable storage compartment 2420 may be interlocked with the console 2400 in a retained position such that the compartment does not move within the vehicle during transport. In further embodiments, the interlocking feature may include a locking mechanism to prevent unauthorized removal of the compartment 2420. To remove the compartment 2420, a vehicle owner may disengage the interlocking feature, thereby releasing the compartment 2420, and then remove the compartment 2420 from the vehicle.

Figure 75:
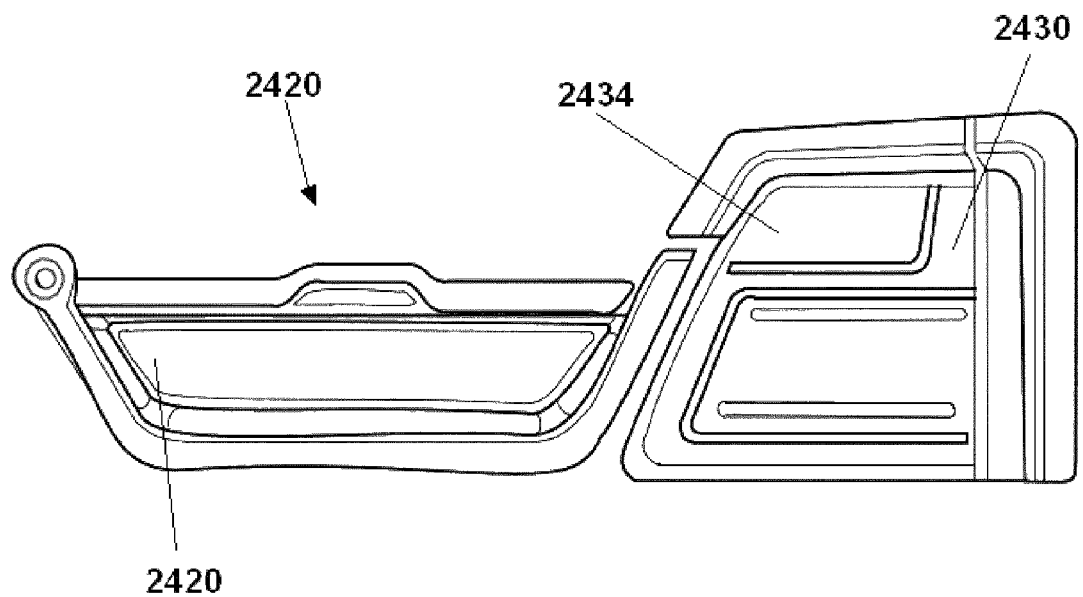
FIG. 75 is a side view of the first embodiment of the vehicle floor console including the removable storage bin, in which the pivoting lid is in a lowered position.
Figure 76:
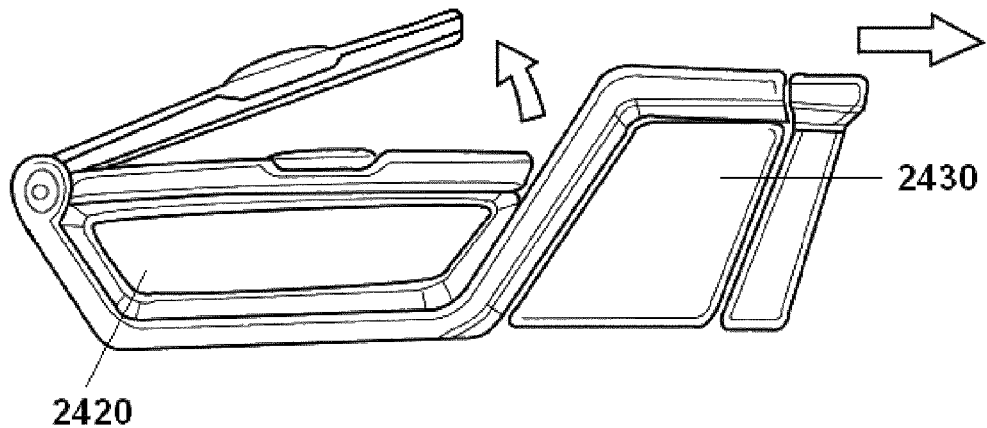
FIG. 76 is a side view of the first embodiment of the vehicle floor console including the removable storage bin, including a storage container expandable into the second row.

FIG. 75 is a side view of the first embodiment of the vehicle floor console 2400 including the removable storage bin 2420, in which the pivoting lid 2422 is in a lowered position. As illustrated, the lid 2422 substantially encloses the storage compartment 2420. As shown in FIG. 76, when the storage drawer 2430 is not in use, it stores underneath the armrest. Furthermore, the storage drawer 2430 may have a storage space 2434 which is separated from the rest of the interior of the storage drawer 2430.

Figure 77:
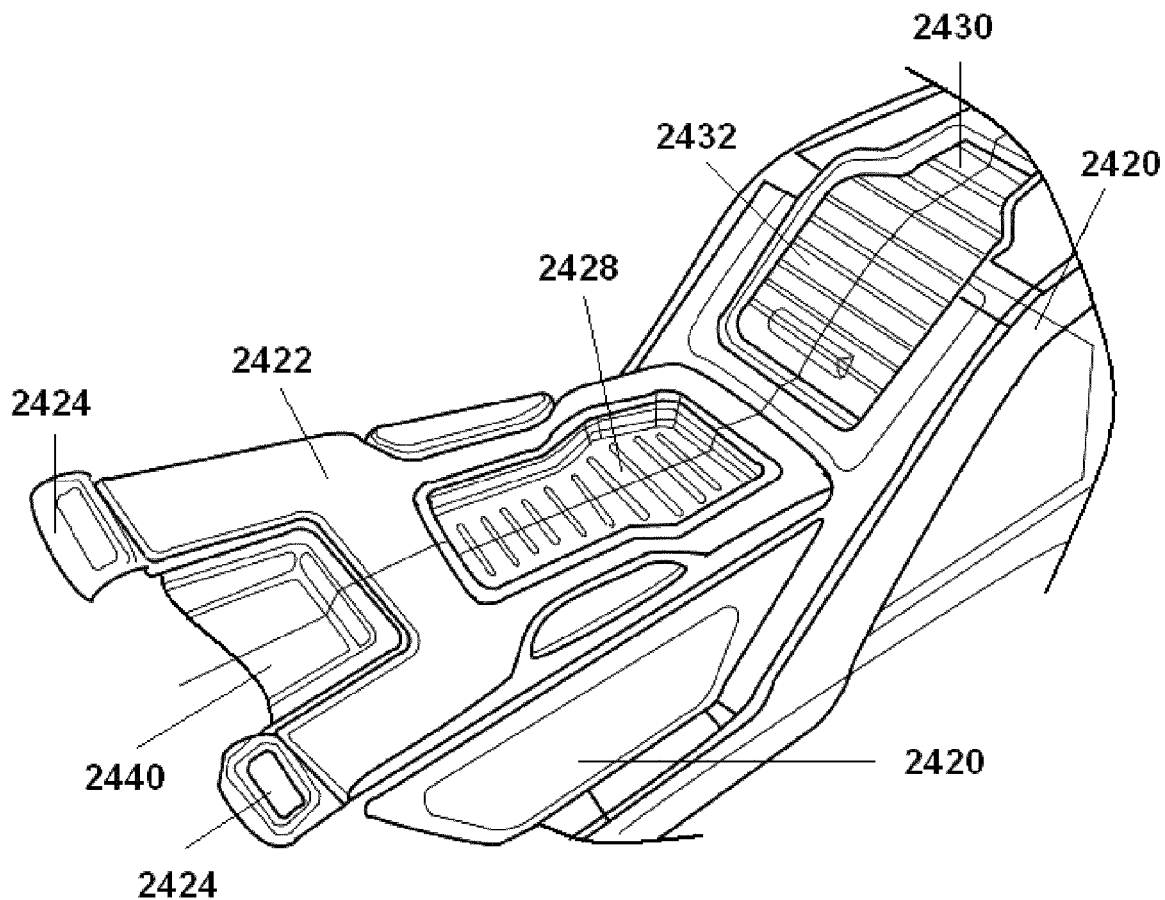
FIG. 77 is a perspective view of the first embodiment of the vehicle floor console including the removable storage bin, in which the removable storage bin includes a horizontal tambour door disposed within the pivoting lid.

FIG. 77 is a perspective view of the first embodiment of the vehicle floor console 2400 including the removable storage bin 2420, in which the removable storage bin includes a horizontal tambour door disposed within the pivoting lid 2422. As illustrated, the storage area 2434 is accessed through a tambour door 2432. Also shown in FIG. 77, a charging bin 2440 may be located between two of the hinges 2424 of the lid 2422. The charging bin 2440 may use inductive charging and/or other methods to charge electrical devices. Additionally, the lid 2422 may have a tambour door and/or a shallow storage bin 2428, which may provide access to the storage bin 2420 without opening the lid 2422.

Figure 78:
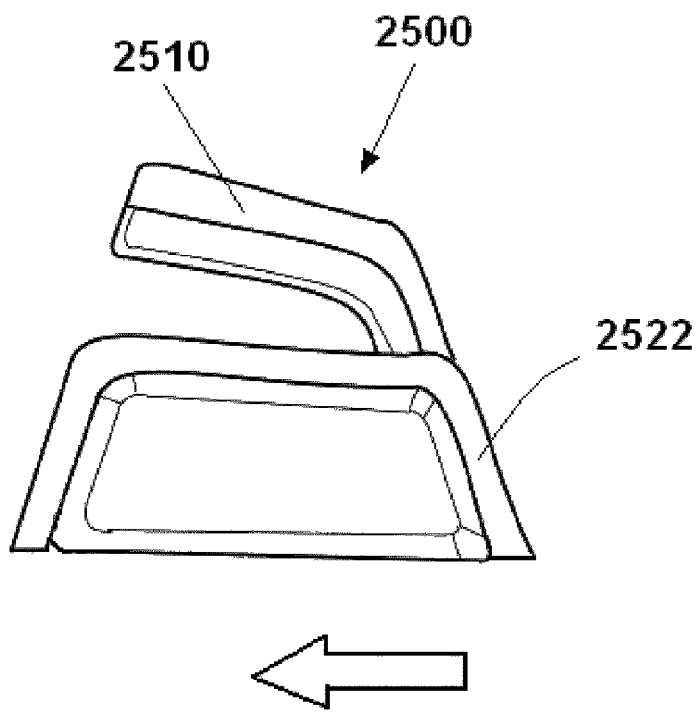
FIG. 78 is a side view of a vehicle floor console including an armrest positioned above a storage space.
Figure 79:
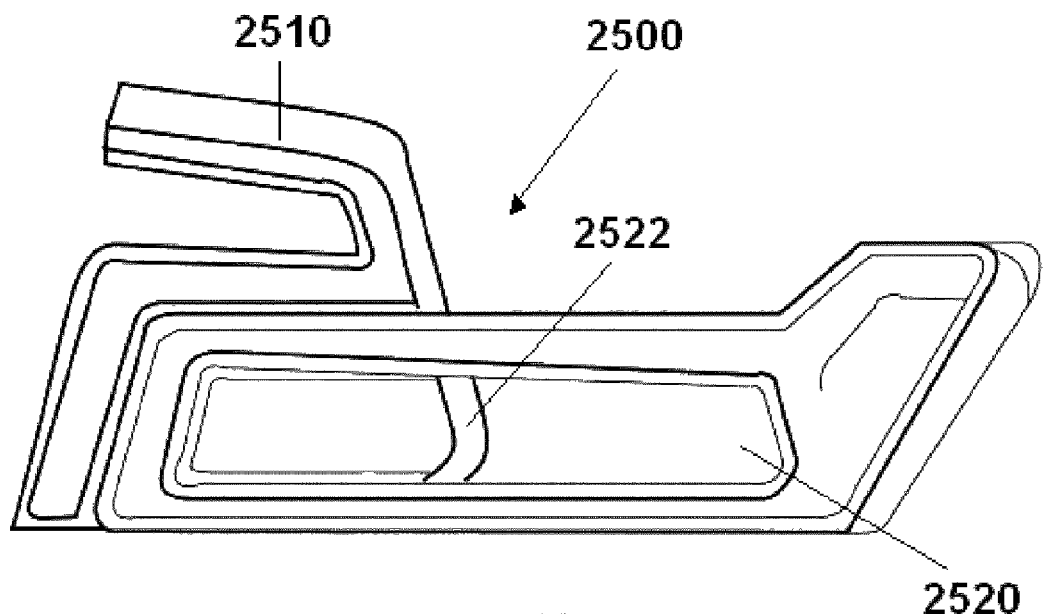
FIG. 79 is a side view of the vehicle floor console shown in FIG. 78.
Figure 80:
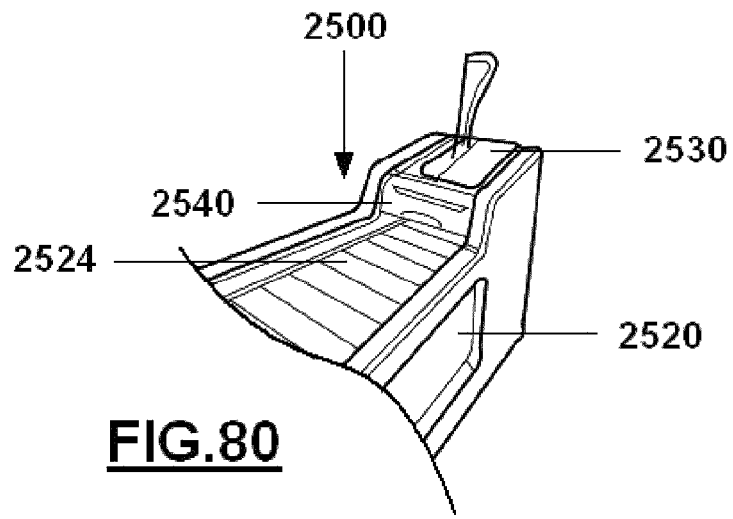
FIG. 80 is a perspective view of the vehicle floor console shown in FIG. 78.

FIGS. 78 through 80 show an exemplary embodiment of a vehicle floor console 2500. As shown in FIGS. 78 and 79, the vehicle floor console 2500 has an armrest 2510 that includes a sling system for storing small electronic items. Additionally, the vehicle floor console 2500 has a side panel 2522 that can slide forward and backward to allow access to a storage space 2520 beneath the armrest 2510. The side panel 2522 can also be locked to secure items in the storage space 2520. As shown in FIG. 80, the vehicle floor console 2500 has a locking tambour door 2524 that also allows secure access to the storage space 2520. Drive-by-wire transmission controls 2530 are located at the front of the improved storage bin 2500. A tray 2540 is located beneath the drive-by-wire transmission controls 2530 and may include cup holders and/or an inductive charging bin for charging small electronic devices.

Extendable Storage into Second Row

In certain embodiments, the vehicle floor console includes a support structure and an expandable storage compartment extending from the support structure. The expandable storage compartment is configured to form a substantially flush surface with the support structure while in a collapsed position, and to provide a contained storage area in an expanded position. Such a configuration may provide a clean appearance to the console when the additional storage space is not utilized, while providing sufficient storage space when desired. In certain embodiments, the expandable storage compartment is configured to extend from a rear portion of the support structure into a second row of vehicle seating. This configuration may provide additional storage space within the vehicle without interfering with passenger leg room when the expandable storage compartment is in a collapsed position.

Figure 81:
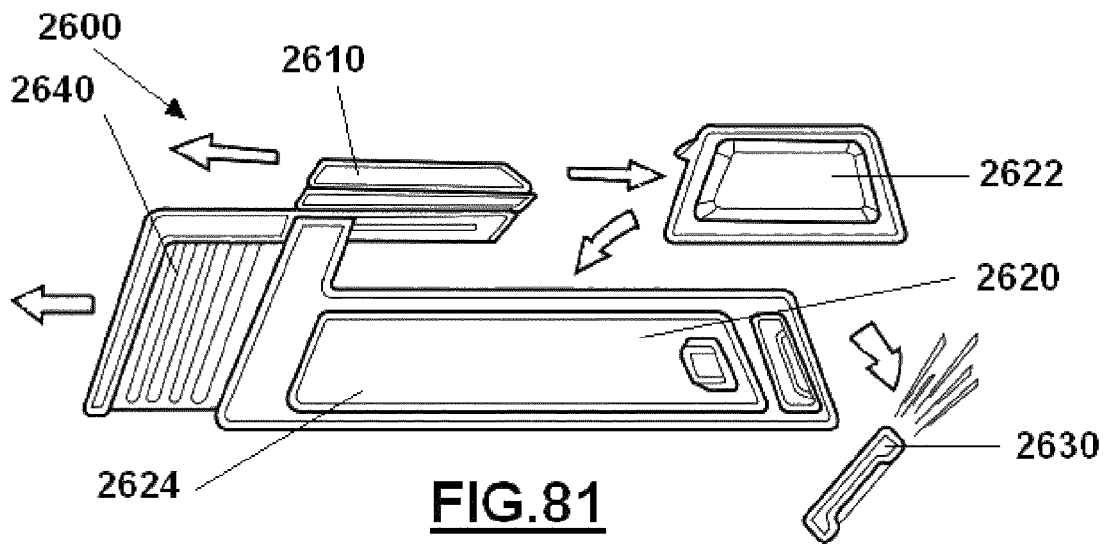
FIG. 81 is a side view of a first embodiment of the vehicle floor console including a storage compartment expandable into a second row of seating.
Figure 82:
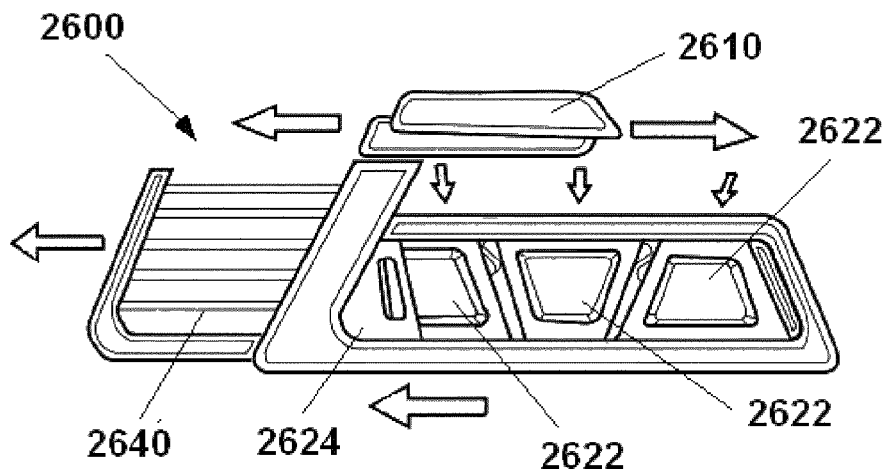
FIG. 82 is a side view of the first embodiment of the vehicle floor console as shown in FIG. 81.

FIGS. 81 and 82 are side views of a first embodiment of the vehicle floor console 2600 including a storage compartment expandable into a second row of seating. As illustrated, the vehicle floor console 2600 has an armrest 2610 on its top surface. The armrest 2610 is adjustable in that it can slide forward and backward with respect to the vehicle floor console 2600. Below the armrest 2610 is a large reconfigurable storage space 2620. Similar to the embodiment described with regard to FIGS. 74 through 77, storage bins 2622 may be placed in the reconfigurable storage space 2620. The reconfigurable storage space 2620 includes sliding soft curtain or soft panel sides 2624 which can slide back to provide side access to the reconfigurable storage space 2620. A removable power device 2630, which can be provided in front of the reconfigurable storage space 2620, may be a light, a battery or any other portable powered or powering device. A storage pouch 2640 that expands into the second row to provide storage for occupants of the second row of seating is provided behind the reconfigurable storage space 2620. As illustrated, the expandable storage compartment 2640 is positioned in the expanded position to provide additional storage space. As will be appreciated, the expandable storage compartment 2640 may be collapsed such that the rear surface of the compartment is substantially flush with the console 2600. Furthermore, in certain embodiments, the side walls of the compartment 2640 may be composed of a flexible material and/or include joints such that collapsing the compartment causes the side walls to fold. In such embodiments, the expandable storage compartment 2640 may only utilize a small space in the collapsed position.

Figure 83:
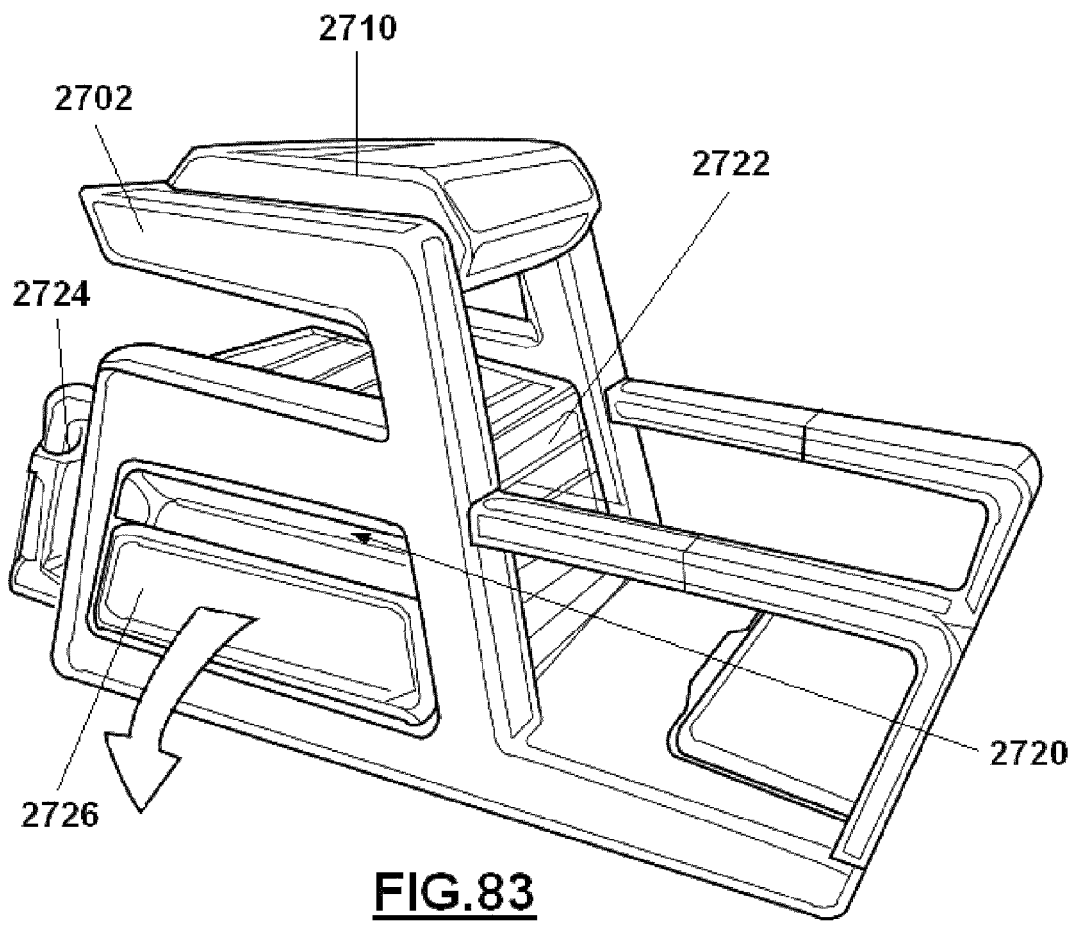
FIG. 83 is a perspective view of a second embodiment of the vehicle floor console including the storage compartment expandable into the second row of seating.
Figure 84:
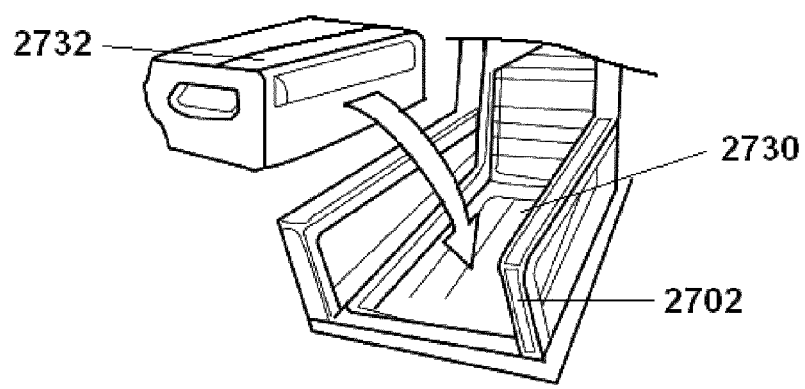
FIG. 84 is a perspective view of the second embodiment of the vehicle floor console as shown in FIG. 83.
Figure 85:
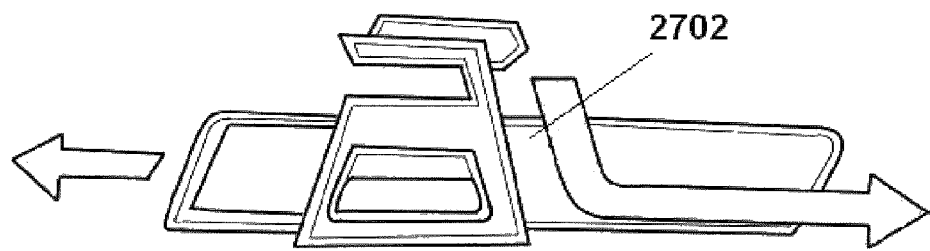
FIG. 85 is a side view of the second embodiment of the vehicle floor console as shown in FIG. 83.

FIG. 83 is a perspective view of a second embodiment of the vehicle floor console 2700 including the storage compartment expandable into the second row of seating. As illustrated, the vehicle floor console 2700 includes an armrest 2710 which is connected to the frame 2702 of the vehicle floor console 2700 and a storage bin 2720 beneath the armrest 2710. The storage bin 2720 has a tambour door 2722 which allows access to the interior of the storage bin 2720. A drawer 2724 may also extend out of the storage bin 2720 to allow further access. The drawer 2724 may be an extendable frame that is usable to constrain a bag or other container to keep it from moving within the cockpit of the vehicle. Likewise, side panels 2726 may fold down to allow access to the storage bin 2720 and may include map pockets or other small item storage. As shown in FIG. 84, the frame 2702 defines a storage space 2730 for a removable storage container 2732. Similar to the removable storage containers described above with regard to FIGS. 74 through 77, the removable storage container 2732 may be a toolbox, a tackle box or the like. As shown in FIG. 85, the frame 2702 of the vehicle floor console 2700 may be extendable or otherwise reconfigurable.

Vertically Movable Armrest

Figure 86:
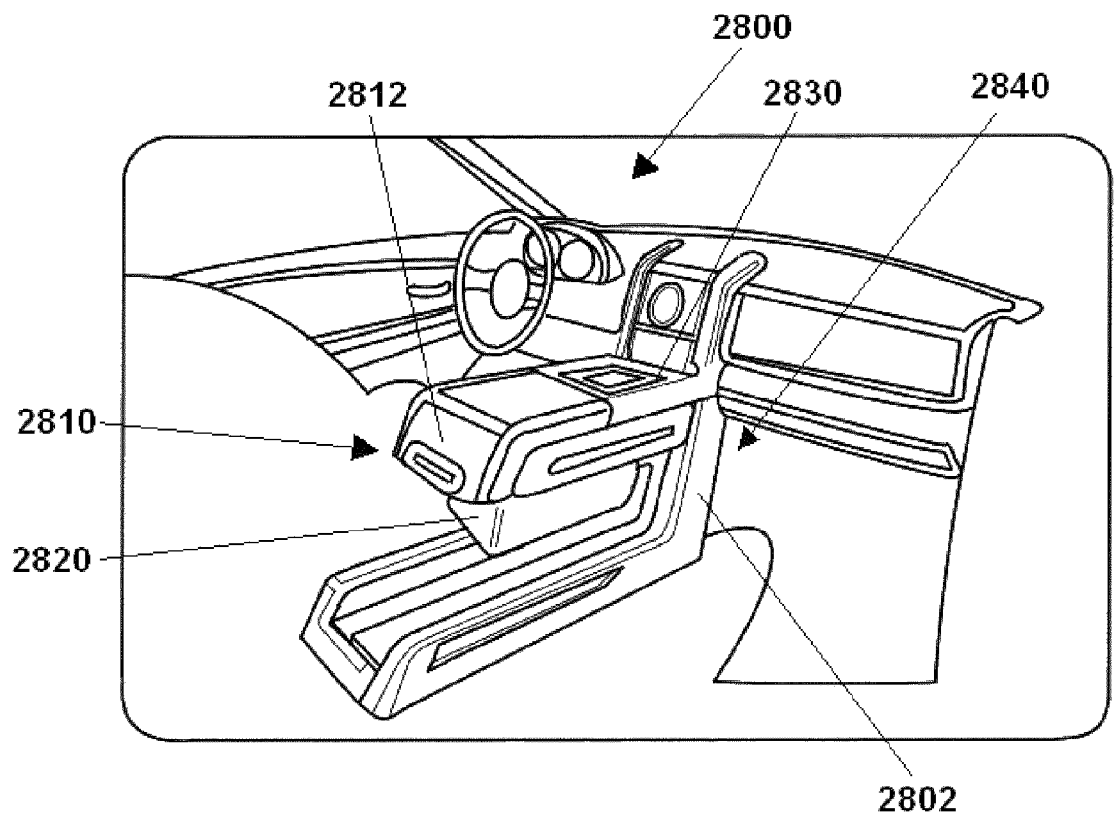
FIG. 86 is a perspective view of a vehicle interior including a floor console having an armrest mounted to a front portion of the console and configured to translate vertically.

FIG. 86 is a perspective view of a vehicle interior including a floor console 2800 having an armrest mounted to a front portion of the console and configured to translate vertically. As illustrated, the vehicle floor console 2800 has an L-shaped frame 2802 and an arm 2810 attached to the vertical leg of the L-shaped frame 2802. The arm 2810 can be moved along the vertical part of the L-shaped frame 2802 to adjust the height of the arm 2810. An armrest 2812 is provided on top of the arm 2810. A storage drawer 2820 that can slide out from the arm 2810 for access is provided beneath the armrest 2812. A control panel 2830, which may have control features for any aspect of the vehicle including a plug and play drive-by-wire transmission control, is provided in front of the armrest 2812.

It should be appreciated that the vertical movement of the arm 2810 along the L-shaped frame 2802 can be used to lock, or otherwise prohibit access to, the storage drawer 2820. Moving the arm 2810 may also exposes an in-dash storage area 2840 located behind the arm 2810.

Figure 87:
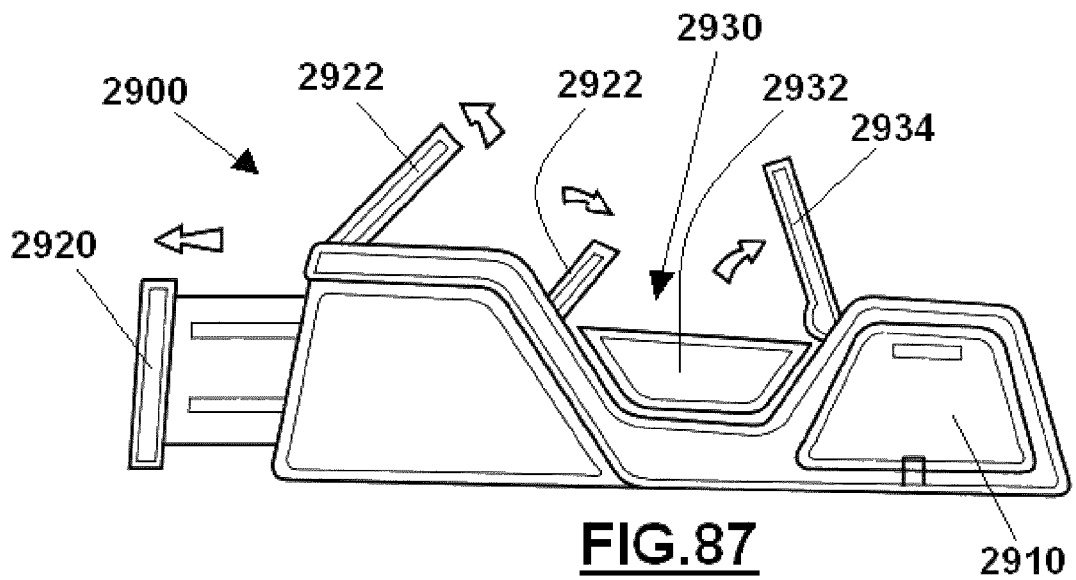
FIG. 87 is a side view of a second embodiment of the vehicle floor console including a removable storage bin.
Figure 88:
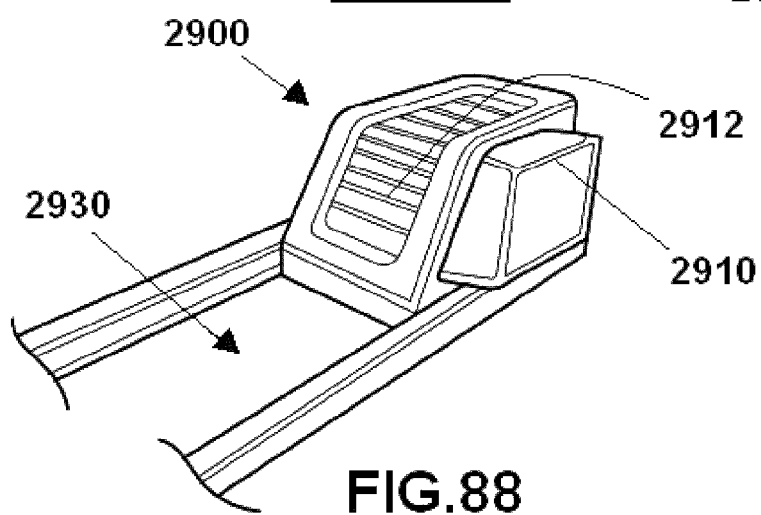
FIG. 88 is a perspective view of the second embodiment of the vehicle floor console, as shown in FIG. 87.
Figure 89:
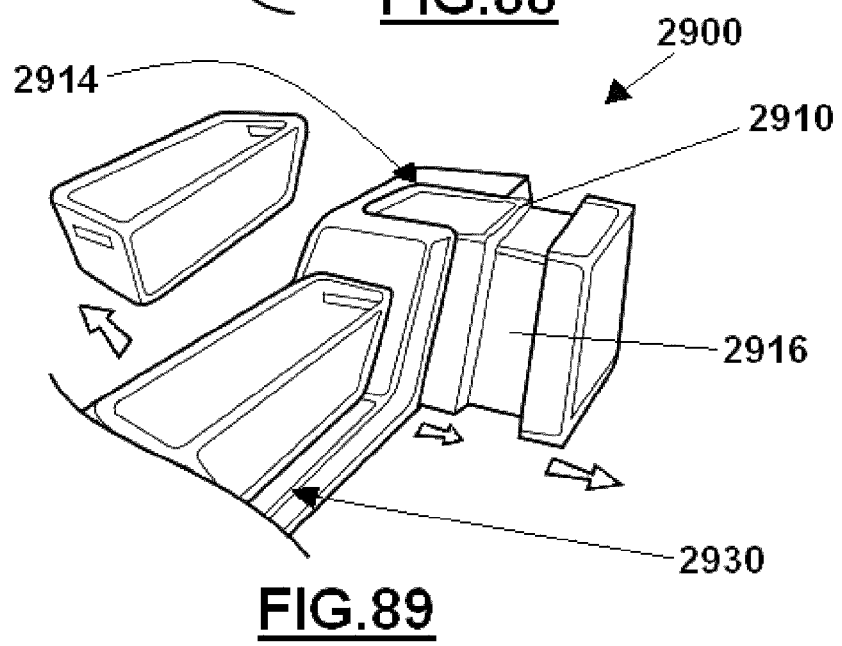
FIG. 89 is a perspective view of the second embodiment of the vehicle floor console, as shown in FIG. 87.

FIGS. 87 through 91 show a second embodiment of a vehicle floor console 2900 including a removable storage bin. As shown in FIG. 87, the vehicle floor console 2900 includes first and second storage bins 2910 and 2920, respectively. The second storage bin 2920 extends into the second row of the vehicle to be accessed. Additionally, doors 2922 can be used to access the second storage bin 2920 and may include an e-storage container. As shown in FIG. 88, the first storage bin 2910 may pull out to the side of the vehicle floor console 2900. Additionally, a tambour door 2912 may allow access to the first storage bin 2910 without pulling the first storage bin 2910 out of the vehicle floor console 2900. Alternatively, as shown in FIG. 89, the first storage bin 2910 may have an open top 2914 and expandable sides 2916 to allow the first storage bin 2910 to be extended for holding large items.

Figure 90:
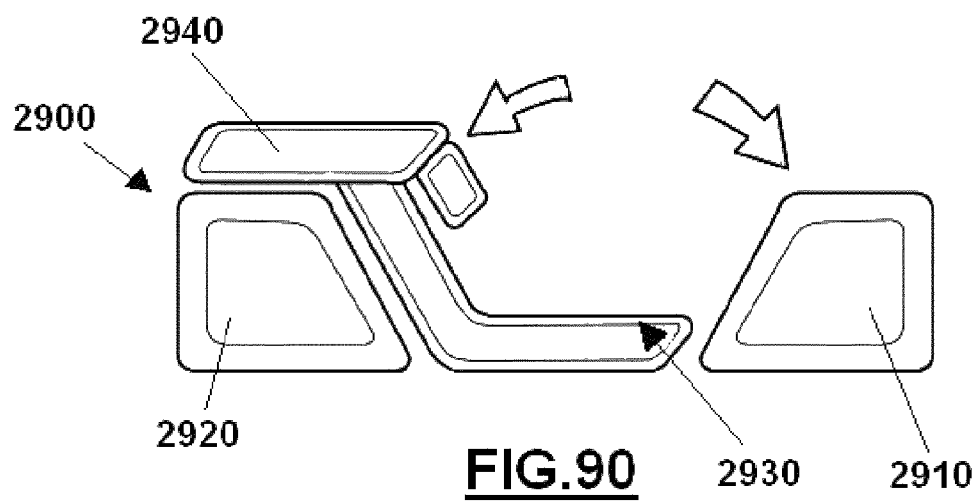
FIG. 90 is a side view of the second embodiment of the vehicle floor console, as shown in FIG. 87.
Figure 91:
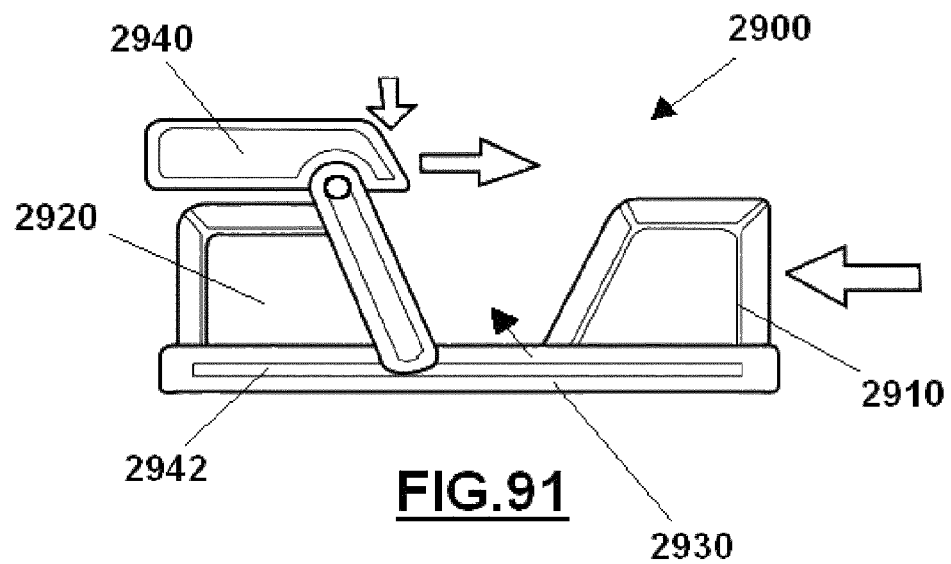
FIG. 91 is a side view of the second embodiment of the vehicle floor console, as shown in FIG. 87.

As shown in FIGS. 87 through 91, a reconfigurable storage space 2930 is located between the first and second storage drawers 2920 and 2930. As shown in FIG. 88, the reconfigurable storage space 2930 may be left open for storage of large self-contained objects. Alternatively, as shown in FIGS. 87 and 89, a third storage bin 2932 can be placed in the reconfigurable storage space 2930. As shown in FIG. 87, the third storage bin 2932 may have a hinged lid 2934. As shown in FIGS. 90 and 91, the reconfigurable storage space 2930 may be used to provide a pivoting armrest 2940. As shown in FIGS. 90 and 91, the pivoting armrest 2940 can be repositioned for various purposes. As shown in FIG. 91, a rail or track 2942 may be provided to allow further configuration of the pivoting armrest 2940. Additionally, as shown in FIGS. 90 and 91, the first and second storage bins 2910 and 2920 may be completely self-contained and interchangeable.

Figure 92:
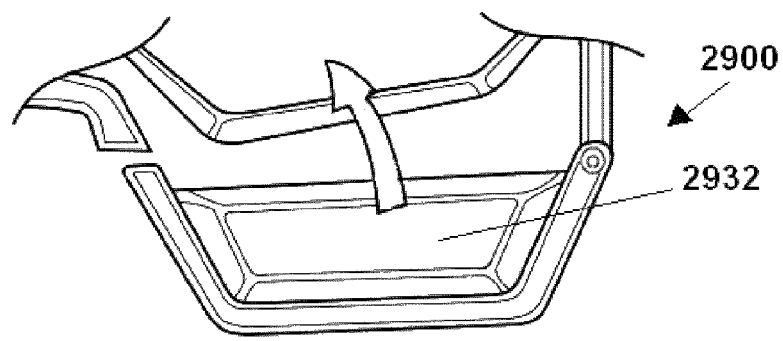
FIG. 92 is a side view of the second embodiment of the vehicle floor console, as shown in FIG. 87.
Figure 93:
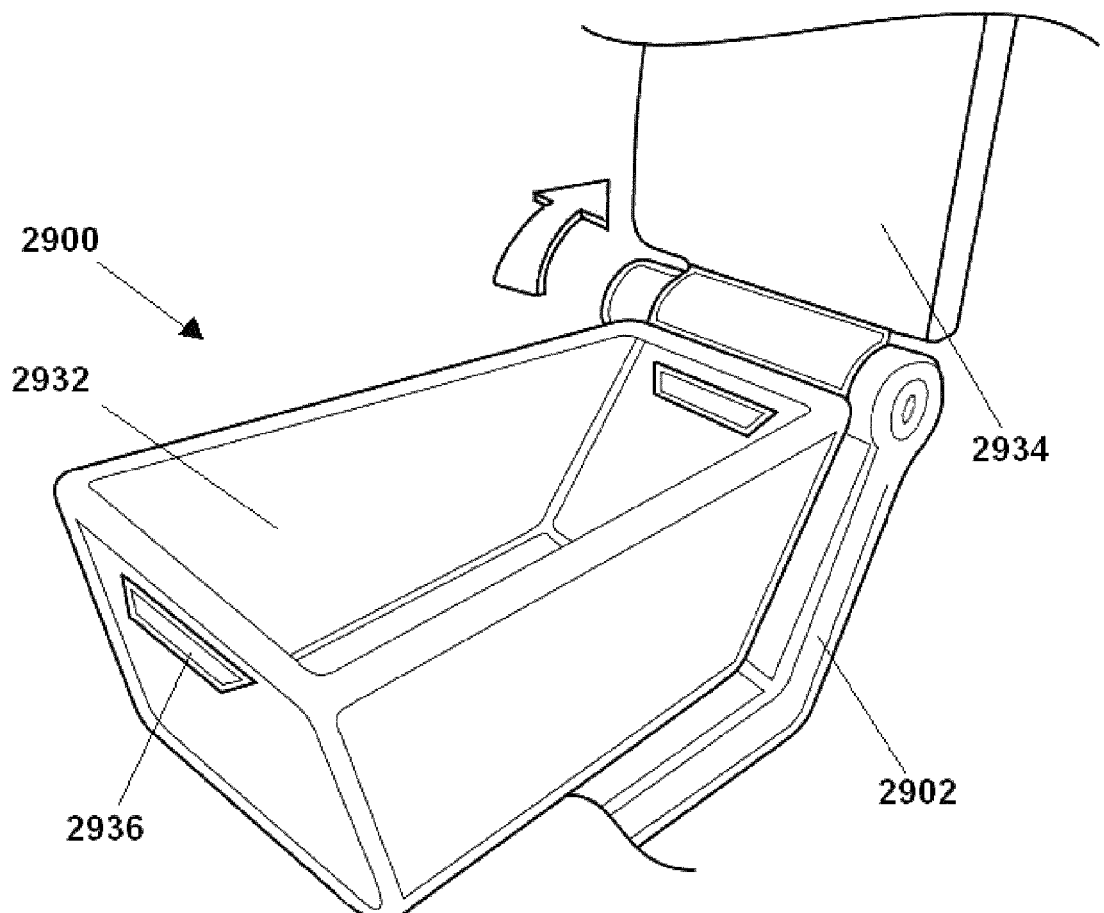
FIG. 93 is a perspective view of the second embodiment of the vehicle floor console, as shown in FIG. 87.

FIGS. 92 and 93 show the third storage bin 2932 in greater detail. As shown in FIG. 92, the storage bin 2932 is removable. The storage bin 2932 can be removed from the vehicle to transport items into and/or out of the vehicle. As shown in FIG. 93, the storage bin 2932 may include one or more handles 2936 to assist in removing it from the vehicle, inserting it into the vehicle and/or transporting the storage bin 2932. The storage bin 2932 may also have a tambour door and/or the hinged lid 2934, which may be connected to a frame 2902 of the vehicle floor console 2900 (as shown in FIG. 93) or which may be connected to the storage bin 2932 itself.

Figure 94:
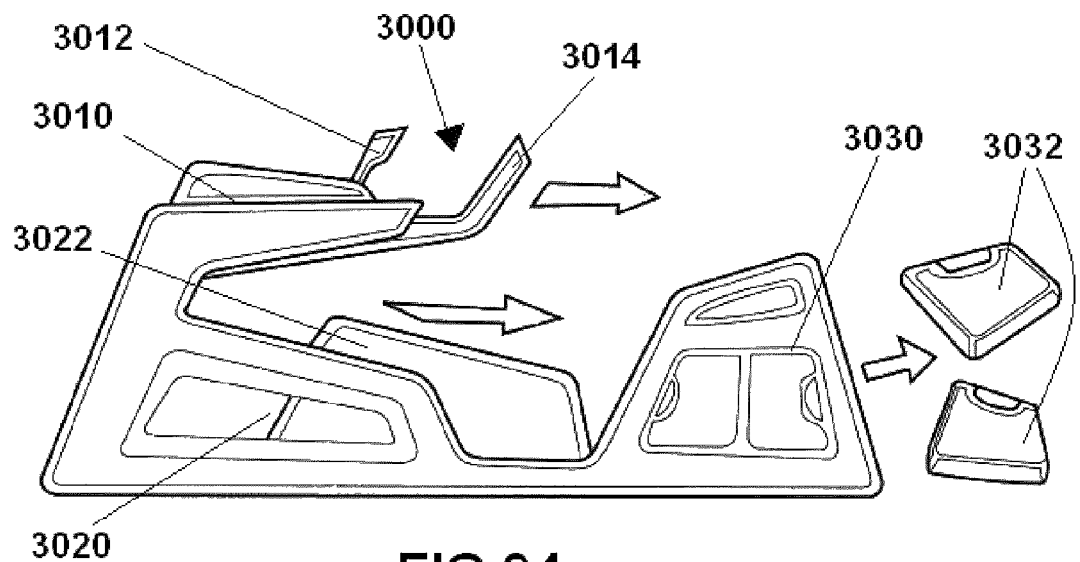
FIG. 94 is a side view of a vehicle floor console including an integrated shifting handle.
Figure 95:
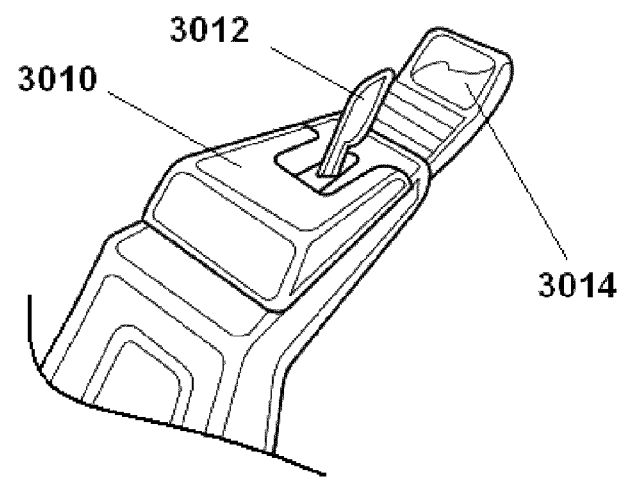
FIG. 95 is a perspective view of the vehicle floor console of FIG. 94.
Figure 96:
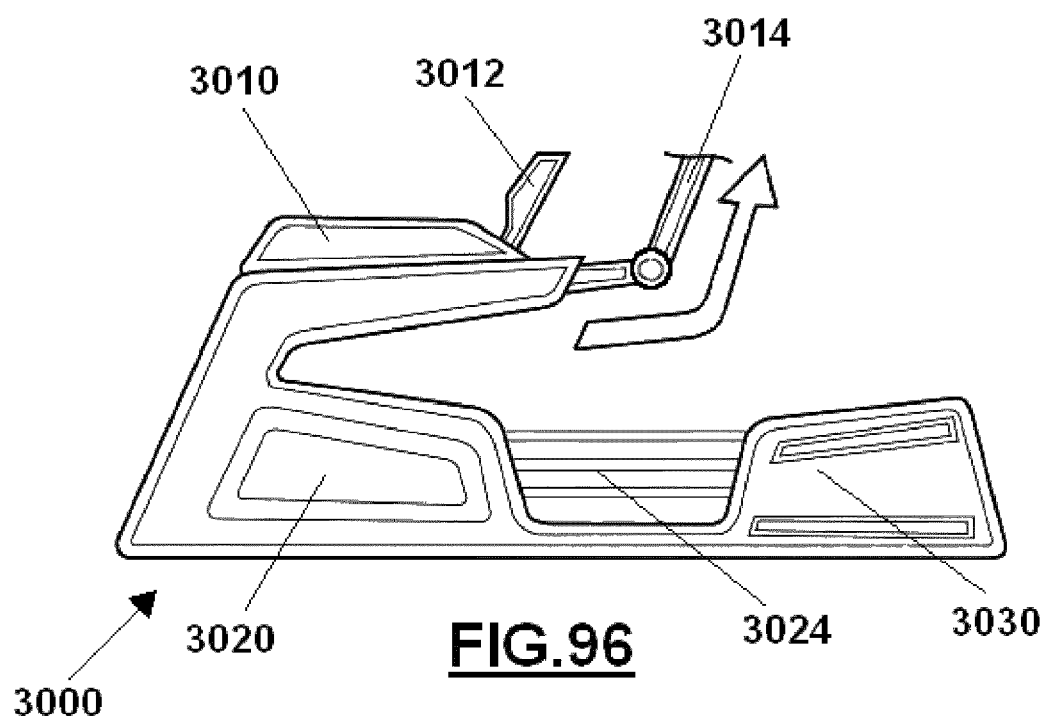
FIG. 96 is a side view of the vehicle floor console of FIG. 94.
Figure 97:
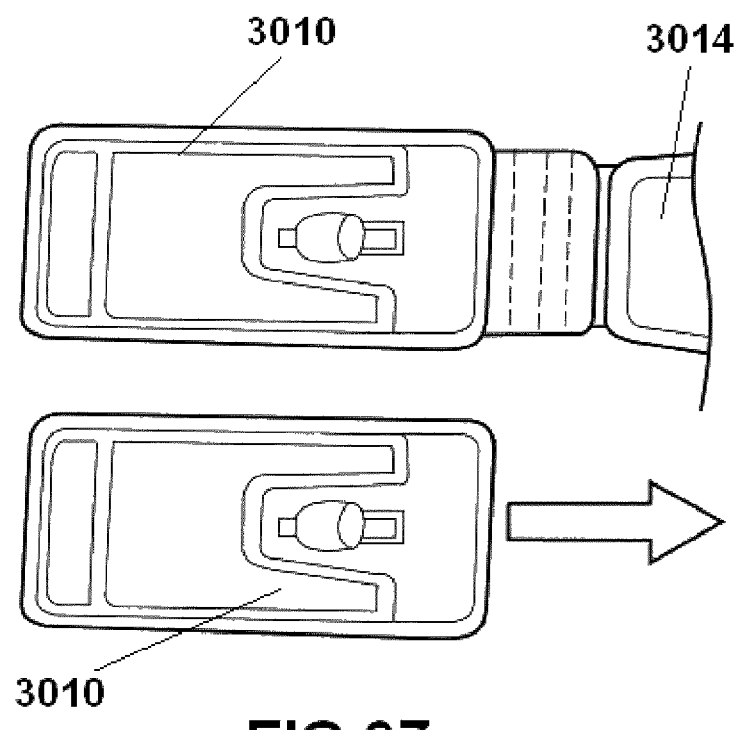
FIG. 97 is a top view of the vehicle floor console of FIG. 94.

FIGS. 94 through 97 show a vehicle floor console 3000 including an integrated shifting handle. As shown in FIG. 94, the vehicle floor console 3000 has an armrest 3010 with an integrated shifting handle 3012. A center stack and control screen 3014 extend out from underneath the armrest 3010 when in use. A large storage area 3020 with a moveable storage bin 3022 is provided beneath the armrest 3010. As shown in FIG. 96, the large storage area 3020 may be partially defined by bungee cords 3024, flexible cords, static cables, wires or the like. Also shown in FIG. 96 is a molded-in attachment system 3030, which can be used to attach additional content or storage. As shown in FIG. 94, the attachment system 3030 may be specifically designed to store a cartridge-shaped item, such as portable power units 3032 or any other cartridge-shaped item, such as a first-aid kit, a road hazard kit, a tool kit or the like. As shown in FIG. 97, the center stack and control screen 3014 extend out from beneath the armrest 3010. FIG. 95 shows a perspective view of how the center stack and control screen 3014 look when it is extended out.

Removable/Reconfigurable Control Panel

Figure 98:
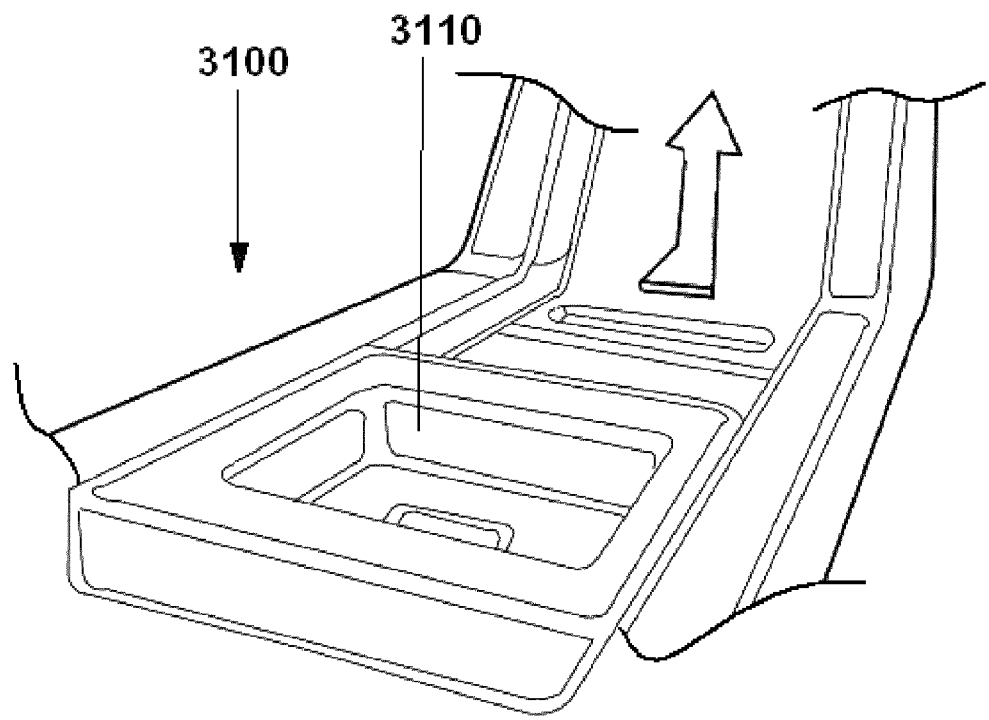
FIG. 98 is a perspective view of a vehicle floor console including an interface configured to receive a removable and reconfigurable control panel.
Figure 99:
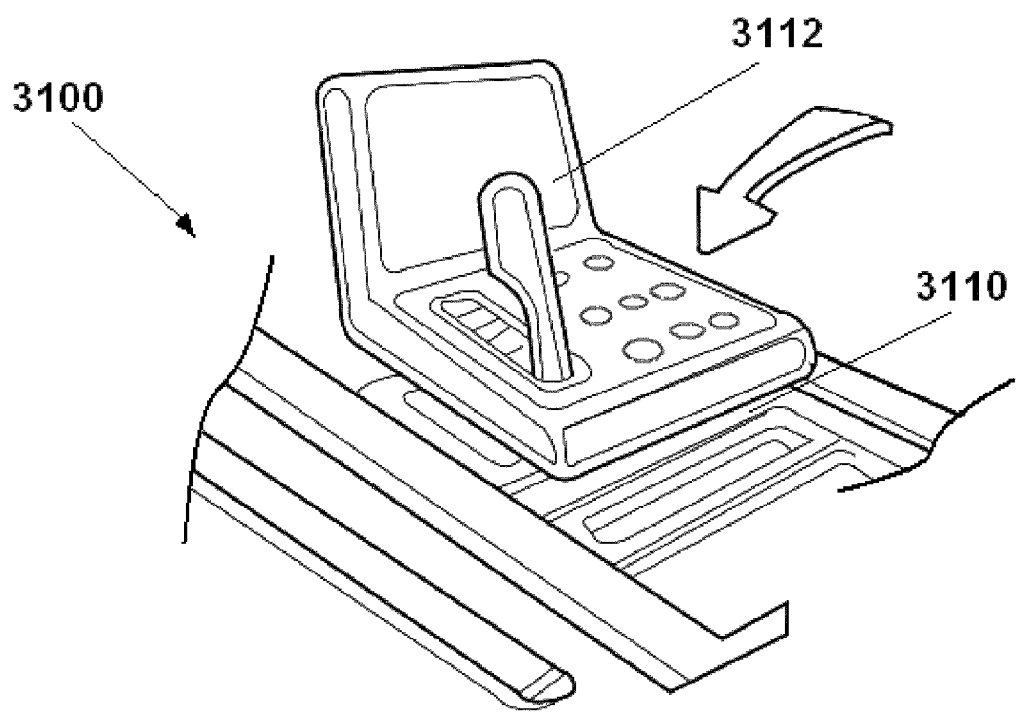
FIG. 99 is a perspective view of the vehicle floor console including an exemplary removable and reconfigurable control panel.
Figure 100:
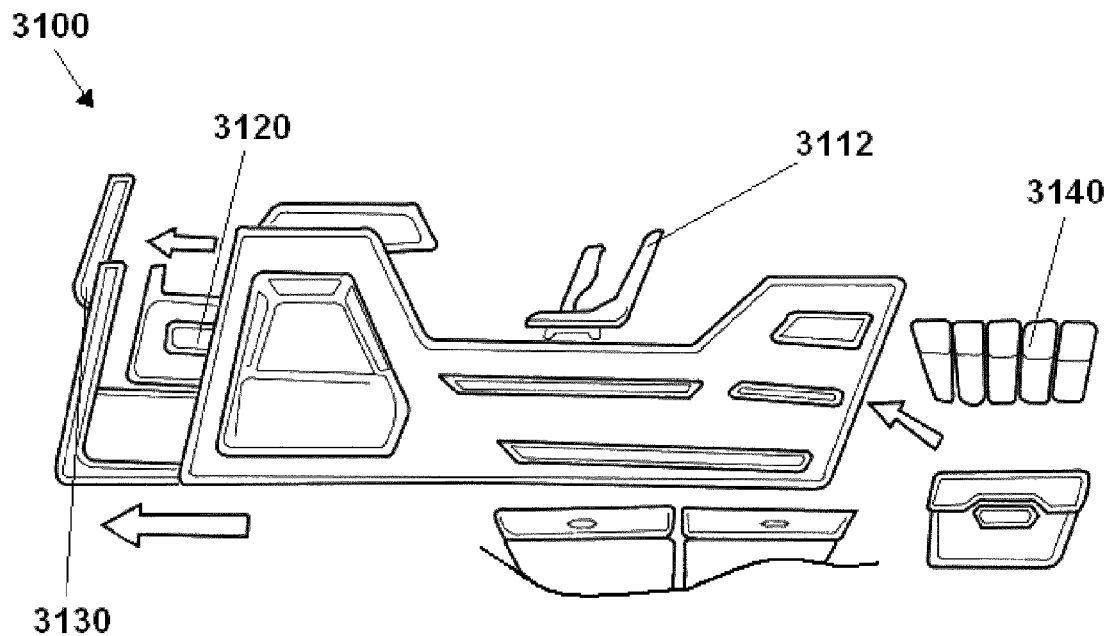
FIG. 100 is a side view of the vehicle floor console including the exemplary removable and reconfigurable control panel.

FIGS. 98 through 100 show a vehicle floor console 3100 including an interface configured to receive a removable and reconfigurable control panel. As shown in FIG. 98, the vehicle floor console 3100 has a universal docking port 3110. The universal docking port 3110 allows different features and optional equipment to be plugged into the vehicle floor console 3100 and be used with the vehicle. As shown in FIG. 99, a transmission control and screen 3112 can be plugged into the universal docking port 3110. As shown in FIG. 100, the vehicle floor console 3100 may include a two tiered second row storage drawer 3120 and a pop-up screen 3130. The vehicle floor console 3100 may also include features that allow accessories to be snapped into the vehicle floor console 3100, such as a tool belt 3140, a first aid kit, an emergency repair kit and/or other accessories that may be useful to the user of the vehicle.

Figure 101:
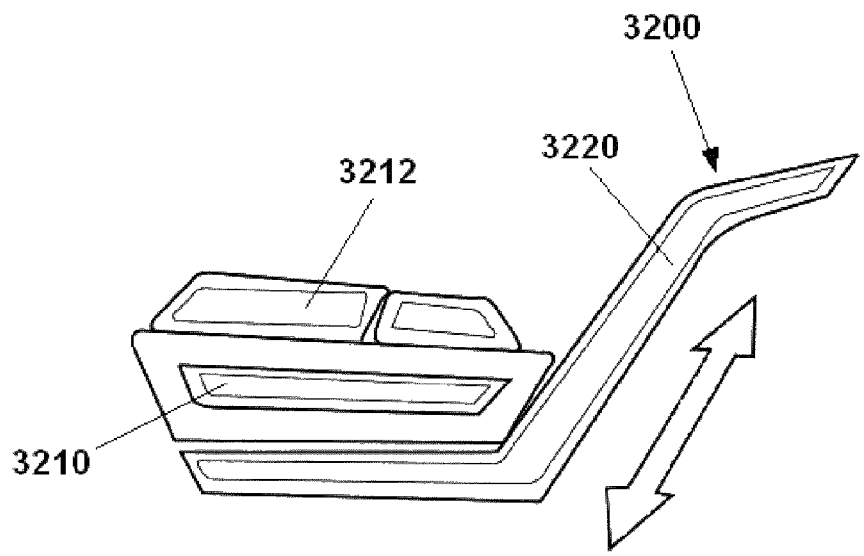
FIG. 101 is a side view of a vehicle floor console including a slidably adjustable armrest.
Figure 102:
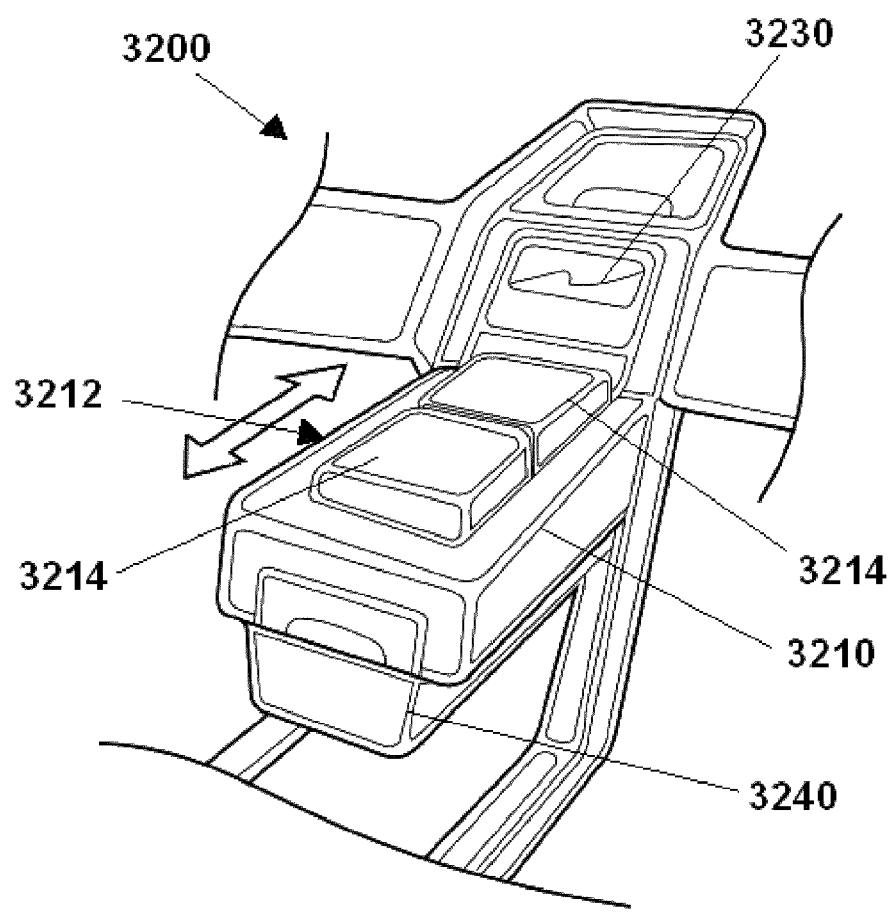
FIG. 102 is a perspective view of the vehicle floor console shown in FIG. 101.
Figure 103:
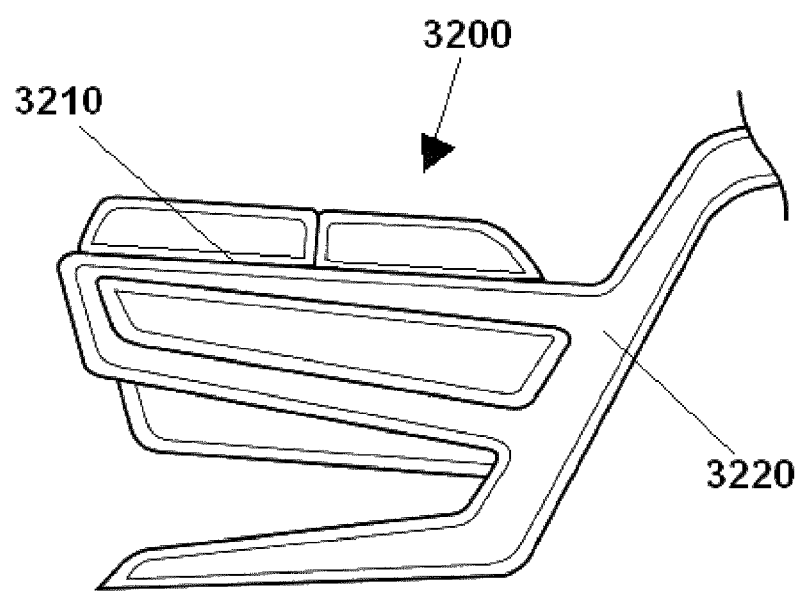
FIG. 103 is a side view of the vehicle floor console shown in FIG. 101.
Figure 104:
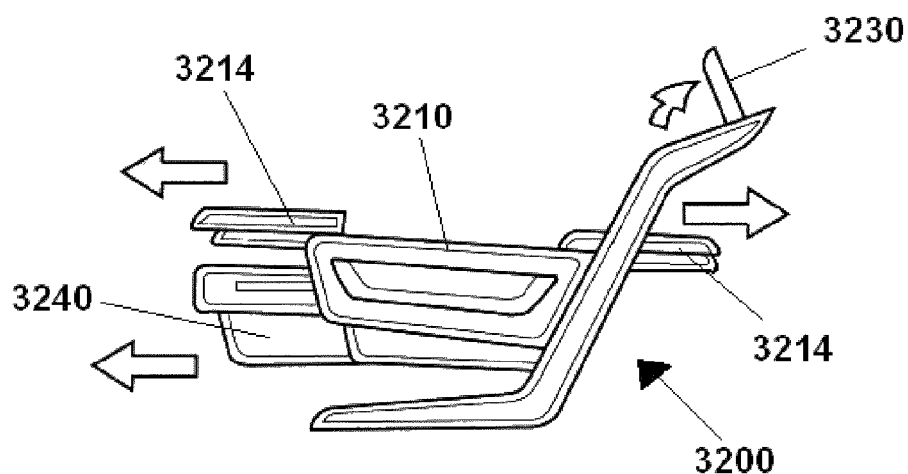
FIG. 104 is a side view of the vehicle floor console shown in FIG. 101.

FIGS. 101 through 105 show a vehicle floor console 3200 including a slidably adjustable armrest. As shown in FIG. 101, the vehicle floor console 3200 has a central arm 3210 attached to a substantially L-shaped frame 3220. The arm 3210 can slide up and down the frame 3220 to adjust the height of the arm 3210. The vehicle floor console 3200 also includes an armrest 3212 on the top surface of the arm 3210. As shown in FIG. 102, the vehicle floor console 3200 also includes a control screen 3230 at the front of the vehicle floor console 3200 and a storage drawer 3240 beneath the arm 3210. The armrest 3212 may be split into two halves 3214, which can slide away from each other, as shown in FIG. 104, to allow access to the storage drawer 3240. Alternatively, the storage drawer 3240 can slide out from the arm 3210 to be accessed. Also, as shown in FIG. 104, the control screen 3230 may fold flat against the vehicle floor console 3200. As shown in FIG. 103, the arm 3210 of the vehicle floor console 3200 may be a fixed structure and thus not adjustable along the height of the frame 3220. A fixed arm 3210 may reduce costs of the vehicle floor console 3200.

Figure 105:
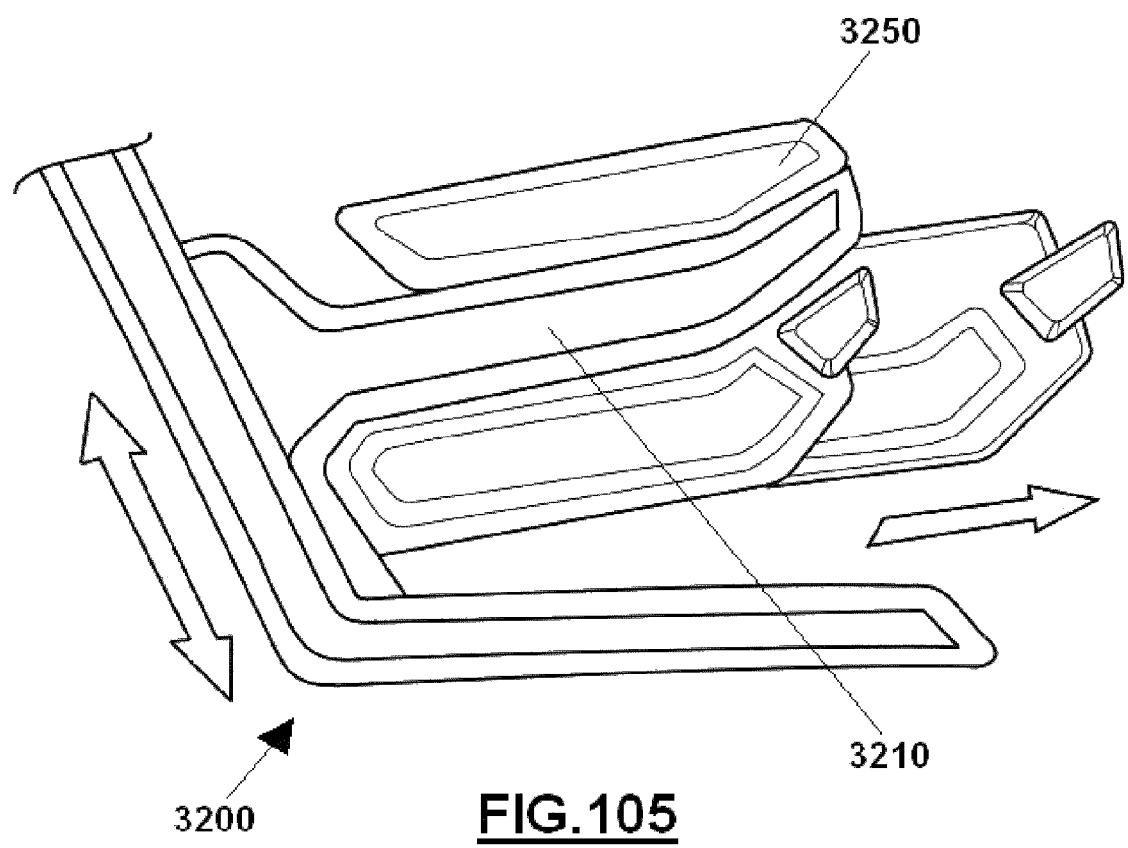
FIG. 105 is a series of views of the vehicle floor console shown in FIG. 101.

As shown in FIG. 105, the vehicle floor console 3200 may have an armrest 3250 that is one piece rather than being divided into halves. The armrest 3250 may slide back and up to provide access to the storage drawer 3240 or additional storage within the arm 3210. An optional storage bin (not shown) can be provided to fit under the arm 3210 and which is able to slide back into the second row for additional storage options. Additionally, the armrest 3250 may be usable as an additional seat, similar to a jump seat, by rotating the armrest 3250 one hundred eighty degrees.

Biased Pivoting Retention Feature

In certain embodiments, the vehicle floor console includes a support structure and a retaining feature pivotally biased toward the support structure. The retaining feature is configured to secure cargo between the support structure and the retaining feature. Such a configuration may facilitate securing large and/or irregularly shaped items within reach of the front and/or rear passengers. For example, instead of placing a grocery back on a front passenger where the bag may move during transport, the bag may be secured by the retaining feature, thereby limiting movement of the bag and ensuring the contents remain within the bag.

Figure 106:
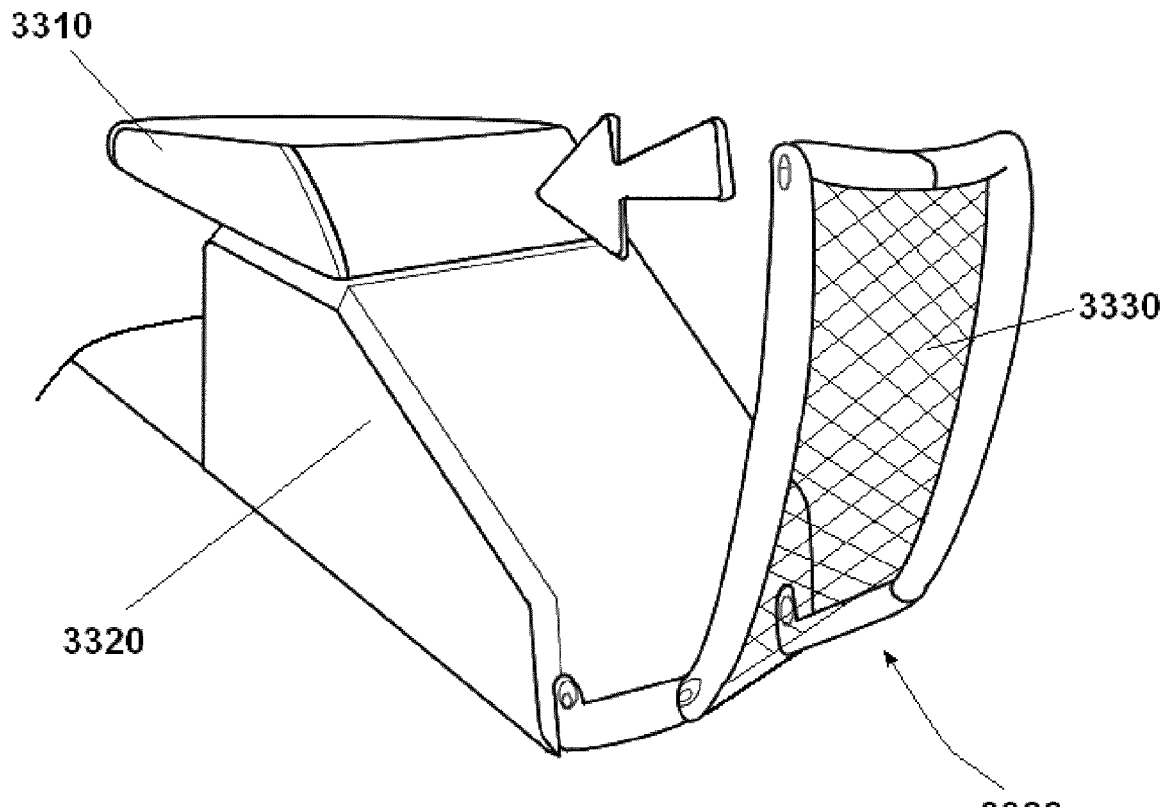
FIG. 106 is a perspective view of a vehicle floor console including a pivotally biased retaining feature configured to secure cargo.

FIG. 106 is a perspective view of a vehicle floor console 3300 including a pivotally biased retaining feature 3330 configured to secure cargo. In the present configuration, the vehicle floor console 3300 includes an armrest 3310 and a support structure, such as the illustrated storage compartment 3320. As illustrated, the armrest 3310 is disposed on top of the storage compartment 3320 and may be hinged and/or slidable along a track to enable the armrest 3310 to act as a cover for the storage compartment 3320. The retaining feature 3330 includes a frame and a resilient material stretched across the frame. In certain embodiments, the resilient material may include a cargo net or other fiber mesh material. In the illustrated embodiment, the retaining feature 3330 is pivotally coupled to a base of the support structure 3320. Furthermore, the retaining feature 3330 is positioned at a rear portion of the vehicle floor console 3300. Consequently, the retaining feature 3330 extends into the second row of seating such that cargo may be disposed within the retaining feature 3330 from the second row. As discussed in detail below, alternative embodiments may include a retaining feature positioned at a front portion of the vehicle floor console 3300 for securing cargo between the driver and front passenger seats.

Figure 106A:
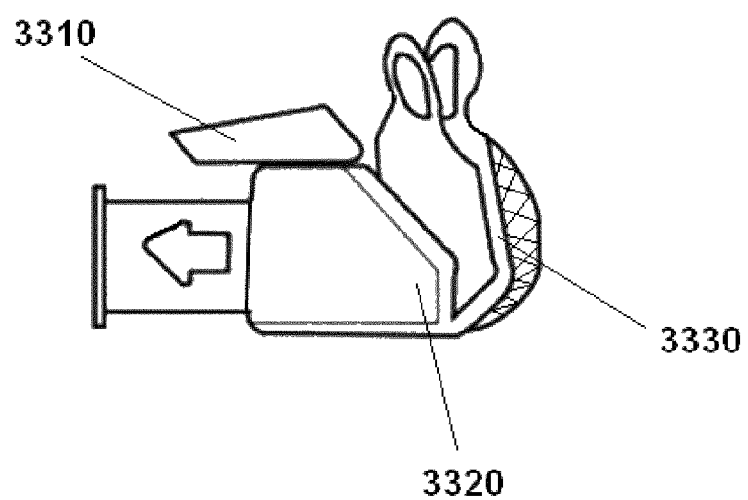
FIG. 106A is a side view of the vehicle floor console including the pivotally biased retaining feature configured to secure cargo, including a storage compartment disposed beneath an armrest.

FIG. 106A is a side view of the vehicle floor console 3300 including the pivotally biased retaining feature 3330 configured to secure cargo. As illustrated, the support structure 3320 includes a storage compartment having a sliding door disposed at a front portion of the structure 3320. As will be appreciated, items may be stored within the storage compartment by sliding the door forward, inserting the items into the storage compartment and closing the door. Furthermore, FIG. 106A illustrates a bag secured between the support structure 3320 and the retaining feature 3330. As illustrated, the resilient material conforms to the contours of the bag, thereby limiting movement of the bag within the vehicle.

Figure 107:
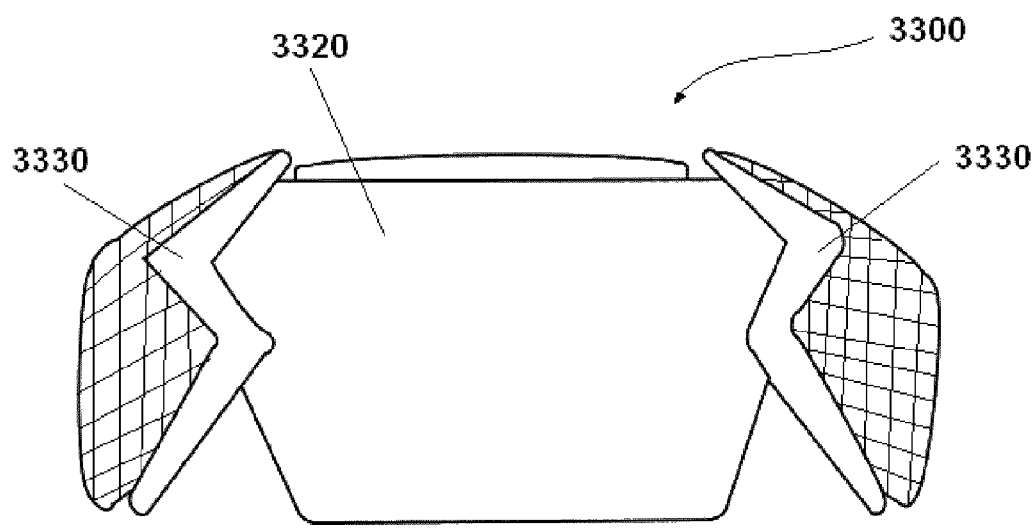
FIG. 107 is a side view of the vehicle floor console including a first pivotally biased retaining feature at a rear portion of the console and a second pivotally biased retaining feature at a front portion of the console.

FIG. 107 is a side view of the vehicle floor console 3300 including a first pivotally biased retaining feature 3330 at a rear portion of the console and a second pivotally biased retaining feature 3330 at a front portion of the console. As illustrated, each retaining feature 3330 is pivotally biased to provide a pressured retaining function and/or to create a cupped storage space for large and/or irregularly shaped items. In the present configuration, the retaining features 3330 are mounted to a floor of the vehicle. Such a configuration may establish a larger space for retaining cargo compared to embodiments in which the retaining feature 3330 is mounted to the support structure 3320. Furthermore, because a retaining feature 3330 is positioned at a front portion of the support structure and a rear portion of the support structure, cargo may be secured both between the driver and front passenger seats and within the second row of seating.

Figure 108:
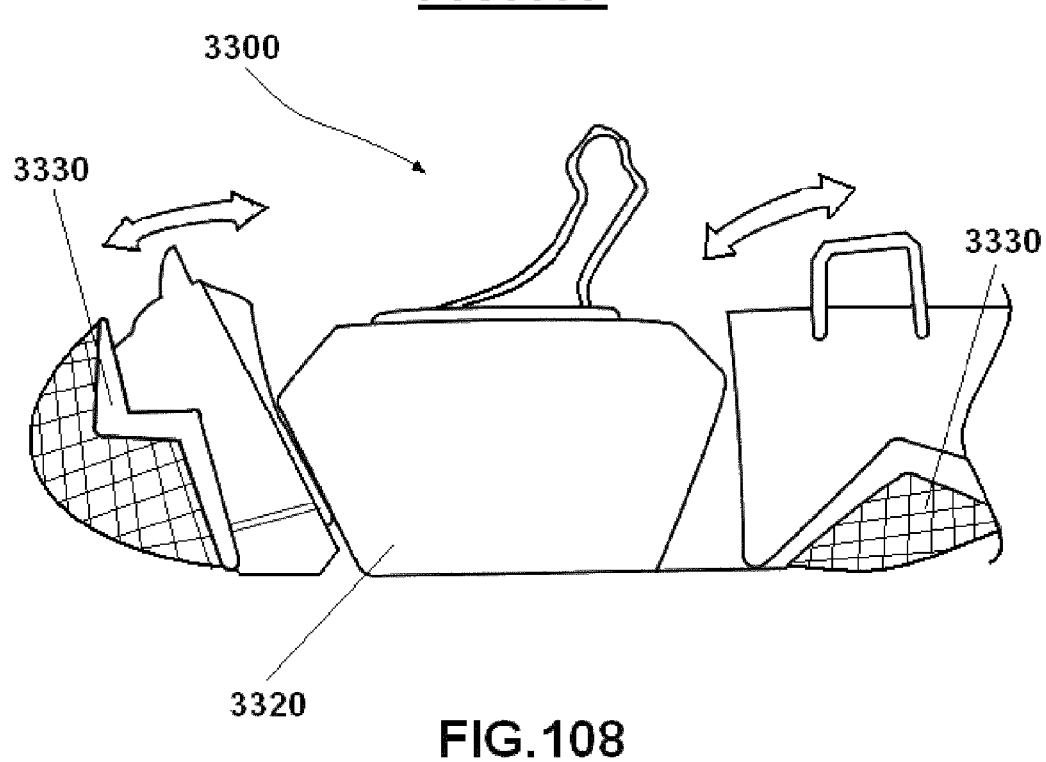
FIG. 108 is a side view of the vehicle floor console including two pivotally biased retaining features, each securing cargo between the retaining feature and a center support structure.

FIG. 108 is a side view of the vehicle floor console 3300 including two pivotally biased retaining features 3330, each securing cargo between the retaining feature 3330 and a center support structure 3320. As illustrated, a large irregularly shaped bag is disposed between the front retaining feature 3330 and the support structure 3320. As illustrated, the pivotal bias of the retaining feature 3330 serves to secure the bag from moving within the interior of the vehicle. Furthermore, the resilient material conforms to the shape of the bag to provide additional support. A large bag is also disposed within the retaining feature 3330 at the rear portion of the vehicle floor console. Consequently, the bag is disposed within the second row of seating. As illustrated, the weight of the bag is sufficient to overcome the pivotal bias of the retaining feature 3330. As a result, the retaining feature contacts the floor of the vehicle interior. However, in the present configuration, the frame of the retaining feature 3330 includes angled portions configured to block movement of the bag. Consequently, the bag may be secured within the retaining feature 3330 even though the pivotal bias is insufficient to sandwich the bag between the retaining feature and the support structure 3320.

Figure 109:
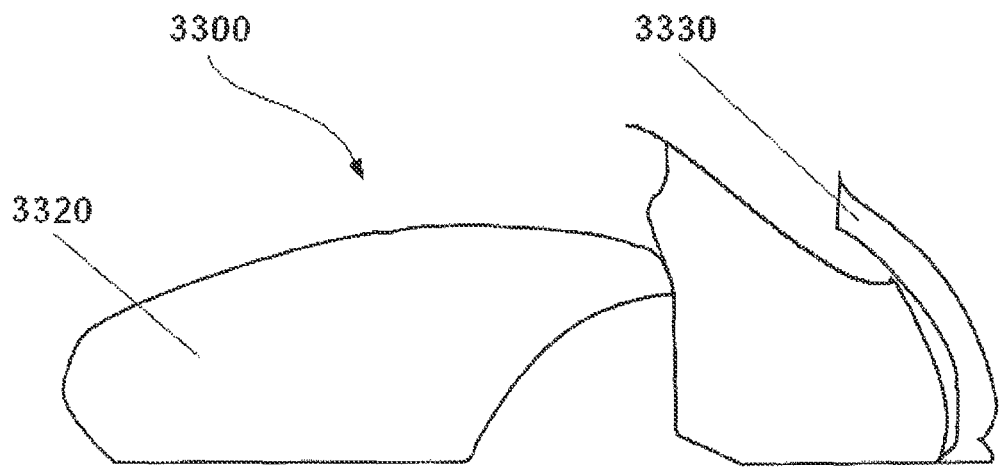
FIG. 109 is a side view of the vehicle floor console including the pivotally biased retaining feature, in which a top portion of the retaining feature is configured to contact the support structure when cargo is not present to establish an open storage space.

FIG. 109 is a side view of the vehicle floor console 3300 including the pivotally biased retaining feature 3330, in which a top portion of the retaining feature is configured to contact the support structure when cargo is not present to establish an open storage space. Similar to the embodiment illustrated in FIGS. 107 and 108, the present retaining feature 3330 is pivotally mounted to the floor of the vehicle interior. As illustrated, the retaining feature 3330 has a curved shape configured to secure irregularly shaped items such as the illustrated bag. In addition, the retaining feature 3330 is positioned such that with the bag removed a top portion of the retaining feature contacts a top portion of the support structure 3320. Due to the curved space of the retaining feature and the curved shape of the support structure, an open space is formed between the retaining feature and the support structure when no cargo is present. As will be appreciated, small items may be placed within the open space to block movement of the small items within the vehicle interior. Consequently, the present retaining feature 3330 may serve to both secure larger and smaller items.

FIG. 110 is a side view of the vehicle floor console 3300 including the pivotally biased retaining feature 3330, in which the retaining feature includes a joint configured to pivotally bias a retaining arm against cargo within the retaining feature. As illustrated, a bag is disposed within the retaining feature 3330, which is pivotally biasing the bag against the support structure 3320. Specifically, the bag is disposed within a main body of the retaining feature 3330. A pivotally biased retaining arm 3350 serves to further secure the bag within the retaining feature 3330. In the present embodiment, the retaining feature 3330 includes a joint 3340 configured to pivotally bias the retaining arm 3350 in a direction 3360 against the cargo within the retaining feature 3330. In this manner, cargo having various irregular shapes may be retained by the retaining feature 3330.

Biased Linear Clamp

FIG. 111 is a perspective view of a vehicle floor console including a linearly biased retaining feature configured to secure cargo between the retaining feature and a support structure. As illustrated, a vehicle floor console 3400 includes multiple storage bins 3410, a storage drawer 3420 and a retaining feature 3430. The retaining feature 3430 can extend away from the rest of the vehicle floor console 3400 to create a custom storage space between the retaining feature 3430 and the rest of the vehicle floor console 3400. In the present configuration, the retaining feature 3430 is biased toward the support structure by a spring or other suitable device. In this manner, cargo having various irregular shapes may be retained by the vehicle floor console 3400.

FIG. 111A is a cross-sectional side view of the vehicle floor console 3400 including the linearly biased retaining feature 3430. As illustrated, the storage compartments 3410 are oriented vertically to enhance storage space within the console 3400. In addition, the storage drawer 3420 is configured to slide forwardly to provide access to items within the drawer. FIG. 111B is a perspective view of the vehicle floor console 3400, illustrating cargo secured between the retaining feature 3430 and the support structure. As will be appreciated, due to the automatically adjustable nature of the retaining feature 3430, various shapes and sizes of cargo may be secured by the floor console 3400.

FIG. 112 is a perspective view of the vehicle floor console 3400 including the linearly biased retaining feature, in which the retaining feature 3430 includes an armrest. As illustrated, a pad 3432 may be included on the retaining feature 3430. The pad 3432 may be spring loaded, or otherwise movable similar to a clamp or vise, to hold items placed between the retaining feature 3430 and the rest of the vehicle floor console 3400. Furthermore, the retaining feature 3430 may include other storage and/or comfort features. For example, the retaining feature 3430 may have an armrest and/or an information monitor that partially covers the storage space between the retaining feature 3430 and the rest of the vehicle floor console 3400.

Storage Ribbon

In certain embodiments, the vehicle floor console includes a storage ribbon configured to provide various shaped storage compartments within the console. In the present configurations, the storage ribbon is disposed between a pair of lateral support structures such that the storage ribbon defines multiple storage compartments. Furthermore, the storage ribbon is formed from a single sheet of material. For example, the storage ribbon may be formed by an extrusion process, a compression molding process, and/or a vacuum forming process. As will be appreciated, forming the vehicle floor console in this manner may both substantially reduce construction costs and facilitate the use of recycled/recyclable materials. In addition, forming all the interior compartments from a single piece of material may substantially reduce weight compared to configurations that utilize multiple components to form a similar structure.

FIG. 113 is a perspective view of a vehicle floor console 3500 including a first embodiment of a storage ribbon 3520 disposed between a pair of lateral support structures 3510. The lateral support structures 3510 may include side walls constructed from wood, plastic, metal, or other suitable materials, as illustrated in the present embodiment. Alternatively, as described below, the lateral support structures may include tubing or other elongated structures. The storage ribbon 3520 may be constructed from recycled and/or recyclable material such as compressed plastic fibers. The ribbon may be formed through an extrusion process, a compression molding process and/or a vacuum forming process. For example, in the illustrated configuration, a mold corresponding to the cross-sectional shape of the storage ribbon 3520 may be utilized to extrude long sheets of material. The sheets may then be cut to the approximate width of the illustrated ribbon 3520. In this manner, production costs associated with manufacturing the vehicle floor console 3500 may be substantially reduced compared to forming storage compartments from multiple components.

FIG. 114 is a perspective view of a second embodiment of the storage ribbon 3520 disposed between the pair of lateral support structures 3510. As illustrated, the lateral support structures 3510 include tubes configured to support the ribbon 3520. Such a configuration may reduce weight and/or construction costs compared to embodiments employing solid side walls. Because the present ribbon configuration includes a pocket, the extrusion process described above may not be suitable for producing the illustrated storage ribbon 3520. Consequently, a compression molding and/or vacuum forming process may be employed. For example, a single sheet of material may be compressed in a die, thereby forming the shape of the illustrated ribbon 3520. Alternatively, a sheet of material may be heating and drawn against a mold by a vacuum, thereby inducing the material to match the shape of the mold. Such processes may significantly reduce construction costs compared to configurations that form compartments individually and then secure the compartments to the vehicle floor console 3500. FIG. 114A is a cross-sectional side view of the second embodiment of the storage ribbon as shown in FIG. 114. As illustrated, the forming techniques described above may be utilized to establish complex shapes within the ribbon 3520. The ribbon 3520 may be secured to the support structures 3510 by an adhesive or other suitable coupling mechanism (e.g., fasteners, sonic welding, etc.).

FIG. 115 is a cross-sectional side view of a third embodiment of the storage ribbon disposed between the pair of lateral support structures. Similar to the second embodiment, the lateral support structure 3510 include tubular supports. As illustrated, the tubular supports are formed to substantially match the complex shape of the storage ribbon. Such an embodiment may both efficiently utilize the available space between the driver and front passenger seats, and establish a clean appearance of the vehicle floor console 3500.

FIG. 116 is a perspective view of a fourth embodiment of the storage ribbon. As illustrated, the ribbon 3520 includes a body coupled to the vehicle floor at a front and rear portion of the console 3500. The shape of the storage ribbon 3520 is configured to establish an open storage space beneath the console 3500. In addition, the ribbon 3520 includes a pocket disposed within the body, and configured to contain small items disposed within the pocket through an opening in the top. Such a configuration may employ tubular supports, such as those described above, to support the ribbon 3520 while providing access to the open storage area. FIG. 116A is a cross-sectional side view of the fourth embodiment of the storage ribbon as shown in FIG. 116. As illustrated, the pocket is positioned toward one end of the console (e.g., front or rear) to enable the remainder of the ribbon 3520 to serve as an armrest for the driver and/or passenger. In each of the embodiments described above, the ribbon configuration may facilitate decreased weight and reduced manufacturing costs compared to typical console construction techniques, while at the same time providing an environmentally friendly product that is designed to be easily disassembled and/or recycled at the end of its lifespan.

Rotatable Storage Tray

In certain embodiments, the vehicle floor console includes a tray pivotally mounted to a support structure such that the tray may rotate about a first axis between a substantially vertical storage position and a substantially horizontal operational position. The tray is also configured to rotate about a second axis to a first position between the front passenger seat and a driver seat, to a second position within a second row of seating, and to a third position over a seat bottom of a front passenger seat. In certain configurations, the tray is configured to rotate about the first axis to a transport position configured to facilitate rotation of the tray about the second axis. Consequently, a single tray may function to service various areas of the vehicle interior. For example, when positioned between the front passenger seat and the driver seat, the tray may be utilized to contain cups, small items and/or serve as an armrest for the driver and/or front passenger. When positioned over the front passenger seat bottom, the tray may function to support a laptop, for example. Similarly, when the tray is positioned within the second row of seating, the tray may be utilized for storage by the rear passengers. Such a configuration may substantially reduce vehicle weight and manufacturing costs compared to configurations that utilize multiple fixed trays.

FIG. 117 is a perspective view of a vehicle floor console 3600 including a tray 3620 pivotally mounted to a support structure 3610. The tray 3620 is coupled to the support structure 3610 by a first pivot joint 3630 configured to facilitate rotation of the tray 3620 about a first axis, and a second pivot joint 3640 configured to facilitate rotation of the tray 3620 about a second axis. As illustrated, the tray 3620 is oriented in a substantially vertical storage position. As discussed in detail below, the tray 3620 is configured to rotate about a first axis between the illustrated storage position and a substantially horizontal operational position. In the storage position, the tray 3620 may facilitate ingress and/or egress of the driver, front passenger and/or rear passengers. Furthermore, positioning the tray in the storage position may establish a storage space for large items on the floor of the front and/or second row of seating. FIG. 117A is a side view of the tray as shown in FIG. 117. As illustrated, the support structure 3610 includes a recess configured to house the tray 3620 in the storage position. In the present configuration, the recess is positioned at a front portion of the support structure, i.e., between the driver and front passenger seats.

FIG. 117B is a perspective view of the vehicle floor console 3600 in which the tray 3620 is oriented in the substantially horizontal operational position. As previously discussed, the tray 3620 may be rotated about the first pivot joint 3630 from the substantially vertical storage position to the substantially horizontal operational position. Because the recess is positioned at the front of the support structure 3610, rotating the tray into the operational position places the tray in a first position between the front passenger seat and the driver seat. As illustrated, the tray 3620 includes cup holders and a storage bin. Therefore, in the first position, the tray 3620 may be utilized to contain cups, small items and/or serve as an armrest for the driver and/or front passenger. As discussed in detail below, the tray 3620 may be rotated about the second pivot joint 3640 to other positions within the vehicle interior. In certain configurations, the second pivot joint 3640 may include a detent feature configured to secure the tray in a particular position. For example, the detent feature may bias the tray 3620 toward the illustrated first position until a force is applied to the tray sufficient to overcome the bias. Once the tray starts to rotate, the tray may rotate freely until the next position is reached. In the next position, the second pivot joint 3640 may similarly bias the tray 3620 into the selected position.

FIG. 118 is a perspective view of the vehicle floor console 3600 in which the tray 3620 is oriented in a second position within the second row of seating. As previously discussed, the tray 3620 may be rotated about the second pivot joint 3640 from the first position illustrated in FIG. 117 to the present second position. However, as will be appreciated, a seat back of the driver and/or front passenger seat may block movement of the tray 3620 from the first position to the second position. Consequently, the tray may be configured to rotate about the first axis to a substantially vertical transport position such that the tray 3620 may be transitioned from the first position to the second position. Specifically, as illustrated in FIG. 119, the tray 3620 is configured to rotate upwardly about the first pivot joint 3630 to the transport position. As will be appreciated, orienting the tray 3620 upwardly may facilitate tray rotation without contact between the tray and the seat backs. Consequently, the tray 3620 may be rotated about the second pivot joint 3640 to any desired orientation. For example, as illustrated in FIG. 120, the tray 3620 may be rotated to a third position over a seat bottom of the front passenger seat. In such an orientation, the tray 3620 may function to support a laptop and/or other items for the front passenger. Because a single tray 3620 may be rotated to each of the described positions, the present embodiment may substantially reduce vehicle weight and manufacturing costs compared to configurations that utilize multiple fixed trays.

Floor Console Pass-Through

FIG. 121 is a side view of a vehicle floor console 3700 including a pass-through configured to facilitate passage of long items into an open space under the console. As illustrated, the vehicle floor console 3700 includes a central storage area 3710 at the base of the vehicle floor console, a rear storage area 3720 beneath the second row seats and a telescoping cover 3730. The telescoping cover 3730 extends between the central storage area 3710 and the rear storage area 3720 to create one long, covered storage space. A similar telescoping cover may extend from the back of the rear storage area 3720. FIG. 121A is a perspective view of the telescoping cover configured to enclose an area between the floor console and the second row of seating. As illustrated, the telescoping cover 3730 includes multiple segments that extend from the floor console 3700 to form an enclosure between the floor console 3700 and the second row of seating. The enclosure may serve to prevent a person outside of the vehicle from identifying items within the storage space 3710. As illustrated in FIG. 121B, cargo may be loaded from a rear of the vehicle through the rear storage area 3720.

FIG. 122 is a perspective view of an alternative retractable extension 3730 configured to enclose the area between the floor console and the second row of seating. Specifically, the present retractable extension 3730 is configured to rotate between the illustrated open position and a closed position within the floor console 3700. As illustrated, long items, such as lumber, skis, and fluorescent light bulbs, can be placed in the long, covered storage area, where they are protected from occupants and other cargo within the vehicle.

FIG. 123 is a perspective view of the pass-through within the second row of seating. As illustrated, a door 3740 is provided on the rear storage area 3720. It should be appreciated that a similar door may be provided on the central storage area 3710. The central storage area 3710 and the rear storage area 3720 can be used together as outlined above or can be used individually with or without the use of any telescoping covers 3730.

Biased Storage Compartment Wall

FIG. 124 is a cross-sectional side view of a vehicle floor console 3800 including a biased storage compartment wall 3820. As illustrated, the vehicle floor console 3800 includes a large storage area 3810 and a biased (e.g., spring-loaded) storage compartment wall 3820. The biased wall 3820 adjusts to the size and weight of any cargo placed in the large storage area 3810. As such, when small, lightweight objects are placed in the large storage area 3810, the biased wall will travel only a short distance, or not at all. Consequently, a relatively small storage area 3810 will be established. This small storage area 3810 may enhance access to the small items within the storage area 3810. However, when larger and/or heavier items are placed within the storage area 3810, the biased wall 3820 will be urged to a rearward position, thereby increasing the total storage volume. In this configuration, the storage area 3810 may accommodate both smaller/lighter items and larger/heavier items.

Rotatable Cylindrical Storage Compartments

FIG. 125 is a perspective view of a vehicle floor console 3900 including a cylindrical rotatable storage compartment in a closed position. As illustrated, the vehicle floor console 3900 includes rotating covers 3910 in a closed position. As discussed in detail below, the cover 3910 may be rotated within the vehicle floor console 3900 to provide access to storage features, such as storage compartments, cup holders, etc. In addition, the vehicle floor console 3900 includes uncovered cup holders and a storage bin positioned at a front portion of the floor console 3900.

FIG. 126 is a perspective of the vehicle floor console 3900 with the rotatable cover 3910 in an open position. As illustrated, the various storage compartments 3920 are contained within the floor console 3900. Specifically, as shown in FIG. 126A, the storage compartments 3920 include a storage bin and a cup holder. As will be appreciated, other storage compartment configurations may be employed in alternative embodiments. Furthermore, each storage compartment may include an independently rotatable cover 3910.

FIG. 126B is a cross-sectional view of the cylindrical rotatable storage compartment 3920, as shown in FIG. 126. As illustrated, the storage features 3920 may rotate to reveal different storage options, such as cup holders or shallow storage. For example, the covers 3910 may be rotated to enclose the two storage compartments disposed within an upper portion of the storage feature 3920. The assembly (i.e., the covers 3910 and the storage feature 3920) may be rotated approximately 180 degrees. As a result, the shallow compartment will now be positioned within the upper portion of the console 3900, thereby facilitating access to the shallow compartment. In addition, because the covers 3910 enclose the larger compartments, the contents of the larger compartments will be retained even though the compartments are invented. Similarly, to rotate the shallow compartment back to the lower position, the covers 3910 may be rotated to cover the shallow compartment, and the assembly may be rotated approximately 180 degrees. Such a configuration may be utilized to hide items within the shallow compartment such that people looking into the vehicle will not see the items.

Bag Support Rails

In certain embodiments, the vehicle floor console includes a pair of horizontal support rails configured to suspend a removable storage bag above a floor of a vehicle such that an opening in the bag faces upwardly. In this configuration, the suspended bag may be utilized for storage within the center console. As will be appreciated, various user-selectable bags may be utilized for storage. For example, previously used plastic grocery bags may be coupled to the rails and serve as temporary storage compartments. Alternatively, backpacks, purses, dealer/factory supplied containers and/or other durable bags may be secured to the rails for longer term storage of items within the floor console. Such a configuration may significantly decrease manufacturing costs compared to console configurations employing molded storage compartments. Furthermore, vehicle weight may be reduced due to the reduction in floor console structural components.

FIG. 127 is a perspective view of a vehicle floor console 4000 including a first embodiment of a pair of horizontal support rails 4020 configured to suspend a removable storage bag 4030 above a vehicle floor. The present embodiment includes an armrest 4010 configured to slide along the pair of horizontal support rails 20. As illustrated, the armrest 4010 is configured to selectively cover and expose an opening in the bag. In this manner, sliding the armrest 4010 rearwardly facilitates access to the interior of the bag 4030, while sliding the armrest 4010 forwardly substantially encloses the bag 4030, thereby facilitating retention of items within the bag 4030. In alternative embodiments, the armrest 4010 may be coupled to the console 4000 by a joint configured to facilitate rotation of the armrest between the covered and exposed positions. As previously discussed, the bag 4030 may be any suitable container that fits within the space defined by the floor console 4000. For example, plastic grocery bags, backpacks, purses, small garbage bags, or other bags may be utilized in the present embodiments. Alternatively, a bag particularly configured to mount within the floor console 4000 may be supplied by the dealer and/or the factory. The bag 4030 may be attached to the rails 4020 by any suitable means such as clips, snaps, pegs, hooks, etc. In alternative embodiments, the bag 4030 may be permanently secured to the rails 4020. In addition, the present embodiment also includes cup holders and a storage compartment disposed at a front portion of the floor console 4000 to provide additional storage.

FIG. 128 is a perspective view of a vehicle floor console 4000 including a second embodiment of the pair of horizontal support rails 4020 configured to suspend the removable storage bag 4030 above the vehicle floor. As illustrated, the structure of the floor console 4000 only includes the support rails 4020. Consequently, vehicle weight and manufacturing costs may be further reduced due to the reduction in structural components within the floor console 4000. In the present embodiment, multiple storage bags 4030 are disposed within the floor console 4000. As will be appreciated, certain embodiments may be configured to support 1, 2, 3, 4, 5, 6, or more bags 4030. As illustrated, clips 4022 serve to couple the storage bags 4030 to the rails 4020. As previously discussed, alternative bag attachment systems may be employed in alterative embodiments. In addition, the structure of the rails 4020 may serve to limit movement of a bag (e.g., backpack, purse, etc.) placed within the floor console 4000 even if the bag is not coupled to the rails 4020. Consequently, the present embodiments provide a flexible design which effectively utilizes the space between the driver and passenger seats, while decreasing vehicle weight and reducing manufacturing costs.

Cinchable Cargo Compartment

FIG. 129 is a perspective view of a vehicle floor console including a cinchable storage compartment. As illustrated, the vehicle floor console 4100 includes a bridge portion 4110 and a hammock-style storage sling 4120. The storage sling 4120 is attached to a cord. By pulling on the cord, the storage sling 4120 is drawn closer to the bridge 4110 creating an adjustable storage space. As will be appreciated, the sling 4120 may be composed of a resilient material to match the contours of the retained objects. Because the bridge 4110 defines the upper surface of the floor console 4100, the bridge 4110 may serve as an armrest in certain embodiments. The present configuration may facilitate storage of irregularly shaped items that may otherwise move throughout the vehicle interior during transport. In addition, the cinchable storage compartment may decrease vehicle weight and reduce manufacturing costs compared to floor consoles that employ rigid storage compartments.

Three-Position Rotatable Armrest

FIG. 130 is a perspective view of a vehicle floor console 4200 including a three-position rotatable armrest, in which the armrest is oriented in an extended position. As illustrated, the vehicle floor console 4200 includes a tumbler 4210 and a frame 4220. The tumbler 4210 further includes individually adjustable armrests 4212, a touch screen 4214 and an open storage space 4216. The tumbler 4210 can rotate to multiple positions within the frame 4220. In the position shown in FIG. 130, the tumbler 4210 is in an extended position presenting the armrests 4212 and the touch screen 4214 on the top surface of the tumbler 4210. In such an orientation, the driver and/or front passenger may both utilize the armrests 4212 and access the screen 4214.

FIG. 131 is a perspective view of the vehicle floor console 4200 including the three-position rotatable armrest, in which the armrest is oriented in a retracted position. As illustrated, the tumbler 4210 is rotated forward to place the armrests 4212 and the touch screen 4214 between the seats adjacent to the floor console 4200. In addition, the tumbler 4210 may be rotated to a third position in which the touch screen 4214 faces away from the driver and front passenger. Such an orientation may be utilized to hide the screen 4214 from people positioned outside of the vehicle.

Collapsible Storage Compartment

FIG. 132 is a perspective view of a vehicle floor console 4300 including a collapsible storage compartment in a deployed position. As illustrated, the vehicle floor console 4300 includes a center console 4310, a pedestal console 4320 and a collapsible storage compartment 4330. The center console 4310 may include an armrest for the driver and/or front passenger. In addition, an open storage space is provided between the collapsible storage compartment 4330 and the pedestal console 4320. In the illustrated configuration, the collapsible storage compartment 4330 is in a deployed position between the center console 4310 and the pedestal console 4320. The collapsible storage compartment 4330 includes a storage space enclosed by one or more doors configured to facilitate access to the storage space. As discussed in detail below, the collapsible storage compartment 4330 is configured to retract to establish an open storage area within the floor console 4300.

FIG. 133 is a side view of the vehicle floor console 4300 in which the collapsible storage compartment 4330 is in a retracted position. As illustrated, in the retracted position, the collapsible storage compartment 4330 engages the center console 4310 to form a continuous assembly. In this position, a large storage area is provided between the collapsible storage compartment 4330 and the pedestal console 4320. As will be appreciated, the collapsible storage compartment 4330 is configured to retain items in both the deployed and retracted positions.

FIG. 134 is a side view of the vehicle floor console 4300 in which the collapsible storage compartment 4330 is in a deployed position. In the deployed position, the collapsible storage compartment 4330 ties into the pedestal console 4320. This position creates an integrated aesthetic look between the center console 4310 and the pedestal console 4320, while providing an open storage space beneath the collapsible storage compartment 4330. Consequently, the present embodiment establishes a flexible storage space between the driver and passenger seats for storing items having a variety of shapes and sizes.

Removable Cargo Retaining Panels

FIG. 135 is a side view of a vehicle floor console 4400 including an open storage area configured to receive removable cargo retaining panels. As illustrated, the vehicle floor console 4400 includes a frame 4410 with open sides. Two interchangeable console panels 4412 (one shown) connect to the frame 4410 to close the sides of the vehicle floor console 4400. In this manner, a user of the vehicle floor console 4400 has the option of open sides or closed sides.

FIG. 136 is a side view of the vehicle floor console 4400 including the open storage area, in which the cargo retaining panels 4412 have been inserted. As illustrated, a storage area is defined by the frame 4410 and the panels 4412. FIG. 137 is a side view of the vehicle floor console 4400 including the open storage area, in which the cargo retaining panels 4412 have been removed, thereby establishing a storage area capable of storing larger items. Additionally, the interchangeable console panels 4412 offer an opportunity for the user to customize the appearance of the vehicle floor console 4400. Custom, pre-made interchangeable console panels 4412 can be provided and/or created by the user.

Referring now to FIGS. 1 through 137, it should be appreciated that any of the features shown in one exemplary embodiment are not necessarily unique to that specific embodiment and as such can be intermixed with features from other exemplary embodiments.

In various exemplary embodiments, the vehicle floor console ideally provides lighting features that enhance the driving experience for the driver and any passengers, while at the same time not inhibiting the needs of either. The lighting features will light up any dark corners or recesses of the vehicle interior. The lighting features should provide multiple lighting configurations for various needs and/or activities and should illuminate the ingress and egress of the driver and/or any passengers into and out of the vehicle. Likewise, the lighting features may be customizable to match mobile electronic devices.

In various exemplary embodiments, the vehicle floor console has storage features that provide secure and quick storage and retrieval of electronic devices, such as cell phones. The storage features may also provide safe and intuitive interaction with the stored electronic devices, while simultaneously charging the stored electronic device. In various exemplary embodiments, the vehicle floor console includes storage features that are closed but easily accessible while driving. Some of these storage features use natural boundaries for containing stored items. Some of these storage features use higher grade materials than conventional floor consoles. These, or other, storage features provide a simple way to quickly hide items from unexpected passengers.

In various exemplary embodiments, the vehicle floor console has ergonomic controls that are accessible to the driver and/or passenger. These controls are positioned so as to be reachable in an ergonomic manner and convey a sense of safety and security. Seat controls may use the same interface for the driver's seat and the passenger seat.

In various exemplary embodiments, the vehicle floor console has unique and innovative feature content, customizable trim level flexibility and/or independent and flexible user interface and content. In various exemplary embodiments, the vehicle floor console uses thin, structural and or high end materials and/or provides flexibility in color and trim level options.

In various exemplary embodiments, the vehicle floor console is asymmetrically designed and may include independent armrests, storage access, and/or storage details to the driver and any passengers. In various exemplary embodiments, the vehicle floor console includes lighting features and options, such as adjustable colors, linear or ribbon-style lighting and/or utility lighting in opaque bins to provide ambient lighting to the interior of the vehicle.

In various exemplary embodiments, the vehicle floor console and/or other elements of the vehicle interior, such as the seats, use durable materials that are scratch and tear resistant and/or are stain/spill resistant. In various exemplary embodiments, the vehicle floor console includes one or more lockable storage areas, a large storage compartment in the center of the first row and/or long-term storage areas that can be left full during the use of the vehicle. In various exemplary embodiments, the vehicle floor console includes an accessible storage area for work related papers and items. In various exemplary embodiments, the vehicle floor console includes lighting features that illuminate areas which are accessed while driving and/or at the conclusion of the trip. In various exemplary embodiments, the vehicle floor console has power points placed in various locations such that they provide power and access to cell phones and other electrical devices, while at the same time managing cords. Some of these power points and/or other features allow portable music players the ability to play music through the vehicle audio system.

In various exemplary embodiments, the vehicle floor console achieves a rugged elegant look, while including luxurious content that is practical and functional. The content provides user defined, adaptable space and features, such as a technology toolbox. In various exemplary embodiments, the vehicle floor console provides a platform for user defined content, such as take-away storage and/or power modules, as well as interfaced for add-on equipment and auxiliary controls, such as trailer brakes or a plow. In various exemplary embodiments, the vehicle uses drive-by-wire transmission controls and/or thin film or touch screen buttons and displays to make more space available for the vehicle floor console. In various exemplary embodiments, the vehicle floor console has large, reconfigurable storage zones and/or secure, lockable storage.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vehicle floor console, comprising:
   a support structure extending generally upwardly from a floor of a vehicle, wherein the support structure includes a first exterior longitudinal end facing a rear of the vehicle, and a second exterior longitudinal end facing a front of the vehicle; and
   a retaining feature pivotally biased toward the first or second exterior longitudinal end of the support structure to secure cargo via compression of the cargo between the first or second exterior longitudinal end of the support structure and the retaining feature, wherein the retaining feature is pivotally coupled to a base of the support structure adjacent to the floor of the vehicle.

2. The vehicle floor console of claim 1, wherein the retaining feature comprises a frame and a resilient material stretched across the frame.

3. The vehicle floor console of claim 1, comprising an armrest mounted to a top surface of the support structure.

4. The vehicle floor console of claim 1, comprising a storage compartment disposed within the support structure.

5. A vehicle floor console, comprising:
   a support structure extending generally upwardly from a floor of a vehicle, wherein the support structure includes a first exterior longitudinal end facing a rear of the vehicle, and a second exterior longitudinal end facing a front of the vehicle; and
   a retaining feature pivotally biased toward the first or second exterior longitudinal end of the support structure to secure cargo via compression of the cargo between the first or second exterior longitudinal end of the support structure and the retaining feature, wherein the retaining feature is pivotally coupled to a base of the support structure adjacent to the floor of the vehicle, and wherein the retaining feature comprises a main body, and a retaining arm pivotally biased toward the main body to capture the cargo within the retaining feature.

6. The vehicle floor console of claim 5, comprising an armrest mounted to a top surface of the support structure.

7. The vehicle floor console of claim 5, comprising a storage compartment disposed within the support structure.

\* \* \* \* \*